United States Patent
Tanase et al.

(10) Patent No.: US 6,367,836 B1
(45) Date of Patent: Apr. 9, 2002

(54) AIRBAG FOR HEAD PROTECTING AIRBAG SYSTEM

(75) Inventors: Toshinori Tanase, Gifu-ken; Mitsuyoshi Ohno, Susono, both of (JP)

(73) Assignees: Toyoda Gosei Co., Ltd., Aichi-ken; Toyota Jidosha Kabushiki Kaisha, Aichi-ken, both of (JP)

( * ) Notice: Subject to any disclaimer, the term of this patent is extended or adjusted under 35 U.S.C. 154(b) by 0 days.

(21) Appl. No.: 09/366,674

(22) Filed: Aug. 4, 1999

(30) Foreign Application Priority Data

| Aug. 5, 1998 | (JP) | 10-221889 |
|---|---|---|
| Aug. 5, 1998 | (JP) | 10-221941 |
| May 28, 1999 | (JP) | 11-150360 |
| May 28, 1999 | (JP) | 11-150428 |
| May 28, 1999 | (JP) | 11-150503 |

(51) Int. Cl.⁷ ............................................. B60R 21/22
(52) U.S. Cl. ............................................. 280/730.2
(58) Field of Search .................... 280/730.2, 749, 280/743.2, 743.1

(56) References Cited

U.S. PATENT DOCUMENTS

| 5,322,322 A | | 6/1994 | Bark et al. ............... 280/730.2 |
| 5,480,181 A | | 1/1996 | Bark et al. ............... 280/730.2 |
| 5,788,270 A | | 8/1998 | Haland et al. ............. 280/730.2 |
| 5,884,937 A | * | 3/1999 | Yamada ................... 280/730.2 |
| 5,899,491 A | * | 5/1999 | Tschaeschke ............. 280/730.2 |
| 5,924,722 A | * | 7/1999 | Koide et al. .............. 280/730.2 |
| 5,957,487 A | * | 9/1999 | Stutz ..................... 280/730.2 |
| 6,000,715 A | * | 12/1999 | Tschaeschke ............ 280/730.2 |
| 6,010,149 A | * | 1/2000 | Riedel et al. ............. 280/730.2 |
| 6,042,141 A | * | 1/2000 | Welch et al. .............. 280/729 |
| 6,056,316 A | * | 5/2000 | Yamaji et al. ............ 280/730.2 |
| 6,070,902 A | * | 6/2000 | Kowalski et al. ......... 280/730.2 |
| 6,082,761 A | * | 7/2000 | Kato et al. ............... 280/730.2 |
| 6,095,551 A | * | 8/2000 | O'Docherty ............. 280/730.2 |
| 6,099,029 A | * | 8/2000 | Haland et al. ............. 280/729 |
| 6,129,377 A | * | 10/2000 | Okumura et al. ......... 280/730.2 |
| 6,135,493 A | * | 10/2000 | Jost et al. ................ 280/730.2 |
| 6,176,515 B1 | * | 1/2001 | Wallner et al. ........... 280/730.2 |
| 6,237,939 B1 | * | 5/2001 | Resh ..................... 280/730.2 |
| 6,260,878 B1 | * | 7/2001 | Tanase ................... 280/730.2 |

FOREIGN PATENT DOCUMENTS

| DE | 4307175 A1 | 9/1993 |
| DE | 19611575 A | 9/1997 |
| EP | 0 653 335 A2 | 5/1995 |
| EP | 0814001 A1 | 12/1997 |
| EP | 0847904 A1 | 6/1998 |
| EP | 0855316 A1 | 7/1998 |
| GB | 2314300 | 12/1997 |
| JP | 10-109607 | 4/1998 |
| JP | 10-119702 | 5/1998 |

* cited by examiner

Primary Examiner—Eric Culbreth
Assistant Examiner—L. Lum
(74) Attorney, Agent, or Firm—Pillsbury Winthrop LLP

(57) ABSTRACT

An airbag for a head protecting airbag system is adapted to be folded up and accommodated along an upper interior edge of a vehicle and to be developed and inflated to cover an interior opening of the vehicle. The airbag comprises a flexible airbag body and a flexible belt portion. The airbag body includes an inflatable portion adapted to be inflated to cover the interior opening when the airbag is inflated. The inflatable portion includes a longitudinal rod portion adapted to be inflated substantially vertically into a column shape. The longitudinal rod portion is arranged on one end side of the front end side or the rear end side of the inflatable portion. The belt portion is joined at its proximal portion to the peripheral edge of the longitudinal rod portion and is fixed at its distal end portion on the vehicle. When the airbag body is inflated, the lower end side of the longitudinal rod portion may be turned on the upper end side of the longitudinal rod portion in the forward or backward direction away from the inflatable portion. Thus, a high tension is established on the lower edge of the airbag body.

18 Claims, 40 Drawing Sheets

AIRBAG FOR HEAD PROTECTING AIRBAG SYSTEM

BACKGROUND OF THE INVENTION

1. Field of the Invention

The present invention relates to an airbag for a head-protecting airbag system mountable in a vehicle, such as an automobile. The airbag is folded up and accommodated in the upper edge side of an opening in the interior of the automobile. This airbag is inflatable to cover an opening when fed with an inflation gas.

2. Description of Related Art

An airbag for a head-protecting airbag system is described in Unexamined Published International Patent WO96/26087 and Unexamined Published UK Patent Application No. 2314300. This airbag has a gas inlet portion and an inflatable portion.

The gas inlet portion is a portion for introducing an inflation gas into the airbag. The inflatable portion is formed into a bag shape and is inflated to cover the opening of the interior when fed with the inflation gas. The inflatable portion is provided with a plurality of vertically extending inflating chambers which are arranged in a horizontal direction relative to each other. Between the individual inflating chambers, there are vertically arranged uninflating portions. The gas inlet portion is arranged to extend from the front end side of the airbag to the upper edge side of the inflatable portion. Moreover, the gas inlet portion extends so long in the longitudinal (fore and aft) direction as to communicate with the individual inflating chambers.

SUMMARY OF THE INVENTION

The airbag thus constructed is inflated in the following manner. When the individual inflating chambers are inflated, the distance between the uninflating portions is narrowed. Therefore, a forward or backward tension acts on the inflatable portion. As a result, the airbag can suppress the movement of the inflatable portion to the outside of the vehicle while restraining the passenger.

In the airbag of the prior art, there is room for improvement in intensifying the tension to be established on the lower edge side.

In the airbag thus constructed, on the other hand, the inflation gas floes downward into the individual inflating chambers through the gas inlet portion extending in the longitudinal direction.

However, the gas inlet portion is arranged on a peripheral edge of an opening of the vehicle, requiring a long time for the individual inflating chambers to be inflated to some extent. In the airbag of the prior art, therefore, there is room for improvement in the area of forming the airbag quickly, and capably restraining a passenger before the inflation of the airbag is complete.

A first object of the invention is to provide an airbag for a head-protecting airbag system capable of exhibiting a tension especially on the lower edge side of the airbag body when the airbag is inflated. Specifically, the object of the invention is to provide an airbag for a head-protecting airbag system which prevents the passenger restraining area from moving to the exterior of the vehicle when the airbag is inflated.

A second object of the invention is to provide an airbag for a head protecting airbag system capable of arranging the passenger restraining area quickly and widely before inflation is complete.

The aforementioned first object can be achieved by an airbag for a head protecting airbag system having the following construction. The airbag is folded up and accommodated along an upper interior edge of a vehicle and is developed and inflated to cover said interior opening. The airbag comprises a flexible airbag body and a flexible belt portion. The airbag body includes an inflatable portion adapted to be inflated to cover said interior opening when said airbag is developed and inflated. The inflatable portion includes a longitudinal rod portion adapted to be inflated substantially into a vertically oriented column shape. The longitudinal rod portion is arranged forward or rear of the inflatable portion. The flexible belt portion is joined at its proximal portion to the peripheral edge of said longitudinal rod portion and fixed at its distal end portion on the vehicle so that upon inflation of the inflatable portion, the lower end side of said longitudinal rod portion may be turned, said the flexible belt guides the longitudinal rod portion in the forward or backward direction away from said inflatable portion.

In the aforementioned airbag for the head-protecting airbag system, during inflation, the inflatable portion of the airbag body is developed and inflated to arrange the longitudinal rod portion into a substantially vertically oriented column. Then, the belt portion guides the longitudinal rod portion so that the upon inflation of said inflatable portion, the longitudinal rod portion generally pivots about an end thereof into a substantially vertical orientation.

At this time, the longitudinal rod portion admits the inflation gas so that it is inflated substantially vertically in a rod shape, that is, it takes a rigid rod state. Therefore, the rod-shaped longitudinal rod portion receives the turning torque by the belt portion so that a tension by the belt portion acts on the lower edge of the airbag body.

In the airbag for the head-protecting airbag system according to the invention, therefore, the tension can be exhibited especially on the lower edge side of the airbag body when the airbag is inflated. In the airbag according to the invention, moreover, the area capable of restraining the passenger substantially does not move to the exterior of the vehicle. As a result, the airbag according to the invention can restrain the passenger properly substantially over its entire area.

Moreover, the length of said belt portion, as extended straight from the proximal portion to the distal end portion, is desirably made smaller than the distance which is measured in a predetermined state between the proximal portion to a fixing portion of the distal end portion on said opening peripheral edge. In this predetermined state, the airbag body is mounted on the vehicle, and is developed but not inflated.

The following actions and effects can be obtained when the airbag is constructed as described hereinbefore. Specifically, the belt portion can be short in length. During inflation, therefore, the turning torque can be reliably applied to the longitudinal rod portion. As a result, a high tension is applied to the lower edge side of the airbag body. Here, the belt portion has a short length. However, the belt portion and the airbag body are flexible. Therefore, the belt portion can be easily pulled out when the airbag is folded up and mounted in the vehicle. As a result, the distal end portion of the belt portion can be easily attached to the vehicle when the airbag is to be mounted on the vehicle.

On the other hand, the construction of the belt portion may be modified in the following manner. The belt portion may be joined at the proximal portion to the circumferential edge of the upper end of said longitudinal rod portion. On the other hand, the belt portion may be fixed at said distal end portion on the vehicle through an insert hole formed in the circumferential edge of the lower end of the longitudinal rod portion.

The following actions and effects can be obtained when the airbag is constructed as described hereinbefore. When the airbag is folded up and accommodated along an upper interior edge of the vehicle, the belt portion can be let out to the distal end portion through the insert hole. Therefore, even if the belt portion is shortened, the distal end portion of the belt portion can be easily fixed on the vehicle, and the belt portion can be shortened so that a high turning torque can be applied to the longitudinal rod portion during inflation. Without degrading the mounting workability on the vehicle, therefore, a high tension can be exhibited on the lower edge of the airbag body at the time of inflation.

Moreover, the construction of the belt portion may be modified in the following manner. The belt portion may be trifurcated to have three end portions. Two of the three end portions of said belt portion are joined proximalat the proximal portion to the upper and lower portions of the circumferential edge of the longitudinal rod portion. The remaining one of the three end portions of the belt portion is fixed at the distal end portion on the vehicle.

The following actions and effects can be obtained when the airbag is constructed as described hereinbefore. When the airbag is to be folded up and accommodated along the upper interior edge side of the vehicle, more specifically, the bifurcated proximal portions of the belt portion on the side of the longitudinal rod portion come closer to each other. Also, the belt portion from the proximal portion to the distal end portion is elongated. Therefore, the distal end portion of the belt portion is easily fixed on the vehicle. When the airbag is developed and inflated, on the other hand, the bifurcated proximal portion is vertically separated by the formation of the longitudinal rod portion. Also, the substantial length of the belt portion from the proximal portion to the distal end portion is reduced. This makes it possible to apply a high turning torque to the longitudinal rod portion. Without degrading the mounting workability on the vehicle, therefore, a high tension can be exhibited at the lower edge of the airbag body at the time of inflation.

The aforementioned second object can be achieved by the airbag for the head protecting airbag system having the following construction. The airbag is folded up and accommodated along the upper interior edge of the vehicle in the interior of a vehicle and is developed and inflated to cover the interior opening. The airbag has an inflatable portion and a gas inlet portion. The inflatable portion is formed into a bag shape, and is inflated to cover an interior opening of the vehicle. The gas inlet portion is arranged on one end side of the front end side or the rear end side of the inflatable portion for introducing an inflation gas into the inflatable portion. On the other hand, the inflatable portion includes a main chamber and upper and lower auxiliary chambers. The main chamber is arranged to extend along a substantially straight path and substantially horizontal direction from the gas inlet portion. The upper and lower auxiliary chambers are arranged over and below the main chamber, respectively, in communication with the end portion of the main inflating chamber, spaced from the gas inlet portion.

In the aforementioned airbag for the head-protecting airbag system, the incoming inflation gas is introduced into the main chamber of the inflatable portion through the gas inlet portion. The inflation gas is further introduced from the main chamber into the upper and lower auxiliary chambers.

Specifically, the main inflating chamber is inflated before the airbag finishes inflating by the inflow of the inflation gas into the upper and lower auxiliary chambers. The main chamber is arranged to extend substantially along a straight path and substantially horizontal direction from the gas inlet portion. Therefore, the main chamber is quickly inflated. On the other hand, the main chamber is arranged long in the longitudinal (fore and aft) direction at the vertically intermediate portion of the upper and lower auxiliary chambers, that is, at the vertically intermediate portion of the inflatable portion. Therefore, the airbag is inflated over a wide area by the main chamber.

In the airbag for the head-protecting airbag system according to the present invention, therefore, the main chamber can be inflated quickly and widely before inflation is complete. In the airbag of the present invention, moreover, the passenger can be quickly and widely restrained by the area of the main chamber before the inflation is complete.

The aforementioned construction of the airbag may be modified in the following manner. An uninflating portion is arranged on the end side of the main chamber, spaced from the gas inlet portion, and extending vertically over the upper and lower auxiliary inflating chambers. On the other hand, the upper and lower auxiliary chambers have inflation gas inlets arranged to confront each other vertically at the end portion of the main chamber, spaced from the gas inlet portion.

The following actions and effects can be obtained when the airbag is constructed as described hereinbefore. Specifically, the inflation gas having passed through the main chamber is vertically separated by the guide of the vertically extending uninflating portion. And, the inflation gas flows through the individual inlets into the upper and lower auxiliary chambers. As a result, the upper and lower auxiliary chambers of the airbag are smoothly inflated.

With the construction thus far described, moreover, as to the inlets of the inflation gas of the upper and lower auxiliary chambers, the opening area of the lower auxiliary chamber is made larger than that of the upper auxiliary chamber.

In this airbag, the lower auxiliary chamber is inflated more quickly than the upper auxiliary chamber. The lower auxiliary chamber is spaced from a peripheral edge of an opening of the vehicle, and can restrain the passenger more smoothly than the upper auxiliary inflating chamber. In this airbag, therefore, it is possible to better improve passenger restraining performance before inflation is complete.

BRIEF DESCRIPTION OF THE DRAWINGS

The following drawings serve to elaborate principles of this invention through the depiction of embodiments of the invention. In such drawings.

DESCRIPTION OF THE PREFERRED EMBODIMENTS

Figure 1:
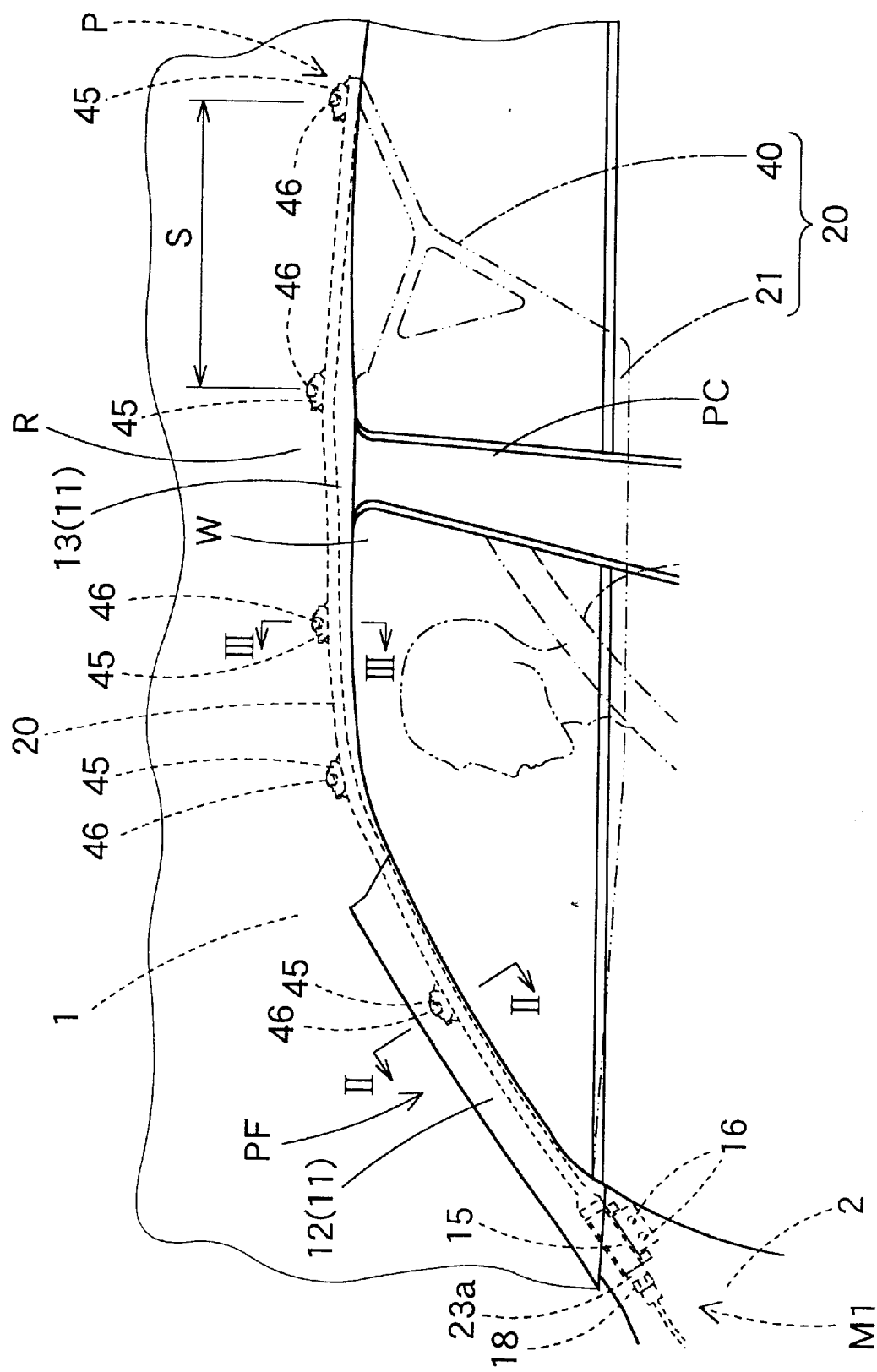
FIG. 1 is a side, partially sectional view of a vehicle showing an airbag in an inflated state in accordance with a first embodiment of the invention.

The invention will now be described in connection with its embodiments with reference to the accompanying drawings. The following description is not exhaustive of the scope of this invention. Rather, modifications and variations as are covered by the appended claims fall within the scope of the invention.

An airbag 20 of a first embodiment, as shown in FIGS. 1 to 8, is employed in a head-protecting airbag system M1. Prior to inflation, the airbag 20 is folded and accommodated on the upper edge portion of the vehicle proximal to opening W of a door or window. Specifically, the airbag 20 is folded and arranged from a front pillar portion PF to a roof side rail portion R. The roof side rail portion R extends rearward from the upper portion of the front pillar portion PF over a center pillar portion PC.

The head-protecting airbag system M1 comprises the airbag 20, an inflator 18, a mounting bracket 15 and an airbag cover 11.

In the illustrated embodiment, the inflator 18 is of the cylinder type, and feeds the folded airbag 20 with an inflation gas. The inflator 18 is sheathed with a later-described joint cylinder portion 23a of the airbag 20.

The mounting bracket 15 can be made of a sheet metal. This mounting bracket 15 mounts the inflator 18 on a side panel 2 with bolts 16. This inflator 18 is sheathed with the joint cylinder portion 23a. The mounting bracket 15 clamps the outer circumference of the joint cylinder portion 23a and mounts the inflator 18 on the side panel 2.

Figure 2:
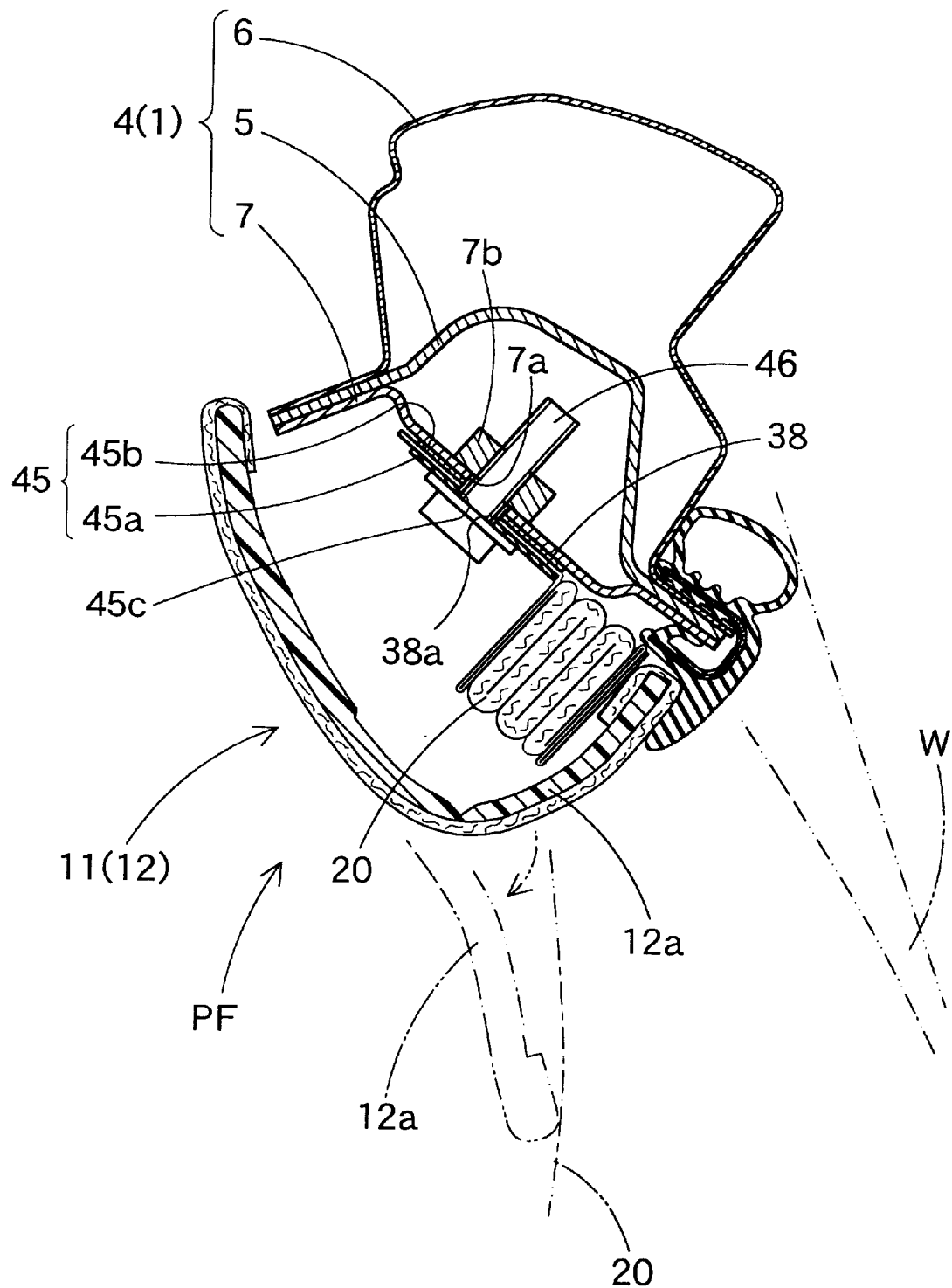
FIG. 2 is an enlarged schematic sectional view taken along sectional line II—II of FIG. 1.
Figure 3:
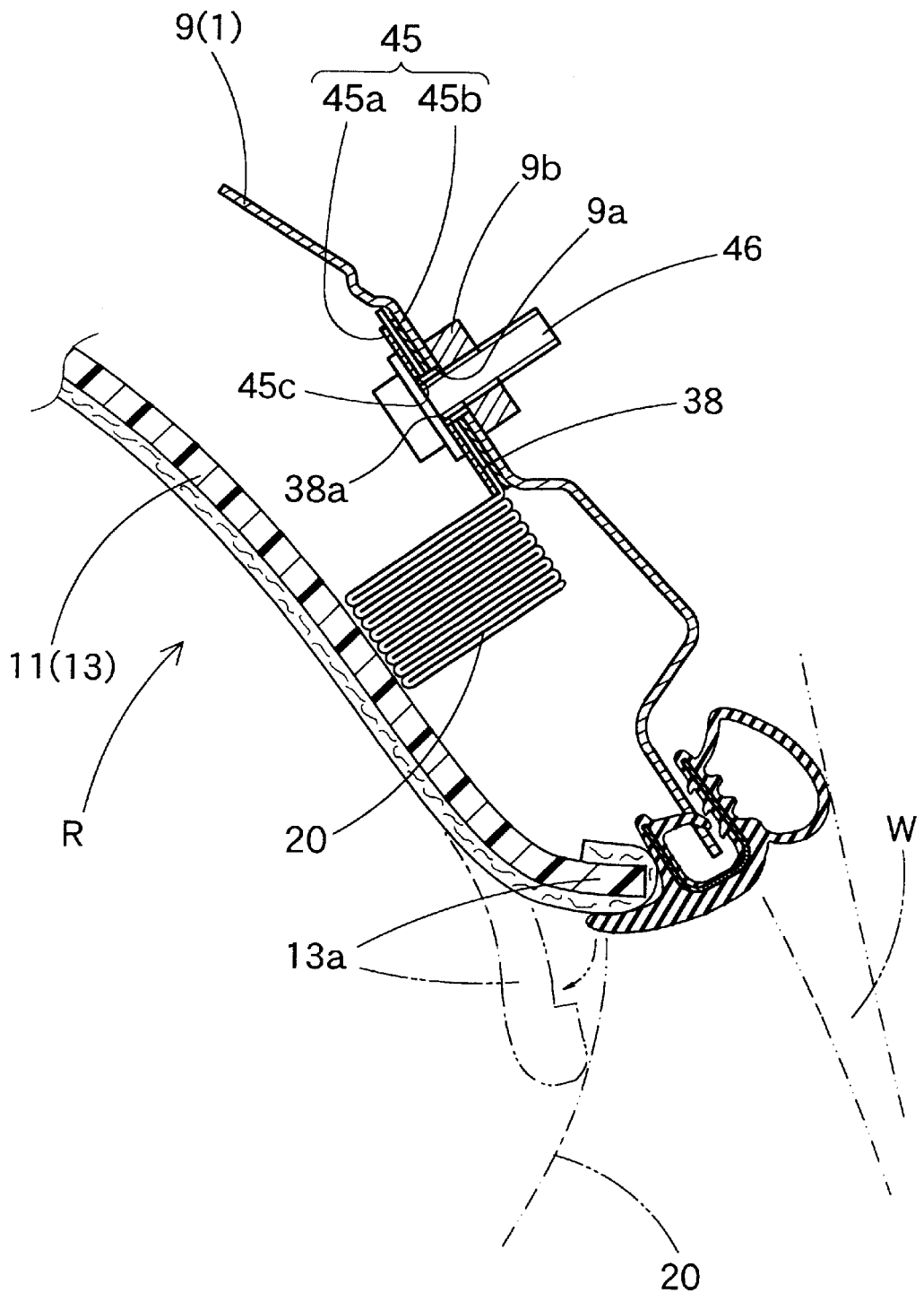
FIG. 3 is an enlarged schematic sectional view taken along section line III—III of FIG. 1.

The airbag cover 11 comprises a front pillar garnish 12 of the front pillar portion PF and a roof interior cover 13 of the roof side rail portion R. The pillar garnish 12 is made of a synthetic resin and is mounted and fixed, as shown in FIGS. 1 and 2, on an inner panel 7 of a front pillar body 4 by mounting means (not shown). The pillar garnish 12 has a door portion 12a on its lower edge side. This door garnish 12a is opened by inflation of the airbag 20 to thereby create a passageway for passage of the airbag 20. The roof interior cover 13 is also made of a synthetic resin and is mounted and fixed, as shown in FIGS. 1 and 3, on a roof side rail body 9 of a sheet metal by mounting means (not shown). Moreover, the roof interior cover 13 has a door portion 13a on its lower edge side. This door portion 13a is opened by the inflating airbag 20 during the inflating operation so as to create a passageway for the inflating airbag 20 to pass through. Here, the front pillar body 4 (FIG. 2) comprises a reinforcement panel 5, an outer panel 6 and the inner panel 7, all of which are individually made of sheet metal. Moreover, the front pillar body 4, the roof side rail body 9, and the side panel 2 collectively form body 1.

As shown in FIGS. 1 to 8, the airbag 20 comprises an airbag body 21 and a belt portion 40 each having flexibility. The airbag body 21 is formed into a bag shape by any material known in the art for such use, such as hollow-weaving polyamide yarns or the like. The belt portion 40 is joined to the rear end portion of the airbag body 21.

Figure 4:
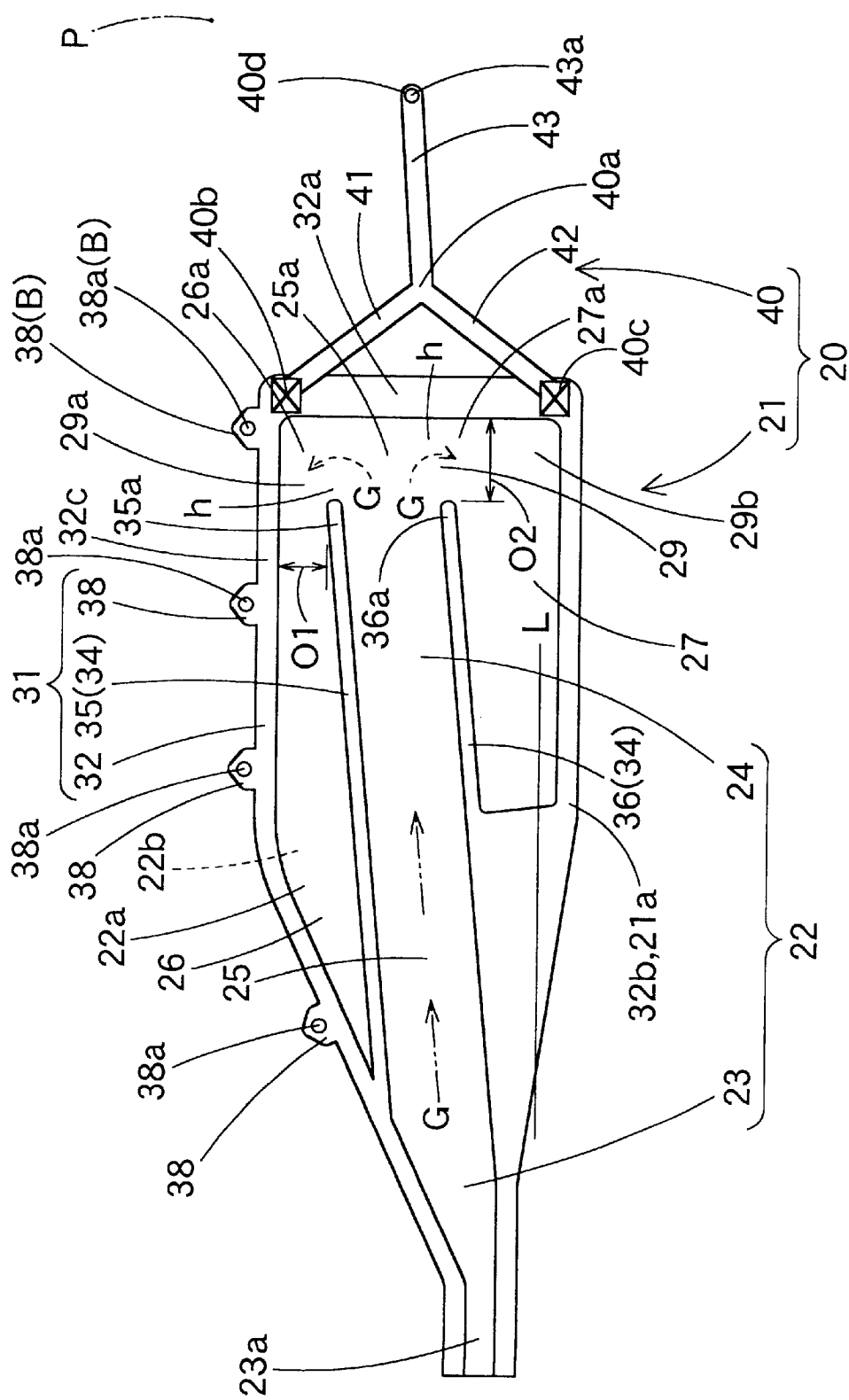
FIG. 4 is a front elevation showing a developed state at an uninflated time of the airbag in accordance with the first embodiment.
Figure 7:
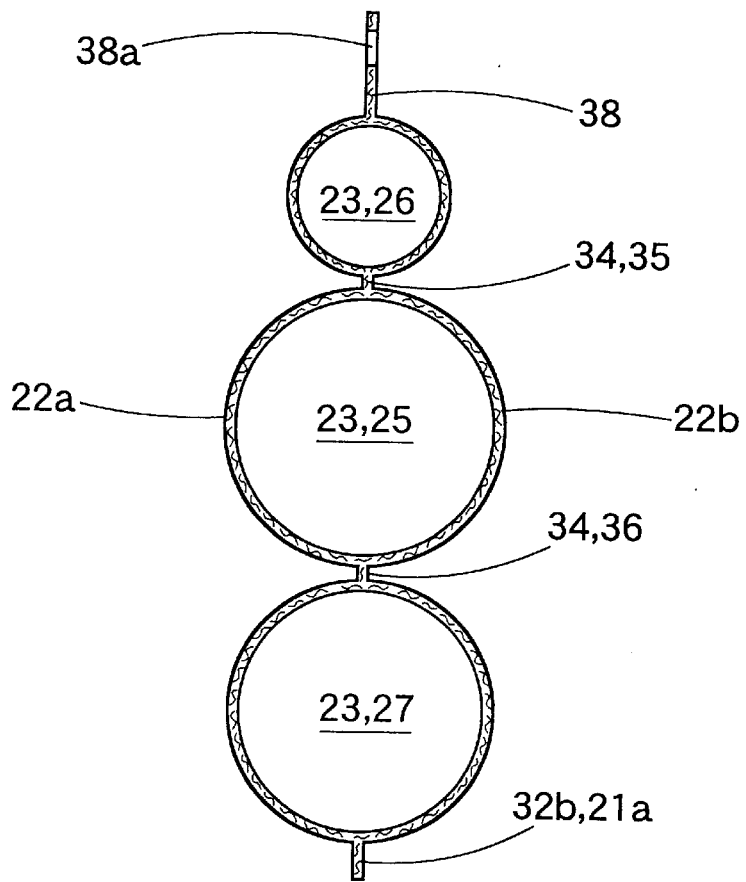
FIG. 7 is a longitudinal section showing the airbag in accordance with the first embodiment in the inflated state and presents an enlarged section of a portion VII—VII of FIG. 6.
Figure 8:
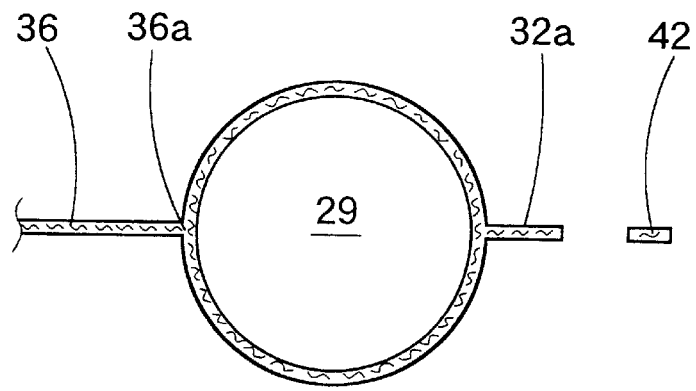
FIG. 8 is an end view showing the airbag in accordance with the first embodiment in the inflated state and presents an enlarged section of a portion VIII—VIII of FIG. 6.

The airbag body 21 comprises an inflating portion 22 and an uninflating portion 31. The inflating portion 22 admits the inflation gas G from the inflator 18 to separate inner and outer side wall portions 22a and 22b (as shown in FIGS. 4 and 7) from each other. In other words, the inflating portion 22 admits the inflation gas and is thereby expanded. Moreover, the inflating portion 22 develops the airbag body 21 from the folded state to the expanded state. The uninflating portion 31 does not admit the inflation gas. As a result, the uninflating portion 31 does not increase in size via inflation. Here, the airbag body 21 is hollow-woven to form the individual portions 22 and 31, and silicone or the like may then be applied to the surface of the airbag body 21 to enhance the heat resistance and the sealing properties of the airbag body 21.

The inflating portion 22 comprises a gas inlet portion 23 and an inflatable portion 24. The inflatable portion 24 is shaped to expand, when the airbag 20 is inflated, thereby covering the center pillar portion PC and the inner opening W. Moreover, the inflatable portion 24 has a longitudinal rod portion 29 arranged on its rear end portion.

The gas inlet portion 23 is arranged on the front end portion of the inflatable portion 24. This gas inlet portion 23 is formed into such a cylindrical shape as to introduce the inflation gas into the inflatable portion 24. The leading end of the gas inlet portion 23 forms the joint cylinder portion 23a for inserting the inflator 18 thereinto. This inflator 18 is sheathed with the joint cylinder portion 23a. Moreover, the joint cylinder portion 23a is joined to the inflator 18 by clamping it on the inflator 18 by the mounting bracket 15. Here, an inner tube may be additionally fixed on the inner circumference of the gas inlet portion 23 including the joint cylinder portion 23a, so as to ensure the heat resistance. The additional inner tube may be made of the same material as that of the airbag body 21 itself.

The inflatable portion 24 comprises a main inflating chamber 25 and upper and lower auxiliary inflating chambers 26 and 27. The main inflating chamber 25 is arranged to extend linearly obliquely upward and backward from the gas inlet portion 23. The upper and lower auxiliary inflating chambers 26 and 27 are arranged over and below the main inflating chamber 25, respectively. These upper and lower inflating chambers 26 and 27 are in communication with a rear portion 25a of the main inflating chamber 25.

Moreover, the longitudinal rod portion 29 is arranged on the rear end portion of the inflatable portion 24. The longitudinal rod portion 29 is inflated into a substantially vertically cylindrical shape when the inflation gas flows thereinto. The longitudinal rod portion 29 is formed into an area, as hatched in FIG. 5. Specifically, the longitudinal rod portion 29 is arranged between the rear ends 35a and 36a of later-described two regulating portions 34 and 34 (or upper and lower regulating portions 35 and 36) and the rear edge 32a of a later-described peripheral edge portion 32. The uninflating portion 31 comprises the peripheral edge portion 32, the regulating portion 34 and a plurality of mounting portions 38. The peripheral edge portion 32 is arranged at the outer circumferential edge of the gas inlet portion 23 or the inflatable portion 24. The peripheral edge portion 32 is so densely woven that it resists gas leakage. The rear edge 32a of the peripheral edge portion 32 is vertically arranged. The regulating portion 34 is composed of the upper regulating portion 35 and the lower regulating portion 36.

The upper and lower regulating portions 35 and 36 form the upper and lower edges of the main inflating chamber 25. Moreover, the upper and lower regulating portions 35 and 36 define the main inflating chamber 25 and the upper and lower auxiliary inflating chambers 26 and 27. Still moreover, the upper and lower regulating portions 35 and 36 set the inflatable portion 24 at the inflated developed time to a constant thickness. These upper and lower regulating portions 35 and 36 extend to intersect the rear edge 32a of the peripheral edge portion 32. Moreover, the airbag body 21 arranges a clearance h, as shown in FIG. 4, between the rear ends 35a and 36a of the upper and lower regulating portions 35 and 36 and the rear edge 32a.

On the other hand, the rear ends 35a and 36a of the upper and lower regulating portions 35 and 36 determine the opening areas of inlets 26a and 27a for introducing the inflation gas into the upper and lower auxiliary inflating chambers 26 and 27. Moreover, the rear ends 35a and 36a are arranged so that the opening area of the inlet 27a of the lower auxiliary inflating chamber 27 may be larger than that of the inlet 26a of the upper auxiliary inflating chamber 26. Here in this embodiment, as shown in FIG. 4, a distance 01 is shorter than a distance 02. As a result, the opening area of the inlet 27a is larger than that of the inlet 26a. The distance 01 is taken between the rear end portion 35a of the upper regulating portion 35 and an upper edge 32c of the peripheral edge portion 32. The distance 02 is taken between the rear end 36a of the lower regulating portion 36 and the rear edge 32a of the peripheral edge portion 32.

The mounting portions 38 are formed in plurality at the peripheral edge portion 32 on the upper edge side of the gas inlet portion 23 and the inflatable portion 24. Each mounting portion 38 is provided at its center with a mounting hole 38a. Into this mounting hole 38a, there is Inserted a mounting bolt 46. The airbag body 21 is bored after the hollow-weaving work to form the individual mounting holes 38a. On the individual mounting portions 38, as shown in FIG. 1 to 3, there are fixed mounting brackets 45 which are made of a sheet metal. These mounting brackets 45 mount the folded airbag 20 in the body 1 (e.g., the inner panel 7 and the roof side rail body 9).

Each mounting bracket 45 has an interior side inner plate 45a and an exterior side outer plate 45b. These inner and outer plates 45a and 45b are provided with mounting holes 45c corresponding to the mounting holes 38a of the individual mounting portions 38. When each mounting bracket 45 is to be mounted on the mounting portion 38, this mounting portion is arranged at first between the inner and outer plates 45a and 45b. Then, these inner and outer plates 45a and 45b are so partially deformed plastically as to joint each other and are mounted on each mounting portion 38. As shown in FIGS. 2 and 3, the mounting bolt 46 is inserted into the mounting holes 45c and 38a and is fastened into nuts 7b and 9b. These nuts 7b and 9b are fixed on the circumferential edges of mounting holes 9a and 7a of the inner panel 7 and the roof side rail body 9. As a result, the folded airbag body 21 is mounted in the body 1 by those bolts 46.

The belt portion 40 is formed of a woven fabric of flexible polyamide yarns or the like. The belt portion 40 is trifurcated to have three joint fingers 41, 42 and 43. These joint fingers 41, 42 and 43 are joined at an intersection 40a. In the belt portion 40, the end portions of the two joint fingers 41 and 42 spaced from the intersection 40a are located on the sides of proximal portions 40b and 40c. The proximal portions 40b and 40c are joined to the circumferential edge of the longitudinal rod portion 29. Specifically, the proximal portions 40b and 40c are stitched and joined to the upper and lower portions of the rear edge 32a of the peripheral edge portion 32. In the belt portion 40, on the other hand, the end portion of the remaining joint finger 43 spaced from the intersection 40a is located on the side of a distal end portion 40d. The distal end portion 40d is fixed on the roof side rail body 9 of the vehicle proximal to the opening W by means of the bolts 46.

Here, the distal end portion 40d is provided with a mounting hole 43a for inserting the bolt 46 thereinto. The distal end portion 40d is equipped with the mounting bracket 45 capable of inserting the bolt 46 thereinto. Moreover, the individual joint fingers 41, 42 and 43 are substantially the same length.

Figure 5:
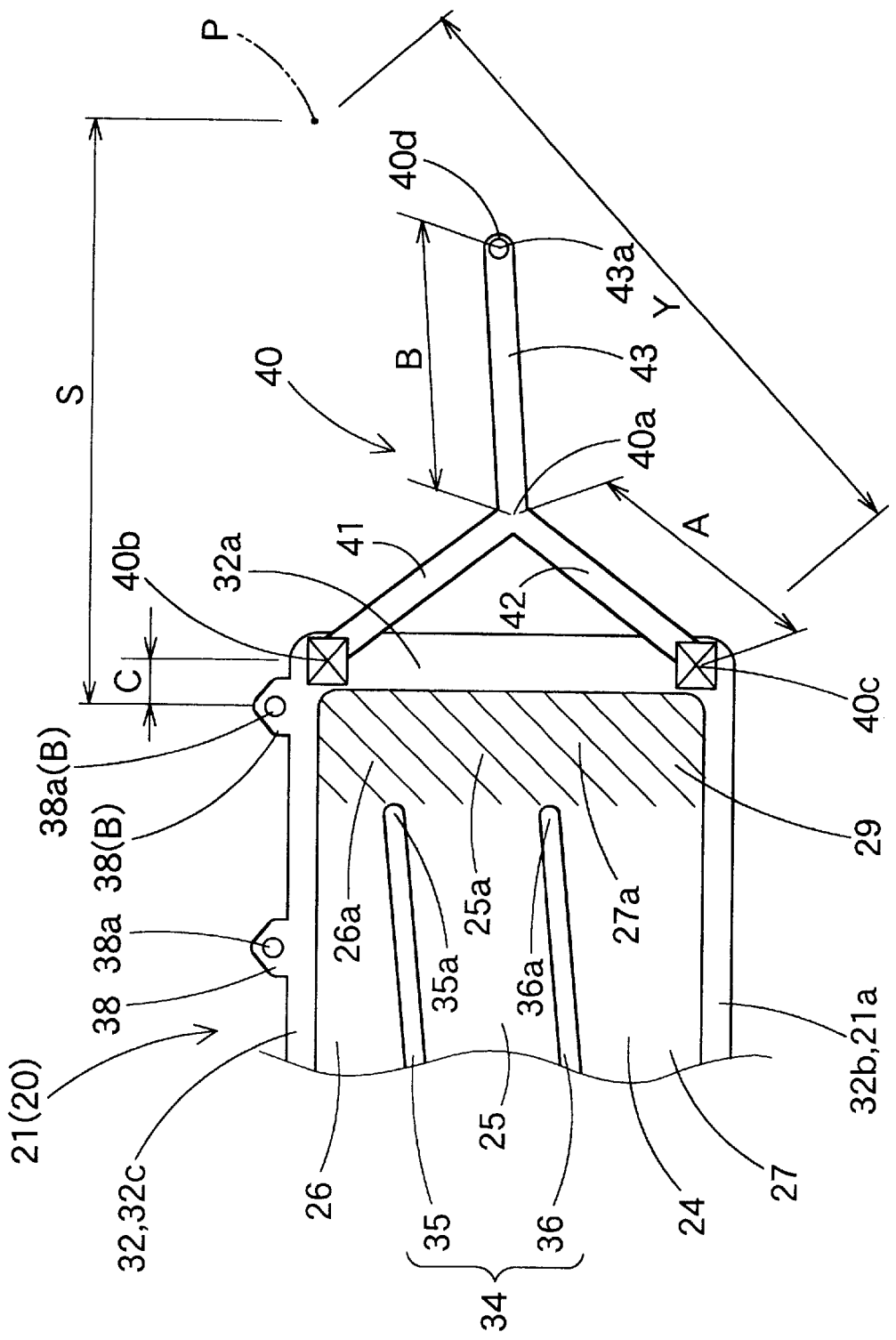
FIG. 5 is an enlarged front elevation of a vicinity of the belt portion and shows a developed state at the uninflated time in accordance with the airbag of the first embodiment.

Moreover, the belt portion 40 is given a length corresponding to when its joint fingers 41 and 42 are brought as close to each other as to overlap each other so that it is extended straight from the proximal portions 40b and 40c to the distal end portion 40d. At this time, more specifically, the belt portion 40 has a length X0 (X0=A+B) (as shown in FIG. 5) smaller than the distance Y at the time when the airbag body 21 is set in a predetermined state. In this predetermined state, the airbag body 21 is mounted in the vehicle and is deflated (i.e., without any feed of the inflation gas). Moreover, the distance Y at this time is a distance from the lower proximal portion 40c to a portion P at which the distal end portion 40d is fixed on the peripheral edge of the opening W. In this embodiment, the length X0=410 mm, and the distance Y=470 mm.

Here, this length X0 is so set that a length Z=X0+C is substantially equal to or larger than a predetermined mounting span S (as shown in FIG. 1) (that is, S≦Z=X0+C). This setting is made so that the folded airbag 20 may be fixed without fail on the vehicle by means of the bolts 46. Here, the mounting span S is a distance between the mounting portion 38 (B) of the rear end portion of the airbag body 21 and the distal end portion 40d of the joint finger 43 (that is, the distance between the fixed portions of the airbag 20). On the other hand, the length C is a length in the forward and backward direction between the mounting hole 38a (B) of the rear end portion of the airbag body 21 and the stitched portions 40b and 40c of the joint fingers 41 and 42 to the rear edge 32a.

Here will be described the assembly operation for mounting the airbag 20 on the vehicle. First, the airbag 20 is folded up. For this folding-up, the airbag 20 in the uninflated developing state, as shown in FIG. 4, is folded in a bellows shape from its lower to upper edge side. Then, the folds are formed along a line L in parallel with the lower edge 32b of the peripheral edge portion 32 in the uninflating portion 31.

Then, the airbag body 21 thus folded up is wound at a predetermined interval with a breakable tape so that it may not collapse (or may not be unfolded to restore the developing shape).

After folding-up the airbag body 21, the individual mounting portions 38 and the distal end portion 40d of the joint finger 43 are pulled out. Then, the mounting brackets 45 are attached to the individual mounting portions 38 and the distal end portion 40d. The joint cylinder portion 23a is pulled out, and the inflator 18 is inserted into the joint cylinder portion 23a. Moreover, the mounting bracket 15 is attached to the outer circumference of the joint cylinder portion 23a to prepare an airbag assembly. Thus, a standby state is established for awaiting the mounting on the vehicle.

After this, the mounting bracket 15 is arranged at a predetermined position of the side panel 2 and is fixed on the side panel 2 by means of the bolts 16. Each mounting bracket 45 is arranged at a predetermined position of the inner panel 7 and the roof side rail body 9 and is fixed on the inner panel 7 and the roof side rail body 9 by means of bolts 46. Moreover, the pillar garnish 12 and the roof interior cover 13 are mounted on the body 1. As a result, the head protecting airbag system M1 is mounted to the vehicle.

Here, the distal end portion 40d of the belt portion 40 can be fixed without fail on the roof side rail body 9 by means of the bolts 46, because the length X0 of the belt portion 40 satisfies the relations of S≦Z=X0+C with respect to the mounting span S.

When the inflator 18 is activated, after the airbag 20 is mounted to the vehicle, it feeds the inflatable portion 24 with the inflation gas through the gas inlet portion 23. Then, the airbag body 21 breaks the winding tape (not shown). Then, the airbag body 21 pushes the pillar garnish 12 and the roof interior cover 13 to open the individual door portions 12a and 13a. Moreover, the airbag body 21 is inflated to such a size as to cover the opening W, as indicated by the double-dotted lines in FIGS. 1 to 3.

In the airbag 20 in accordance with the first embodiment, the inflatable portion 24 is developed and inflated by the inflation gas G so that the longitudinal rod portion 29 is arranged in the substantially vertical direction. Then, the belt portion 40 pulls the longitudinal rod portion 29. Specifically, the longitudinal rod portion 29 is pulled on the side of its lower end 29b to turn on the side of its upper end 29a in the longitudinal (fore and aft) direction away from the inflatable portion 24. In other words, the belt portion 40 pulls the longitudinal rod portion 29 to turn the lower end 29b backward.

Figure 6:
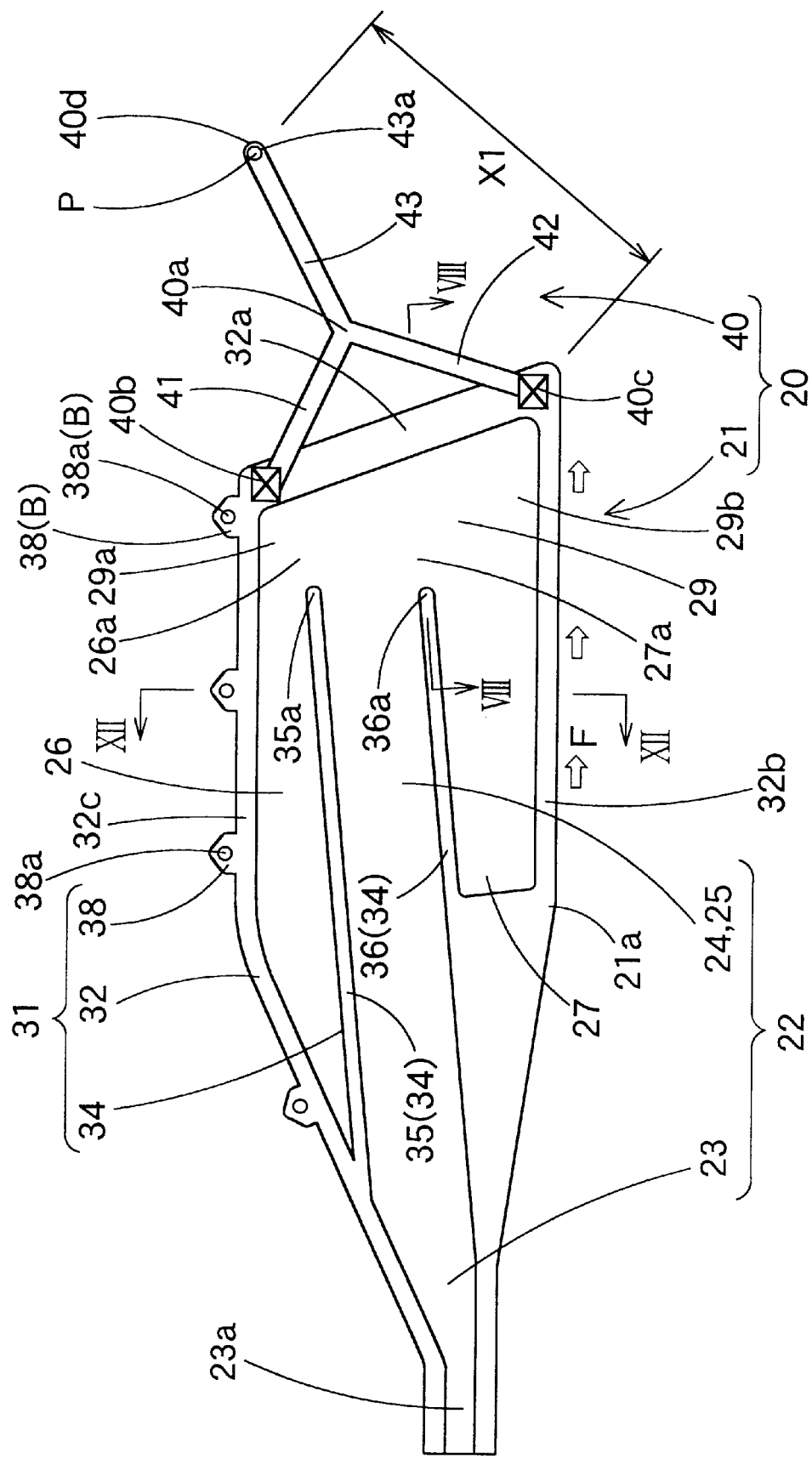
FIG. 6 is a front elevation showing an inflated state of the airbag itself in accordance with the first embodiment.

At this time, the longitudinal rod portion 29 is inflated substantially vertically in the rod shape by the inflation gas G coming thereinto. In short, the longitudinal rod portion 29 takes the shape of a rigid rod member. Then, the longitudinal rod portion 29 is subjected to a turning torque by the belt portion 40. This turning torque acts to turn the lower end 29b on the upper end 29a in the backward direction away from the inflatable portion 24. As a result, a tension F by the belt portion 40 is applied to the lower portion 21a of the airbag body 21, as shown in FIG. 6.

In the airbag 20 of the head protecting airbag system M1 in accordance with the first embodiment, therefore, the tension F can be exhibited especially on the side of the lower portion 21a of the airbag body 21 at the time when the airbag 20 is inflated. Moreover, the airbag 20 can restrain the passenger properly over its entire area.

Moreover, the airbag body 21 is inflated into the interior side of the center pillar portion PC, as shown by the double-dotted lines in FIG. 1. As a result, the airbag body 21 will be supported, even when it restrains the passenger, by the center pillar portion PC, and will barely extend outside of the vehicle.

In the embodiment, the length X0 of the belt portion 40, as extended straight from the proximal portion 40c to the distal end portion 40d, is shorter than the distance Y in the uninflated state. As a result, the belt portion 40 applies the turning torque to the longitudinal rod portion 29 without fail when the airbag 20 is inflated. In other words, the belt portion 40 can apply a high tension to the lower portion 21a of the airbag body 21.

Still moreover, the belt portion 40 of the first embodiment is formed into the trifurcated shape. When the belt portion 40 is folded together with the airbag body 21 and is accommodated in the upper edge portion of the opening W, the bifurcated proximal portions 40b and 40c of the belt portion 40 on the side of the longitudinal rod portion 29 come closer to each other. Then, the length X0 of the belt portion 40 including the distal end portion 40d is lengthened. This facilitates the fixing of the distal end portion 40d of the belt portion 40 at the fixing portion P of the peripheral edge of the opening W by using the bolts 46. When the airbag 20 is to be inflated, the bifurcated proximal portions 40b and 40c are vertically separated by the formation of the longitudinal rod portion 29. Then, the joint finger 41 prevents the remaining joint fingers 42 and 43 from becoming straight. Thus, the substantial length X1 (as shown in FIG. 6) of the belt portion 40 becomes shorter than the length X0. As a result, the belt portion 40 imparts a higher turning torque to the longitudinal rod portion 29. Without lowering the mounting workability of the airbag body 21 on the vehicle, therefore, a high tension is established at the lower portion 21a of the airbag body 21.

In the airbag 20 in accordance with the first embodiment, the inflation gas G flows, at its initial stage, into the main inflating chamber 25 of the inflatable portion 24 through the gas inlet portion 23, as shown in FIG. 4. The inflation gas G further flows from the rear portion 25a of the main inflating chamber 25 via the inlets 26a and 27a into the upper and lower auxiliary inflating chambers 26 and 27.

In other words, the main inflating chamber 25 is inflated before the airbag 20 is allowed to complete its inflation by the flow of the inflation gas G into the upper and lower inflating chambers 26 and 27. The main inflating chamber 25 extends straight backward from the gas inlet portion 23. This causes the quick inflation of the main inflating chamber 25. The main inflating chamber 25 is arranged at a vertically intermediate position between the upper and lower inflating chambers 26 and 27. More specifically, the main inflating chamber 25 is arranged long in the longitudinal (fore and aft) direction at an intermediate position in the vertical direction of the inflatable portion 24. This allows the main inflating chamber 25 to be inflated over a wide area.

In the airbag 20 in accordance with the first embodiment, therefore, the main inflating chamber 25 can be inflated quickly and widely before the completion of the inflation. As a result, the airbag 20 is enabled by that area of the main inflating chamber 25 to restrain the passenger properly in a quick action and over a wide area before the completion of the inflation.

In the airbag 20 in accordance with the first embodiment, the upper and lower regulating portions 35 and 36 are arranged in a direction to intersect a rear edge 32a arranged vertically of the peripheral edge portion 32, as shown in FIG. 4. On the side of the rear portion 25a of the main inflating chamber 25, more specifically, there is arranged the rear edge 32a of the uninflating portion 31 which extends vertically over the upper and lower auxiliary inflating chambers 26 and 27. On the side of the rear portion 25a of the main inflating chamber 25, the inlets 26a and 27a of the upper and lower auxiliary inflating chambers 26 and 27 are arranged to confront each other vertically. At the initial stage of the inflow of the inflation gas G, therefore, the inflation gas G having passed through the main inflating chamber 25 is vertically guided by the guide of the vertically extending rear edge 32a. Then, the inflation gas G flows through the inlets 26a and 27a, respectively, into the upper and lower inflating chambers 26 and 27. As a result, the inflation gas G can inflate the upper and lower inflating chambers 26 and 27 with ease.

In the airbag 20 in accordance with the first embodiment, moreover, the inlets 26a and 27a of the upper and lower auxiliary inflating chambers 26 and 27 are made such that the inlet 27a has a larger opening area than that of the inlet 26a. This causes a quicker inflation of the lower inflating chamber 27 than the upper inflating chamber 26. Moreover, the lower inflating chamber 27 provides the area which is located apart from the peripheral edge of the opening W so that it can restrain the passenger more smoothly than the upper inflating chamber 26. As a result, the airbag 20 can better improve passenger restraint before the inflation is complete.

Figure 9:
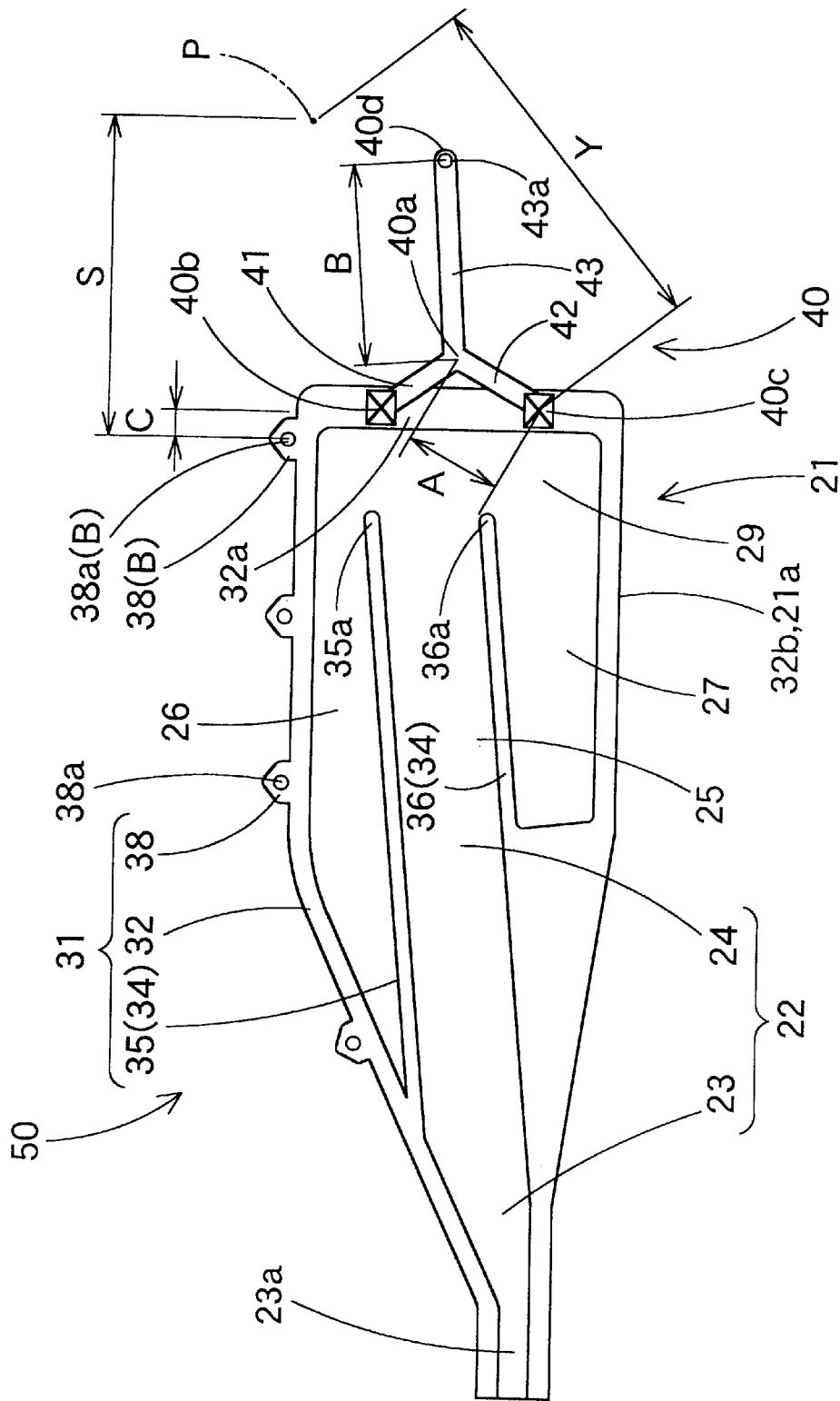
FIG. 9 is a front elevation showing a developed state at an uninflated time of an airbag in accordance with a second embodiment.

Here, when the trifurcated belt portion 40 is employed as in the airbag 20 in accordance with the first embodiment, the three joint fingers 41, 42 and 43 need not be the same length. For example, an airbag 50 according to a second embodiment may be constructed, as shown in FIG. 9. Specifically, the joint fingers 41 and 42 on the side of the proximal portions 40b and 40c may be made shorter than the joint finger 43 on the side of the distal end portion 40d. Similarly to the first embodiment, in the airbag 50 in accordance with the second embodiment, the joint fingers 41 and 42 are brought closer to overlap each other so that the length X0 (X0=A+B) of the belt portion 40 extended from the proximal portions 40b and 40c to the distal end portion 40d is shorter than the distance Y in the uninflated state. In the uninflated state, the airbag body 21 is attached to the vehicle and developed in the uninflated state. Moreover, the distance Y is measured in the uninflated state from the proximal portion 40c on the lower side to the fixing portion P of the distal end portion 40d on the peripheral edge of the opening W. The length X0 is so set that the length Z of X0+C is substantially equal to or larger than the mounting span S (S≦Z=X0+C). This setting is made for fixing the folded airbag 50 reliably to the vehicle by means of bolts 46. The mounting span S is a distance between the fixing portions, i.e., the mounting portion 38(B) of the rear end portion of the airbag body 21 and the distal end portion 40d of the joint finger 43.

Figure 10:
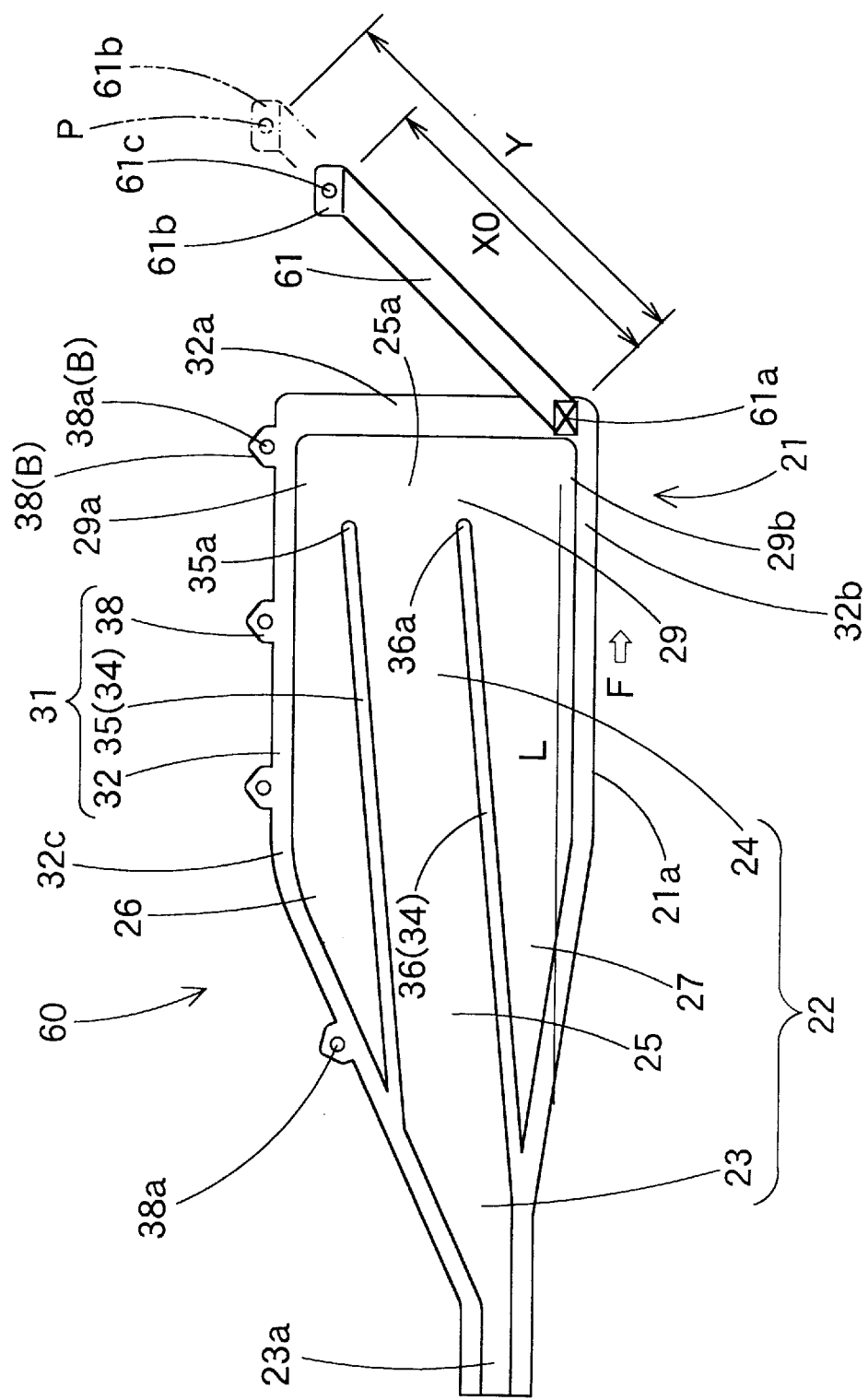
FIG. 10 is a front elevation showing a developed state at an uninflated time in accordance with an airbag of a third embodiment.

Moreover, the belt portion 40 need not be trifurcated but may be modified into one belt portion 61 of an airbag 60 according to a third embodiment, as shown in FIG. 10. In this airbag 60, too, the length X0 of the belt portion 61, as extended straight from a proximal portion 61a to a distal end portion 61b, is shorter than the distance Y in the uninflated state. In the uninflated state, the airbag body 21 is attached to the vehicle and is developed but not inflated. Moreover, the distance Y is taken from the proximal portion 61a to the fixing portion P of the distal end portion 61b on the peripheral edge of the opening.

In the airbag 60 according to the third embodiment, the length X0 of the belt portion 61 is short when the airbag 60 is developed and inflated after being mounted to the vehicle. As a result, the belt portion 61 applies the turning torque reliably to the longitudinal rod portion 29 so that the high tension F may act on the lower portion 21a of the airbag body 21. The belt portion 61 and the airbag body 21 are made of a flexible fabric material. As a result, the airbag 60 can be easily mounted on the vehicle proximal to the opening on the interior side of the vehicle even if the belt portion 61 is short. Specifically, the airbag 60 is folded in the bellows shape from the lower portion 32b to the upper portion 32c while forming folds along the line L in parallel with the lower portion 32b of the peripheral portion 32. At this folding time, however, the belt portion 61 and the airbag body 21 are so flexible that the belt portion 61 can be easily pulled out.

Here, the belt portion 61 is provided at its distal end portion 61b with a mounting hole 61c for inserting the mounting bolt 46 thereinto. The mounting bracket 45 is attached to the distal end portion 61b and in the mounting portion 38 having the mounting hole 38a. As a result, the distal end portion 61b is fixed on the vehicle by means of the bolt 46.

Now, when the single belt 61 is employed, the proximal portion 61a is joined to the lower end 29b of the peripheral edge of the longitudinal rod portion 29 rather than the upper end 29b of the longitudinal rod portion 29, because a higher backward turning torque can act on the longitudinal rod portion 29 when the airbag 60 is to be developed and inflated. This turning torque turns the lower end 29b on the upper end 29a away from the inflatable portion 24 in the longitudinal (fore and aft) direction.

Figure 11:
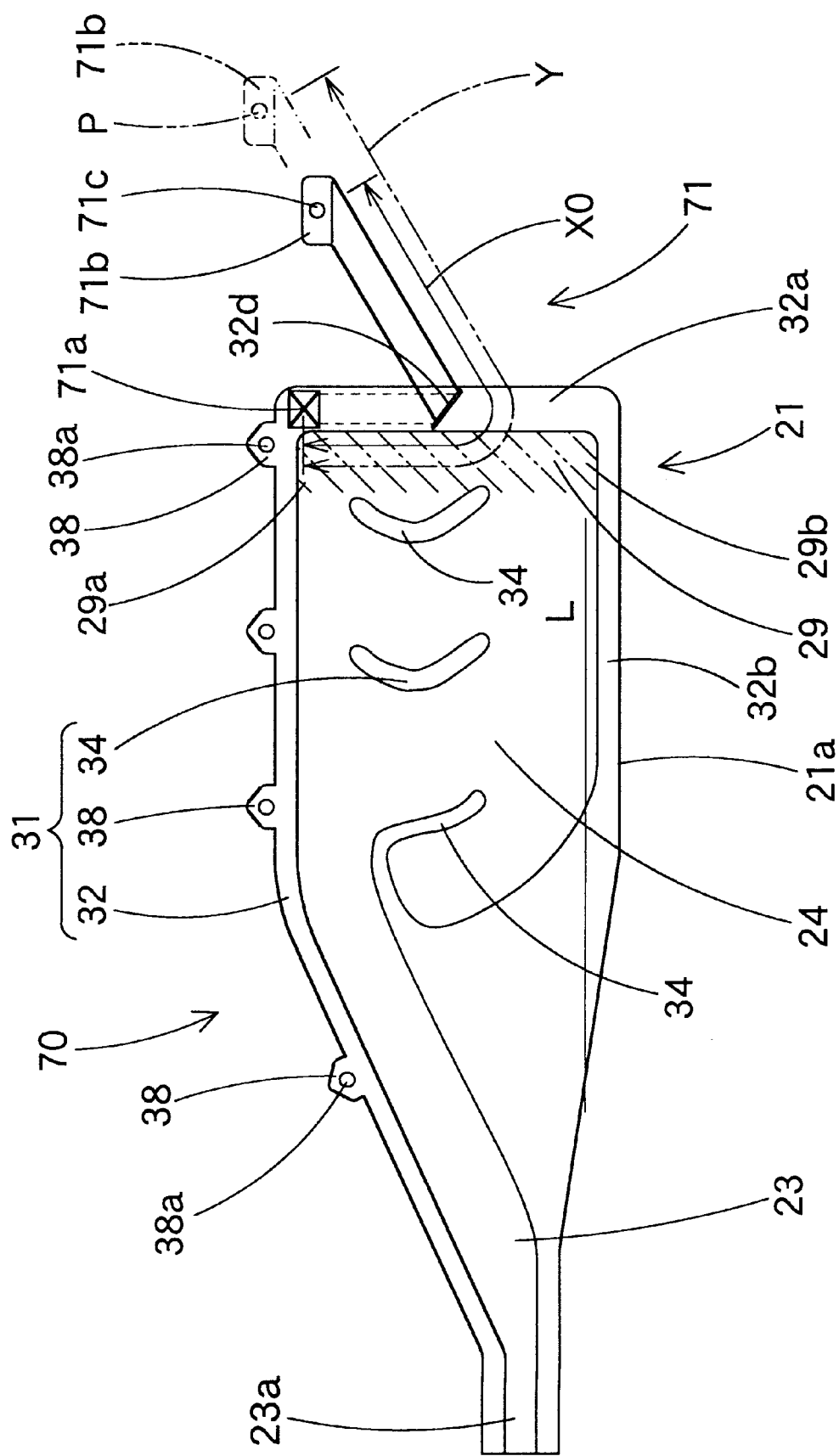
FIG. 11 is a front elevation showing a developed state at an uninflated time of an airbag in accordance with a fourth embodiment.

When the single belt portion is employed, moreover, the airbag may be constructed, as designated by 70 in FIG. 11, according to a fourth embodiment. This airbag 70 is provided with an insert hole 32d in the peripheral edge portion 32 (i.e., the rear edge 32a) on the side of the lower end 29b of the longitudinal rod portion 29. A belt portion 71 is joined at its proximal portion 71a to the peripheral edge of the upper end 29a of the longitudinal rod portion 29. A distal end portion 71b is fixed through the insert hole 32d on the fixing portion P of the peripheral edge of the opening of the vehicle.

Similarly to the other embodiments, in the airbag 70, the length X0 of the belt portion 71, as extended straight from the proximal portion 71a to the distal end portion 71b, is set smaller than the distance Y in the uninflated state. In this uninflated state, the airbag body 21 is mounted in the vehicle and is developed but uninflated. Moreover, the distance Y is measured from the proximal portion 71a through the insert hole 32d to the fixing portion P of the distal end portion 71b on the peripheral edge of the opening.

The airbag 70 is also folded into the bellows shape from the lower edge 32b of the peripheral edge portion 32 to the upper edge 32c while forming folds along the line L in parallel with the lower edge 32b and is then accommodated in the peripheral edge of the opening. At this folding time, the belt portion 71 can be let off through the insert hole 32d toward the distal end portion 71b. As a result, the belt portion 71 can be easily Joined at its distal end portion 71b, even if its whole length X0 is shorter than the length Y, to the fixing portion P of the peripheral edge of the opening. Due to the short length X0, moreover, the belt portion 71 applies a high turning torque to the longitudinal rod portion 29 when the airbag 70 is developed and inflated.

In the airbag 70, therefore, a high tension may be established at the lower portion 21a of the airbag body 21 being developed and inflated, without degrading the mounting workability on the vehicle.

Here, the belt portion 71 is provided at its distal end portion 71b with a mounting hole 71c for inserting the mounting bolt 46 thereinto. Like the mounting portion 38 having the mounting hole 38a, the mounting bracket 45 is attached to the distal end portion 71b. As a result, the distal end portion 71b is fixed on the vehicle by means of the bolt 46.

The insert hole 32d is desirably arranged to joint the lower end 29b on the peripheral edge of the longitudinal rod portion 29, because the backward turning torque acts highly on the longitudinal rod portion 29 when the airbag 60 is developed and inflated. Specifically, the belt portion 71 pulls the lower end 29b to turn on the upper end 29a away from the inflatable portion 24 in the backward direction.

Here, the regulating portion 34, as provided in the airbag body 21 of the fourth embodiment, is doglegged so as to protrude its vertical intermediate portion forward. This shape may be used so long as the regulating portion 34 can give the inflatable portion 24 a predetermined thickness.

Figure 12:
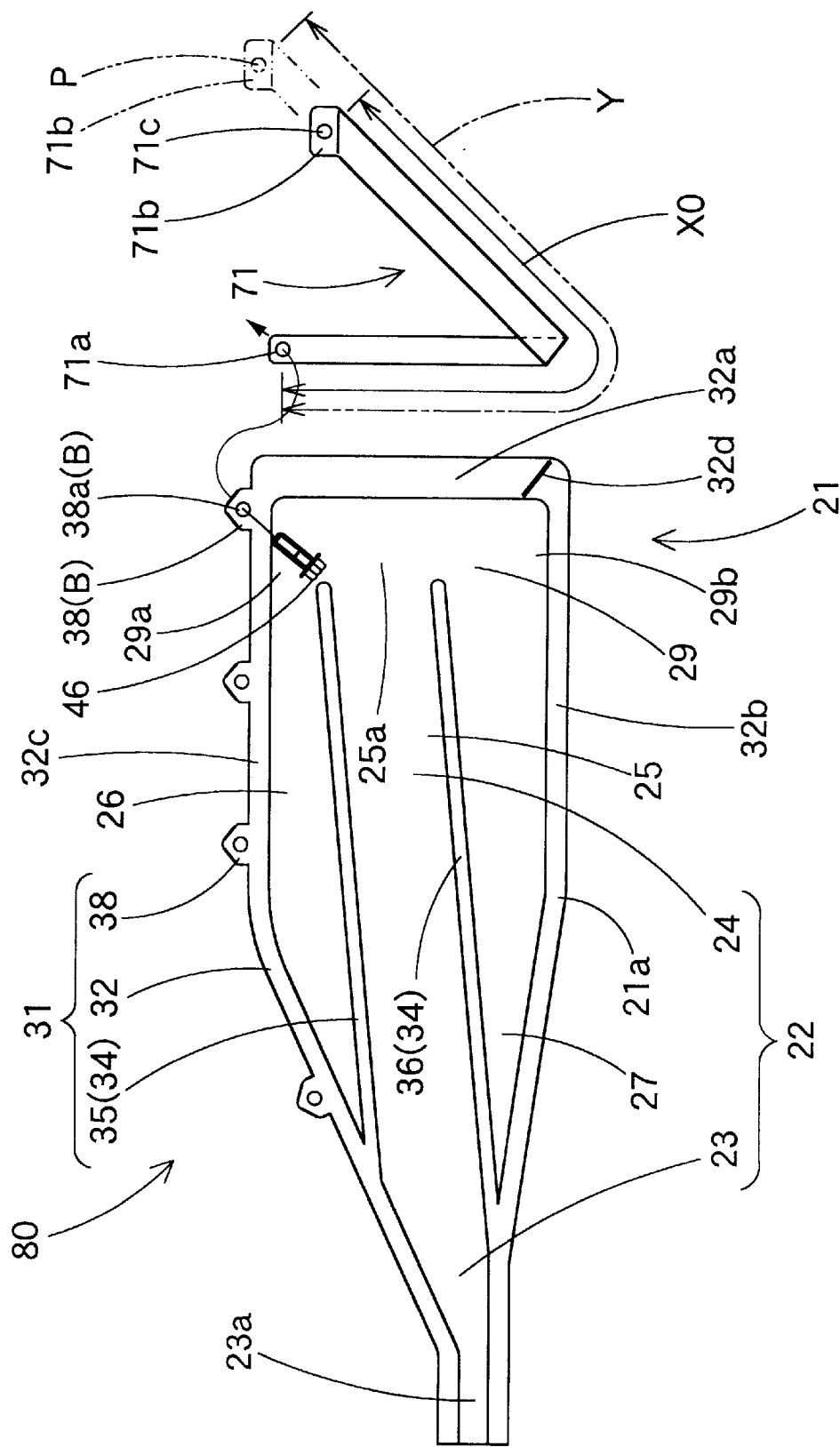
FIG. 12 is a front elevation showing a developed state at an uninflated time of an airbag in accordance with a fifth embodiment.

In the airbag 70, still Moreover, the belt portion 71 is stitched at its proximal portion 71a to the peripheral edge of the longitudinal rod portion 29. As shown in FIG. 12, however, the airbag 70 may be modified to have a construction of an airbag 80 in accordance with a fifth embodiment. This belt portion 71 is fixed at its proximal portion 71a together with the mounting portion 38(B), as located on the rear end side, on the body 1 when the mounting bolt 46 is employed. Moreover, the proximal portion 71a is joined to the peripheral edge on the side of the upper end 29a of the longitudinal rod portion 29.

Figure 13:
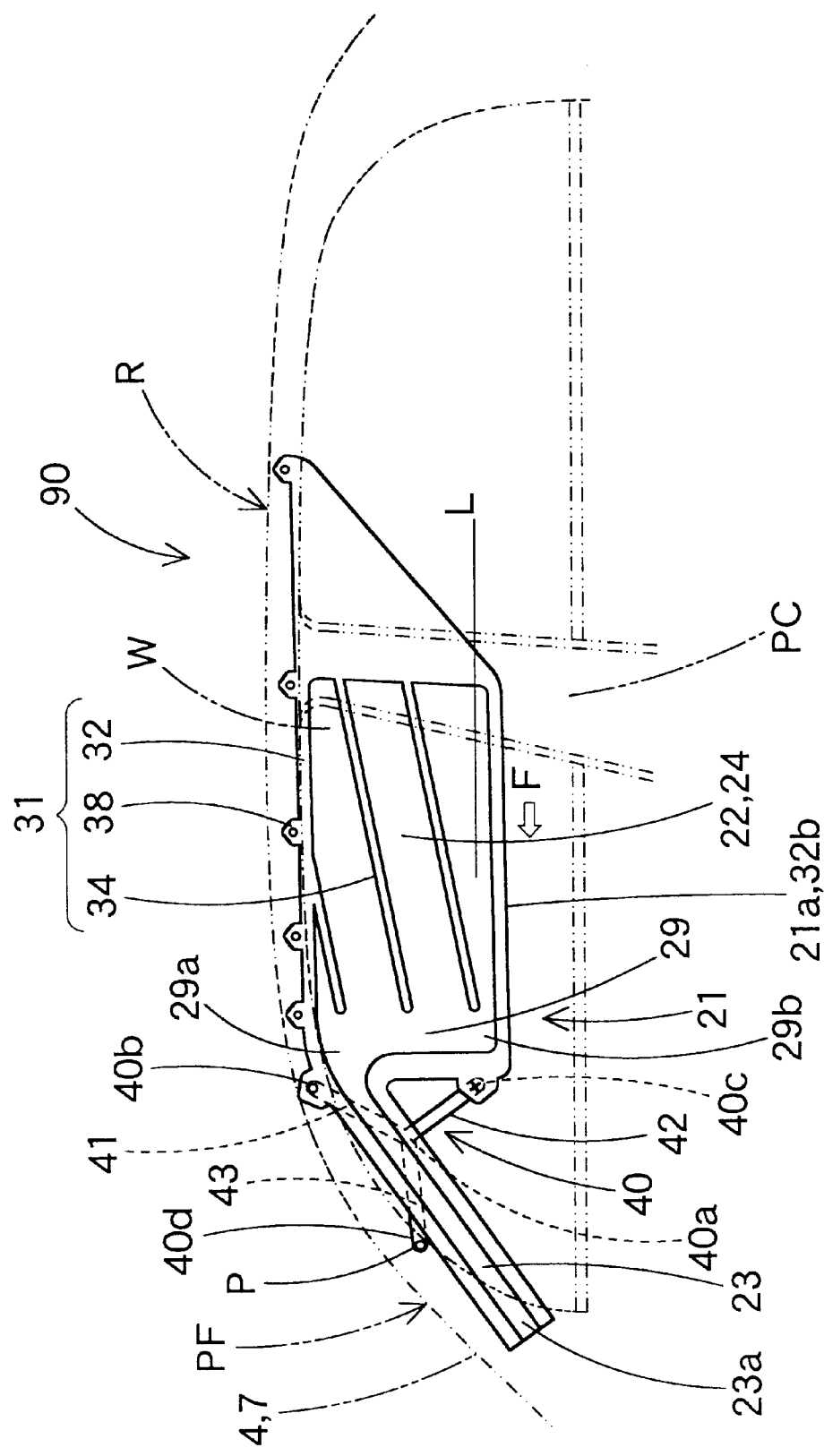
FIG. 13 is a front elevation showing a developed state at an uninflated time of an airbag in accordance with a sixth embodiment.

Still moreover, the longitudinal rod portion 29 may be arranged not on the rear end side of the airbag body 21 but on the front end side of the airbag body 21. In an airbag 90 according to a sixth embodiment, as shown in FIG. 13, the longitudinal rod portion 29 is arranged on the front end side of the inflatable portion 24 in the airbag body 21.

Similarly to the other embodiments, the airbag 90 has a trifurcated belt portion 40. Moreover, the joint fingers 41 and 42 of the belt portion 40 are joined at their proximal portions 40b and 40c to the upper and lower portions of the peripheral edge of the longitudinal rod portion 29. The remaining joint finger 43 is joined at its distal end portion 40d to the inner panel 7 of the front pillar body 4.

This airbag 90 is also folded upward in the bellows shape while forming folds along the line L in parallel with the lower edge 32b, and is accommodated in the peripheral edge of the opening W. However, the belt portion 40 is trifurcated. At the folding time, therefore, the proximal portions 40b and 40c of the belt portion 40 on the side of the longitudinal rod portion 29 come closer to each other. Moreover, the length of the belt portion 40 including its distal end portion 40d is increased in the straightened state. As a result, the belt portion 40 can be easily fixed at its distal end portion 40d on the fixing portion P of the peripheral edge of the opening W by means of the bolt 46. On the other hand, when the airbag 90 is developed and inflated, the bifurcated proximal portions 40b and 40c are vertically separated by the formation of the longitudinal rod portion 29, thus shortening the substantial length of the belt portion 40 from the proximal portions 40b and 40c to the distal end portion 40d. As a result, the belt portion 40 applies a high turning torque for pulling the lower end 29b forward, to the longitudinal rod portion 29.

In this airbag 90, therefore, the high tension F can also be established at the lower edge 21a of the airbag body 21 being developed and inflated, without degrading the mounting workability on the vehicle.

When the longitudinal rod portion 29 is disposed on the front end side of the inflatable portion 24, the trifurcated belt portion 40 may naturally be modified by jointing the single belt portion 61 or 71 shown in FIG. 10 or 12.

In the airbags 20, 50, 60, 70, 80 and 90 of the individual embodiments, the airbag body 21 is manufactured by the hollow-weaving method. However, the airbag body may also be formed by stitching or adhering the outer peripheral edges of two fabric materials to each other, or alternatively by folding one sheet of fabric material in two and by stitching or adhering the peripheral edges to each other.

In the individual embodiments, moreover, the airbags 20, 50, 60, 70, 80 and 90 are exemplified by arranging them over the front pillar portion PF and the roof side rail portion R. However, the airbags may also be arranged over the rear pillar portion and the roof side rail portion R of the rear portion of the vehicle. In these modifications, for example, the shown Individual airbags 20, 50, 60, 70, 80 and 90 may be arranged in the reverse of the longitudinal (fore and aft) direction.

Still moreover, the airbags may be arranged over the center pillar portion PC and the roof side rail portion R extending forward or backward from above the center pillar portion PC.

Moreover, the airbag may be constructed, as designated by 100 in FIGS. 14 to 18, according to a seventh embodiment. This airbag 100 is provided with an airbag body 101 and a belt portion 120, which are made individually flexible. The airbag 100 is further provided with a cover portion 113. This cover portion 113 is arranged in a triangular area extending from the circumferential edge of a longitudinal rod portion 109 to the vicinity of a distal end portion 120d of the belt portion 120. The cover portion 113 holds a portion in the vicinity of the distal end portion 120d of the belt portion 120 movably in the axial direction thereof.

Here, the airbag body 101 is formed into a bag shape by the hollow-weaving method using polyamide yarns or the like. The belt portion 120 is joined to the rear end side of the airbag body 101.

The airbag body 101 is provided with an inflating portion 102 and an uninflating portion 111. The inflating portion 102 is developed from the folded state and inflated by the inflow of the inflation gas from the inflator 18 increasing its width. The uninflating portion 111 does not admit the inflation gas. Here, this airbag body 101 may also be coated on its surface with silicone or the like after it was hollow-woven to form the individual portions 102 and 111. The silicone or the like can enhance the heat resistance and the sealing properties of the airbag body 101.

The inflating portion 102 comprises a gas inlet portion 103 and an inflatable portion 104. This inflatable portion 104 is inflated to cover the opening W on the inner side of the vehicle when the airbag 100 is developed and inflated. Similarly to the other embodiments, the inflatable portion 104 covers the center pillar portion PC, when the airbag 100 is developed and inflated.

The inlet portion 103 is formed into a cylindrical shape having an opened front end. The gas inlet portion 103 is arranged on the front end side of the inflatable portion 104. The inflator 18 is inserted into the gas inlet portion 103. Moreover, the gas inlet portion 103 is clamped on the inflator 18 by the mounting bracket 15. As a result, the gas inlet portion 103 is joined to the inflator 18. Here, an inner tube may be additionally fixed on the inflating chamber of the gas inlet portion 103 so as to retain the heat resistance. The inner tube is made of the same material or the like as that of the airbag body 101 itself.

Figure 15:
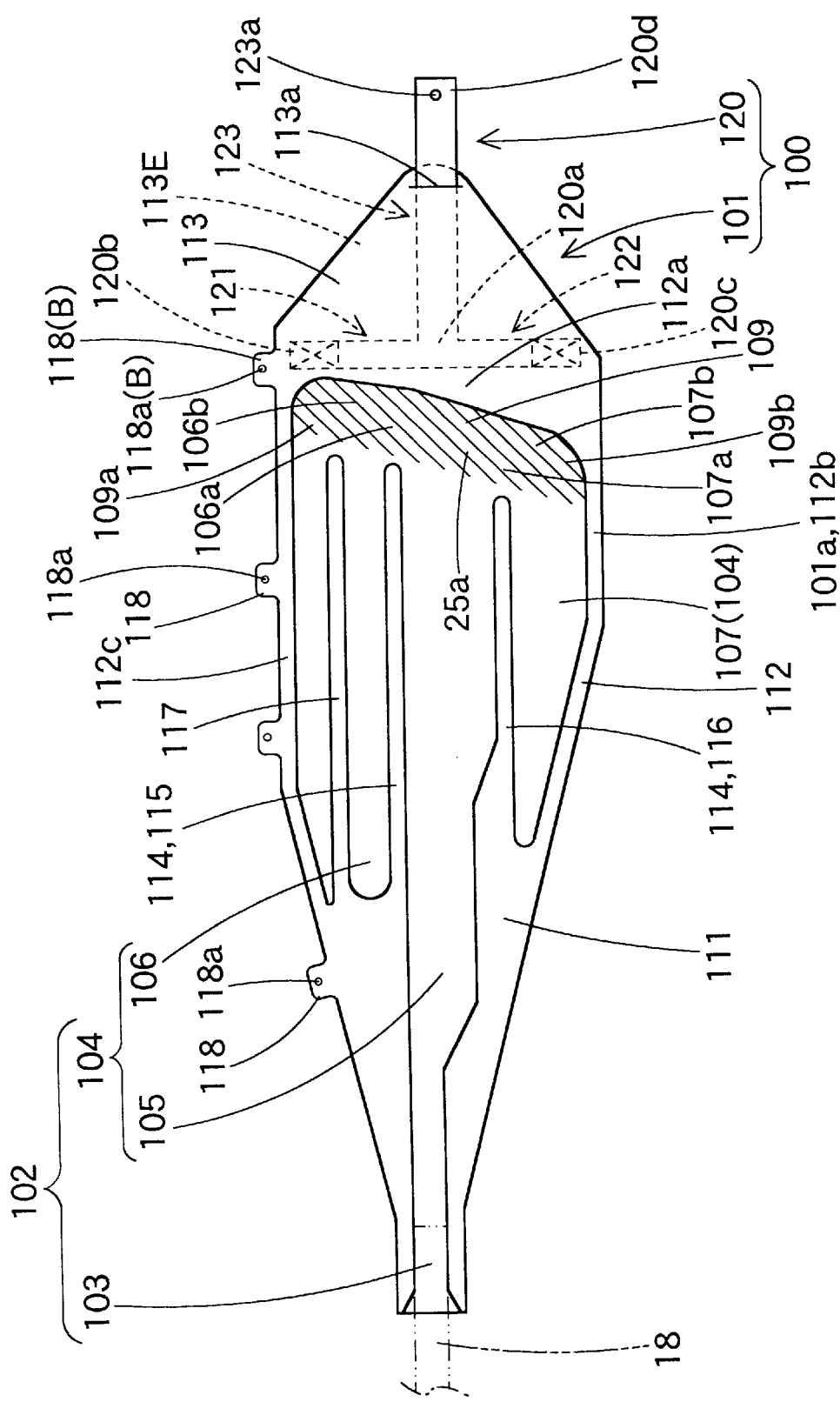
FIG. 15 is a front elevation showing a developed state at an uninflated time of the airbag in accordance with the seventh embodiment.

The inflatable portion 104 comprises a main inflating chamber 105 and upper and lower auxiliary inflating chambers 106 and 107. The main inflating chamber 105 extends straight backward from the gas inlet portion 103. The upper and lower auxiliary inflating chambers 106 and 107 are arranged over and below the main inflating chamber 105 and in communication with a rear portion 105a of the main inflating chamber 105. In this embodiment, moreover, the longitudinal rod portion 109 comprises the rear portion 105a of the main inflating chamber 105 and rear portions 106b and 107b of the upper and lower auxiliary inflating chambers 106 and 107. The longitudinal rod portion 109 is Inflated In a substantially vertical cylinder shape when the Inflation gas flows thereinto. Here, the area of the longitudinal rod portion 109 is arranged in front of a later-described rear edge 112a (or the cover portion 113) of the uninflating portion 111. The area of the longitudinal rod portion 109 in FIG. 15 Is hatched that it can be easily identified.

The uninflating portion 111 comprises a peripheral edge portion 112 and a regulating portion 114. The peripheral edge portion 112 is arranged on the outer circumferential edges of the gas inlet portion 103 and the inflatable portion 104. The peripheral edge portion 112 is woven so densely as prevent gas leaks. The regulating portion 114 is extended backward from the front portion of the peripheral edge portion 112 and arranged in the region of the inflatable portion 104. The regulating portion 114 comprises upper and lower regulating portions 115 and 116 and an upper auxiliary regulating portion 117. The upper and lower regulating portions 115 and 116 define the main inflating chamber 105 and the upper and lower auxiliary inflating chambers 106 and 107. The upper auxiliary regulating portion 117 is arranged to give a predetermined thickness to the upper auxiliary inflating chamber 106. Here, the airbag body 101 is provided with clearances for gas inlets 106a and 107a, respectively, between rear ends 115a and 116a of the upper and lower regulating portions 115 and 116 and the rear edge 112a of the peripheral edge portion 112. The upper and lower auxiliary inflating chambers 106 and 107 admit the inflation gas from those gas inlets 106a and 107a.

Figure 14:
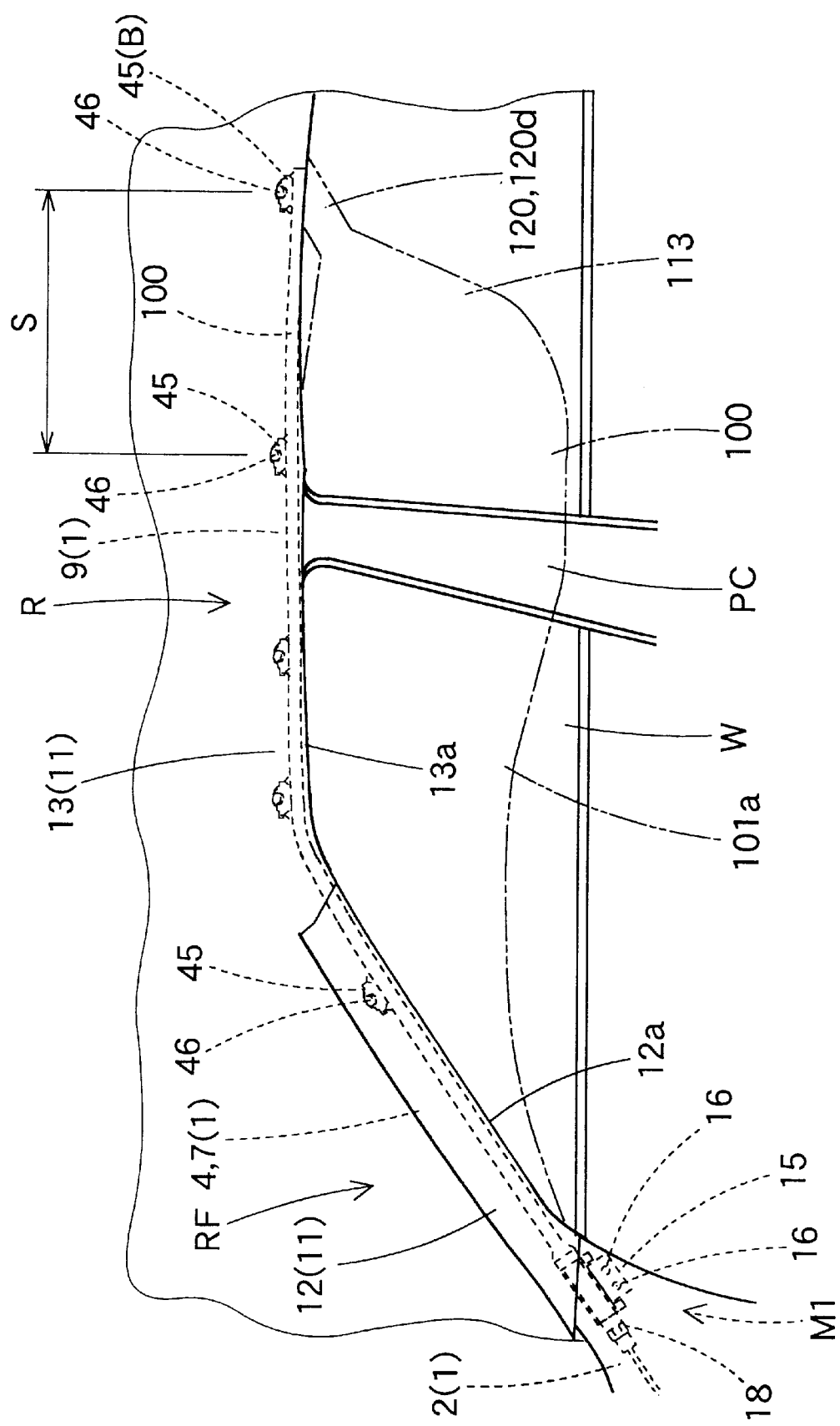
FIG. 14 is a front elevation taken from the inside of a vehicle and shows the state in which an airbag in accordance with a seventh embodiment is accommodated.

On the side of an upper edge 112c of the peripheral edge portion 112, there are formed a plurality of mounting portions 118. Each of these mounting portions 118 is provided with a mounting hole 118a at its center. This mounting hole 118a is bored into the airbag body 101 after the hollow-weaving work. The mounting bolt 46 is inserted (as shown in FIG. 14) into this mounting hole 118a, as in the first embodiment. The mounting bracket 45 is fixed on the mounting portion 118, as in the first embodiment. The folded airbag 100 is mounted in the inner panel 7 and the roof side rail body 9 of the body 1 by means of the brackets 45 and the bolts 46.

Moreover, the rear edge 112a of the peripheral edge portion 112, as apart from the gas inlet portion 103, forms the cover portion 113. This cover portion 113 is formed into a triangular sheet. Moreover, the cover portion 113 is arranged in the triangular area which extends from the rear circumferential edge of the longitudinal rod portion 109 to the vicinity of the later-described distal end portion 120d of the belt portion 120. The cover portion 113 is provided in the vicinity of its rear portion with a slit-shaped insert hole 113a. The distal end portion 120d of the belt portion 120 is inserted into the insert hole 113a. The opening of this insert hole 113a is set slightly larger than the width size of the distal end portion 120d. This setting is made so that the cover portion 113 may hold the distal end portion 120d in the axially movable manner.

The belt portion 120 is formed of a woven fabric of flexible polyamide yarns or the like. The belt portion 120 is trifurcated to have three joint fingers 121, 122 and 123. The joint fingers 121, 122 and 123 are joined at an intersection 120a. This belt portion 120 has proximal portions 120b and 120c on the side of the end portions apart from the intersection 120a of the two joint fingers 121 and 122. These proximal portions 120b and 120c are stitched and joined to the vicinity of the rear circumferential edge of the longitudinal rod portion 109. Specifically, the proximal portions 120b and 120c are stitched to exterior faces 113E above and below the cover portion 113. On the other hand, the belt portion 120 has the distal end portion 120c on the side of the end portion of the remaining joint finger 123 spaced from the intersection 120a. The distal end portion 120d is inserted into the Insert hole 113a of the cover portion 113. Moreover, the distal end portion 120d is fixed by means of the bolts 46 on the roof side rail body 9 or the peripheral edge of the opening W.

Here, this distal end portion 120d is provided with a mounting hole 123a for inserting the bolts 46 thereinto. The mounting bracket 45 is attached to the distal end portion 120d. Moreover, the individual joint fingers 121, 122 and 123 are given the following lengths. Specifically, the joint fingers 121 and 122 are given an equal length, and the joint finger 123 is made longer than the joint fingers 121 and 122.

Figure 16:
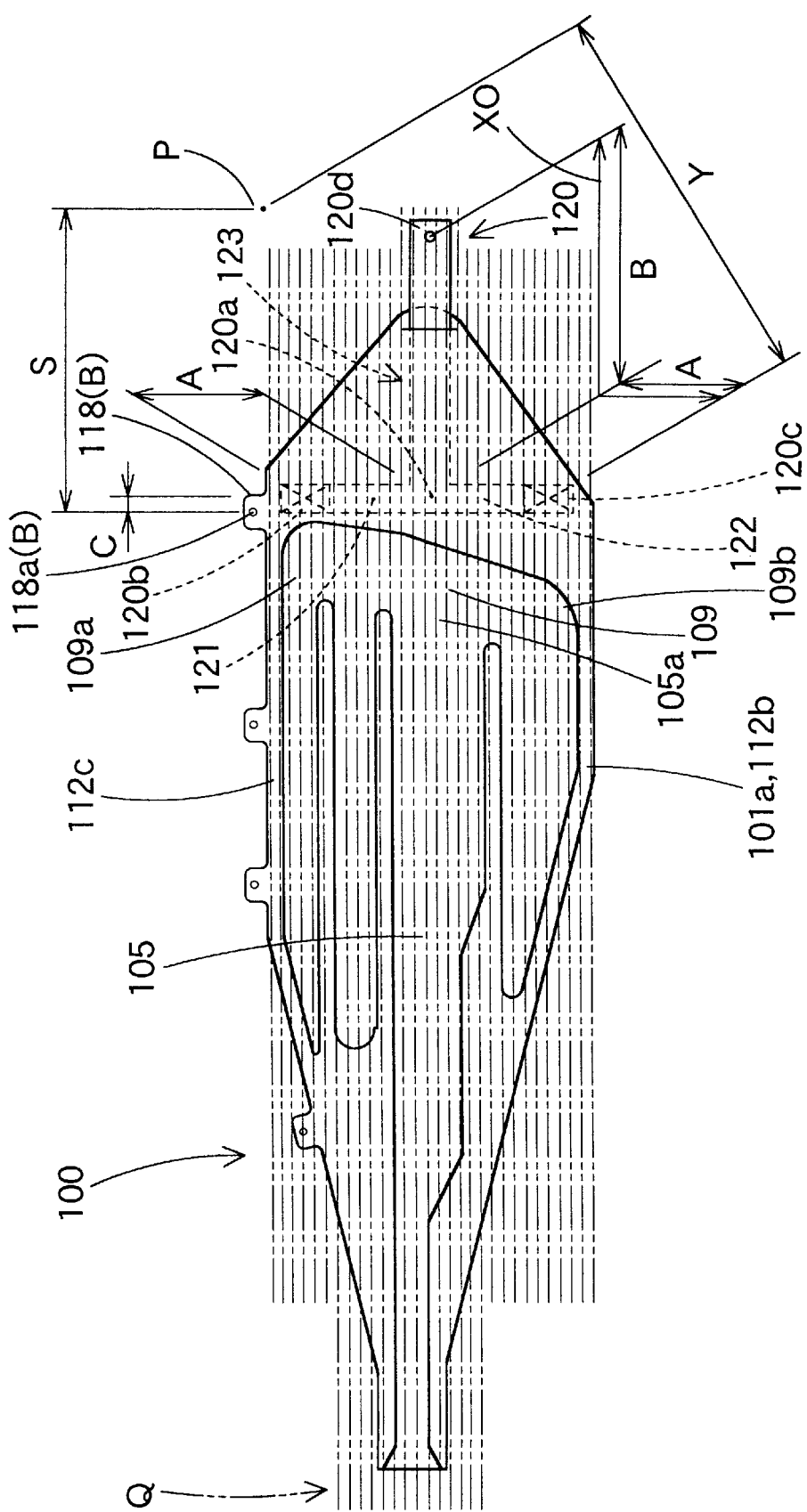
FIG. 16 is a diagram showing the folds, along which the airbag in accordance with the seventh embodiment is to be folded.

Moreover, the belt portion 120, as extended straight from the proximal portions 120b and 120c to the distal end portion 120d by bringing the joint fingers 121 and 122 closer to overlap each other, has a length X0 (X0=A+B) (as shown in FIG. 16) smaller than the length Y in a uninflated state. In this uninflated state, the airbag body 101 is mounted in the vehicle and is developed but not inflated, and the length Y is taken in this state from the lower proximal portion 120c to the fixing portion P of the distal end portion 120d on the peripheral edge of the opening W. In the seventh embodiment, the length X0 is set to 410 mm, and the length Y is set to 470 mm.

Here, this length X0 is set such that the length Z=X0+C is substantially equal to or larger than the mounting span S (as shown in FIGS. 14 and 16) (that is, S≦Z=X0+C). This setting is made so that the folded airbag 100 may be fixed on the vehicle, without question, by means of the bolts 46. The mounting span S is taken between the mounting portion 118(B) of the rear end side of the airbag body 101 and the fixing portion P of the distal end portion 120d of the joint finger 123. Here, the length C is taken in the forward and backward direction between the mounting hole 118a(B) of the rear end side of the airbag body 101 and the stitched portions 120b and 120c of the joint fingers 121 and 122 to the cover portion 113.

Here will be described the assembly operation for mounting the airbag 100 to the vehicle. First of all, the airbag 100 is folded. Specifically, the airbag 100 is folded in a bellows shape from its lower edge 112b (101a) to the upper edge 112c while forming longitudinal (fore and aft) folds Q along the main inflating chamber 105, as shown in FIG. 16.

Then, the airbag body 101 thus folded up is wound at a predetermined interval with a breakable tape so that it may not collapse.

After folding-up the airbag, the individual mounting portions 118 and the distal end portion 120d of the joint finger 123 are pulled out. Then, the mounting brackets 45 are attached to the individual mounting portions 118 and the distal end portion 120d. The gas inlet portion 103 is pulled out, and the inflator 18 is inserted into the gas inlet portion 103. Moreover, the mounting bracket 15 is attached to the outer circumference of the joint cylinder portion 103a to prepare an airbag assembly. Thus, a standby state is established for awaiting the mounting to the vehicle.

After this, the mounting bracket 15 is fixed at a predetermined position of the side panel 2 by means of the bolts 16. Each mounting bracket 45 is fixed at a predetermined position of the inner panel 7 and the roof side rail body 9 by means of the bolts 46. When the pillar garnish 12 and the roof interior cover 13 are mounted on the body 1, moreover, the head protecting airbag system M1 can be mounted to the vehicle.

Here, the length X0 of the belt portion 120 satisfies the relation of S≦Z=X0+C. By using the bolts 46, therefore, the distal end portion 120d of the belt portion 120 can be fixed without fail.

When the inflator 18 is activated, after the airbag 100 is mounted on the vehicle, it feeds the main inflating chamber 105 of the inflatable portion 104 with the inflation gas G through the gas inlet portion 103. Moreover, the inflation gas G flows from the inlets 106a and 107a of the rear portion 105a of the main inflating chamber 105 into the upper and lower auxiliary inflating chambers 106 and 107. Then, the inflatable portion 104 including the longitudinal rod portion 109 is inflated. At this time, the airbag body 101 breaks the winding tape (not shown). The airbag body 101 pushes the pillar garnish 12 and the roof interior cover 13 to open the individual door portions 12a and 13a. Moreover, the airbag body 101 is inflated so largely as to cover the opening W, as indicated by the double-dotted lines in FIG. 14.

In the airbag 100 of the seventh embodiment, the inflating portion 102 is developed and inflated by the inflation gas G so that the longitudinal rod portion 109 is arranged in the substantially vertical direction. Then, the belt portion 120 pulls on the longitudinal rod portion 109 causing it to turn. In other words, the belt portion 120 turns the lower end 109b backward, i.e., in the longitudinal (fore and aft) direction away from the inflatable portion 104 on the upper end 109a.

Figure 17:
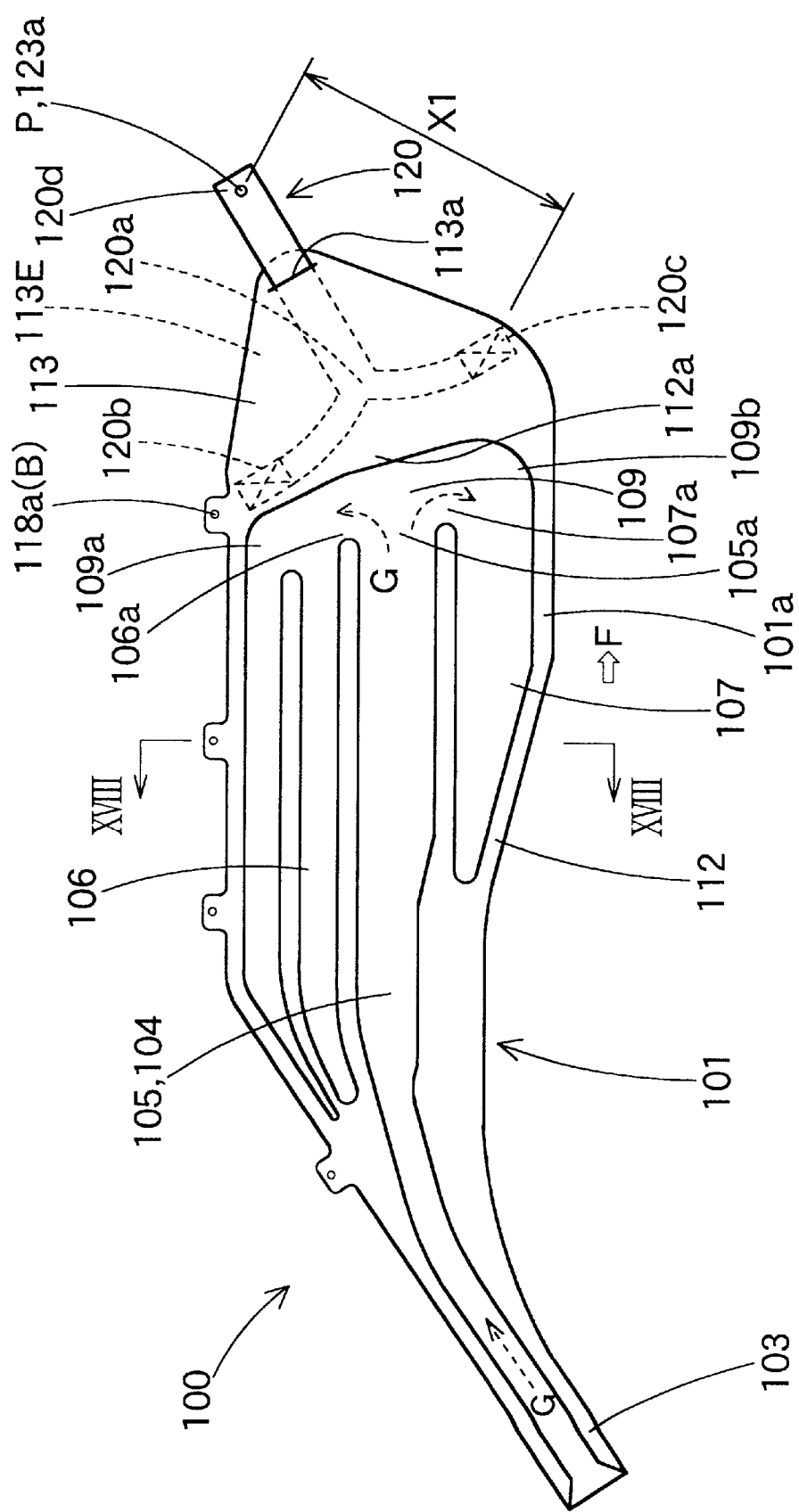
FIG. 17 is a front elevation of the state at the inflated time of the airbag itself in accordance with the seventh embodiment.
Figure 18:
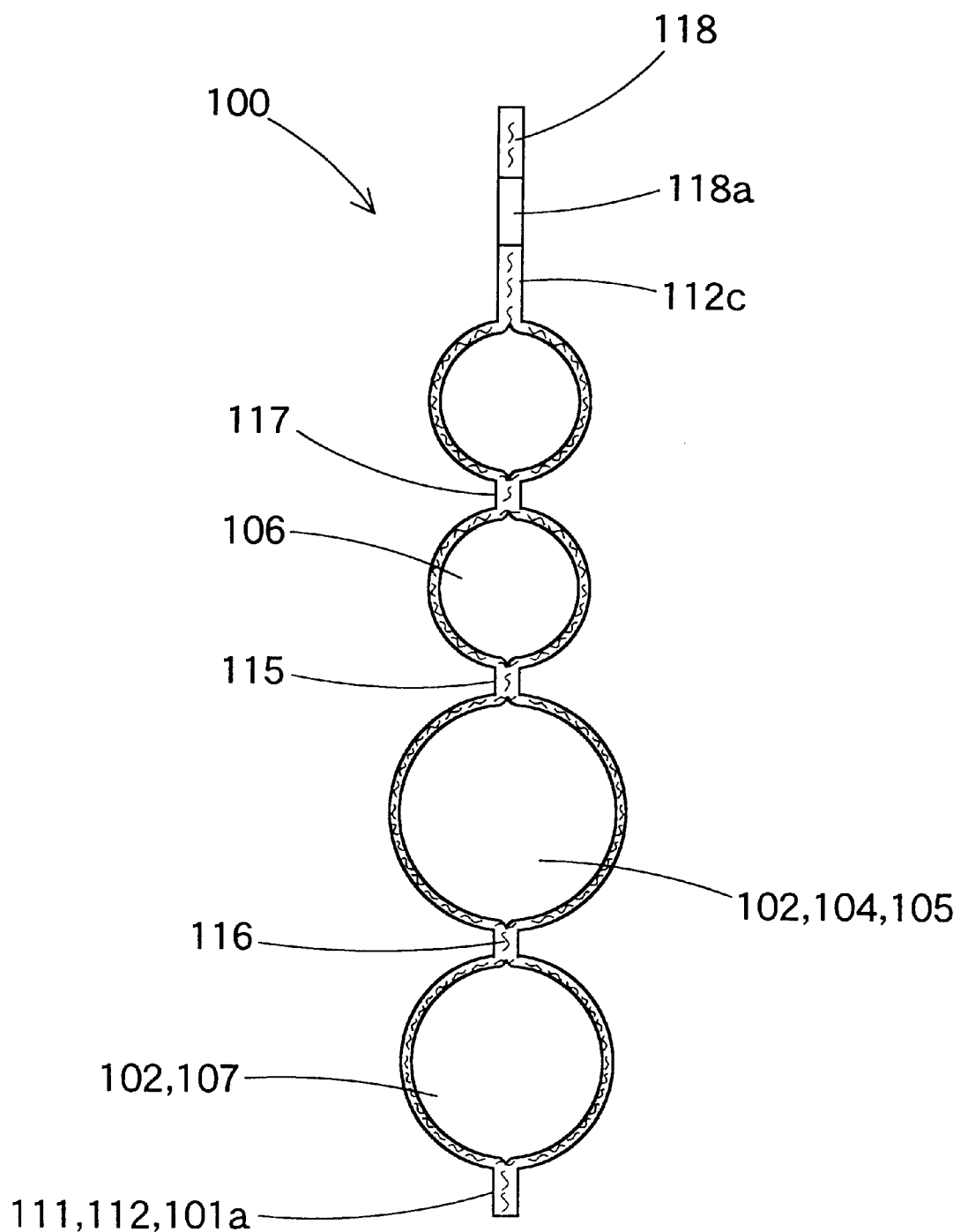
FIG. 18 is a section showing the airbag in accordance with the seventh embodiment at the inflated time and presents an enlarged section of a portion XVIII—XVIII of FIG. 17.

At this time, the longitudinal rod portion 109 is inflated substantially vertically in the rod shape by the inflation gas G coming thereinto. In short, the longitudinal rod portion 109 becomes rigid. Then, the longitudinal rod portion 109 is subjected to a backward turning torque. As a result, a tension F by the belt portion 120 is applied to the lower edge 101a of the airbag body 101, as shown in FIG. 17. On the other hand, the airbag body 101 is inflated into the interior side of the center pillar portion PC, as shown by the double-dotted lines in FIG. 14. As a result, the airbag 100 will be supported by the center pillar portion PC, even when it is restraining the passenger, and will barely extend outside of the vehicle.

Moreover, the uninflating portion 111 of the airbag body 101 is provided with the cover portion 113. This cover portion 113 is arranged in a triangular area extending from the circumferential edge of the longitudinal rod portion 109 to the vicinity of the distal end portion 120d of the belt portion 120. As a result, the cover portion 113 can suppress the formation of the clearance between the airbag body 101 and the belt portion 120.

Therefore, the airbag 100 of the seventh embodiment can exhibit a tension especially on the side of the lower edge 101 of the airbag body 101 when the airbag 100 is inflated. As a result, the airbag 100 can retain a wide area capable of restraining the passenger properly. Moreover, the airbag 100 is enabled to restrain the passenger properly over a wider range by the cover portion 113, because the cover portion 113 removes a clearance between the airbag body 101 and the belt portion 120.

Moreover, the cover portion 113 is constructed of the uninflating portion 111 so as to not admit inflation gas G. As a result, the cover portion 113 does not increase the capacity of the inflating portion 102 of the airbag body 101. In other words, the cover portion 113 does not delay the time period for the inflating portion 102 to be charged with the inflation gas G. As a result, the cover portion 113 does not increase the time it takes to fully inflate the airbag.

The cover portion 113 holds the vicinity of the distal end portion 120d of the belt portion 120 so that the distal end portion 120d may move in the axial direction. As a result, the belt portion 120 can be freely moved when it exhibits tension. The cover portion 113 does not deform the developed and inflated shape of the airbag body 101.

In the airbag 100 of the seventh embodiment, moreover, the belt portion 120 is arranged on the exterior faces 113E of the cover portion 113. Therefore, the passenger is kept, when he or she is to be restrained by the cover portion 113, away from direct contact with the belt portion 120 exhibiting the tension. As a result, the passenger has confidence in the airbag 100.

In this embodiment, too, the length X0 of the belt portion 120, as taken straight from the proximal portion 120c to the distal end portion 120d, is set shorter than the length Y in the uninflated state. In the airbag 100 being inflated, therefore, a high tension can be reliably applied to the lower edge 101a of the airbag body 101.

The belt portion 120 of the seventh embodiment is also trifurcated. As in the first embodiment, therefore, the distal end portion 120d of the belt portion 120 can be easily fixed on the fixing portion P proximal to the opening W by means of the bolts 46. When the airbag 100 is developed and inflated, the bifurcated proximal portions 120b and 120c are vertically separated by the formation of the longitudinal rod portion 109. Without degrading the mounting workability on the vehicle, therefore, a high tension can be exhibited on the lower portion 101a of the airbag body 101 being developed and inflated.

Here in the airbag 100 of the seventh embodiment, the cover portion 113 is provided with the insert hole 113a.

Figure 19:
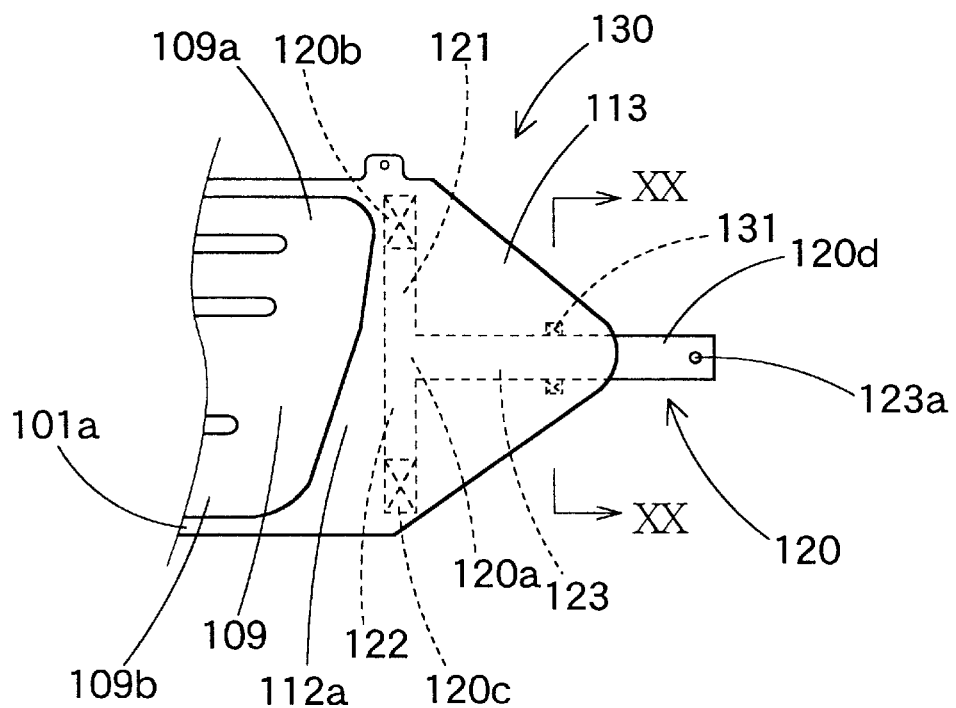
FIG. 19 is a partial front elevation showing the vicinity of a belt portion in accordance with an eighth embodiment.
Figure 20:
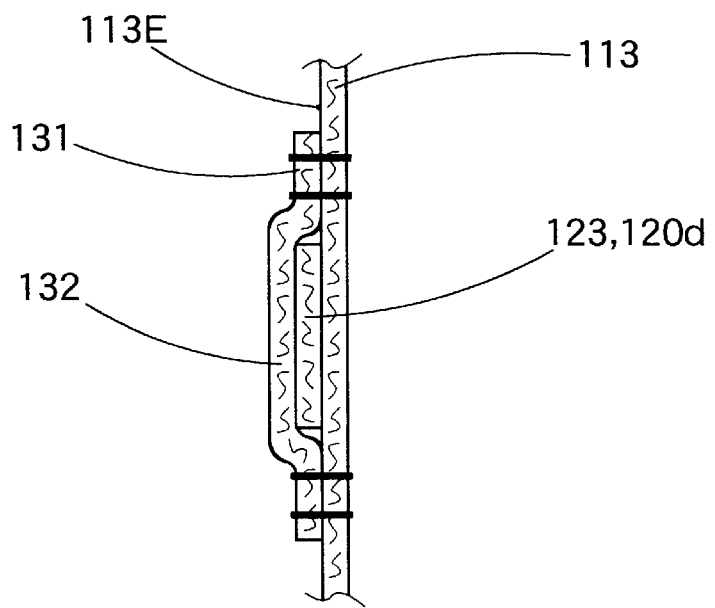
FIG. 20 is an enlarged section of a portion XX—XX of FIG. 19.

Moreover, the distal end portion 120d of the belt portion 120 is guided from the exterior face 113E through the insert hole 113a and arranged inside of the vehicle. However, the distal end portion 120d of the belt portion 120 may be constructed as in an airbag 130 of an eighth embodiment, as shown in FIGS. 19 and 20, if it can be held movable in the axial direction. In this airbag 130, the exterior face 113E of the cover portion 113 is provided with a loop portion 132 capable of inserting the distal end portion 120d thereinto. This loop portion 132 is attached to the cover portion 113 by stitching or adhering the upper and lower two ends of a band 131. In this case, the vicinity of the distal end portion 120d can also be arranged on the exterior side of the cover portion 113.

Figure 21:
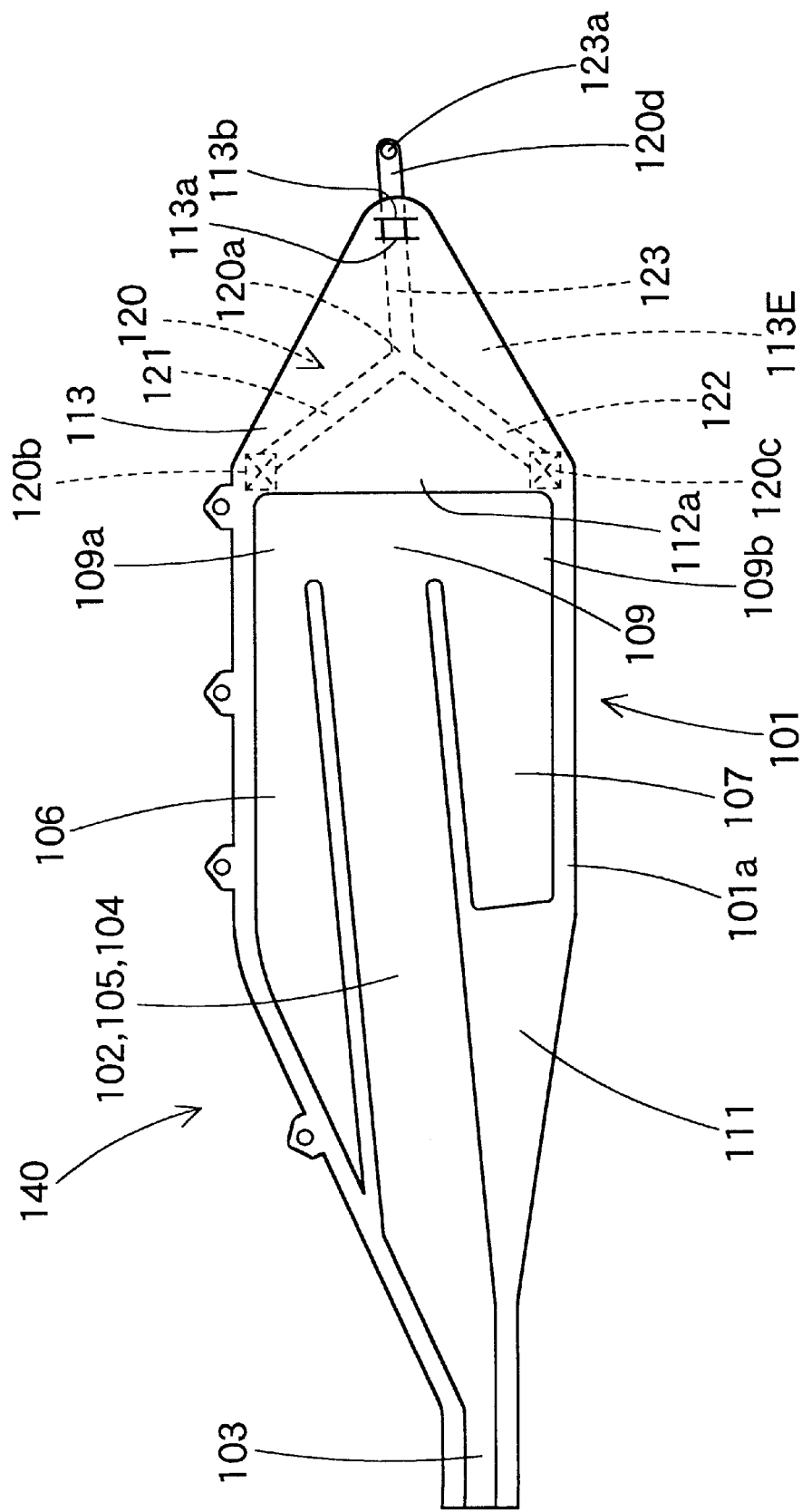
FIG. 21 is a front elevation showing a developed state at an uninflated time of an airbag in accordance with a ninth embodiment.

Still moreover, the construction of the loop portion 132 may be modified, as in an airbag 140 in accordance with a ninth embodiment shown in FIG. 21. This airbag 140 is further provided a second slit-shaped insert hole 113b in the rear edge side of the cover portion 113 in the vicinity of the insert hole 113a. The distal end portion 120d can be inserted into the insert hole 113b. Moreover, the distal end portion 120d, as extending from the intersection 120a, is extended once to the interior of the vehicle from the first insert hole 113a and further through the second insert hole 113b to the exterior of the vehicle.

Figure 22:
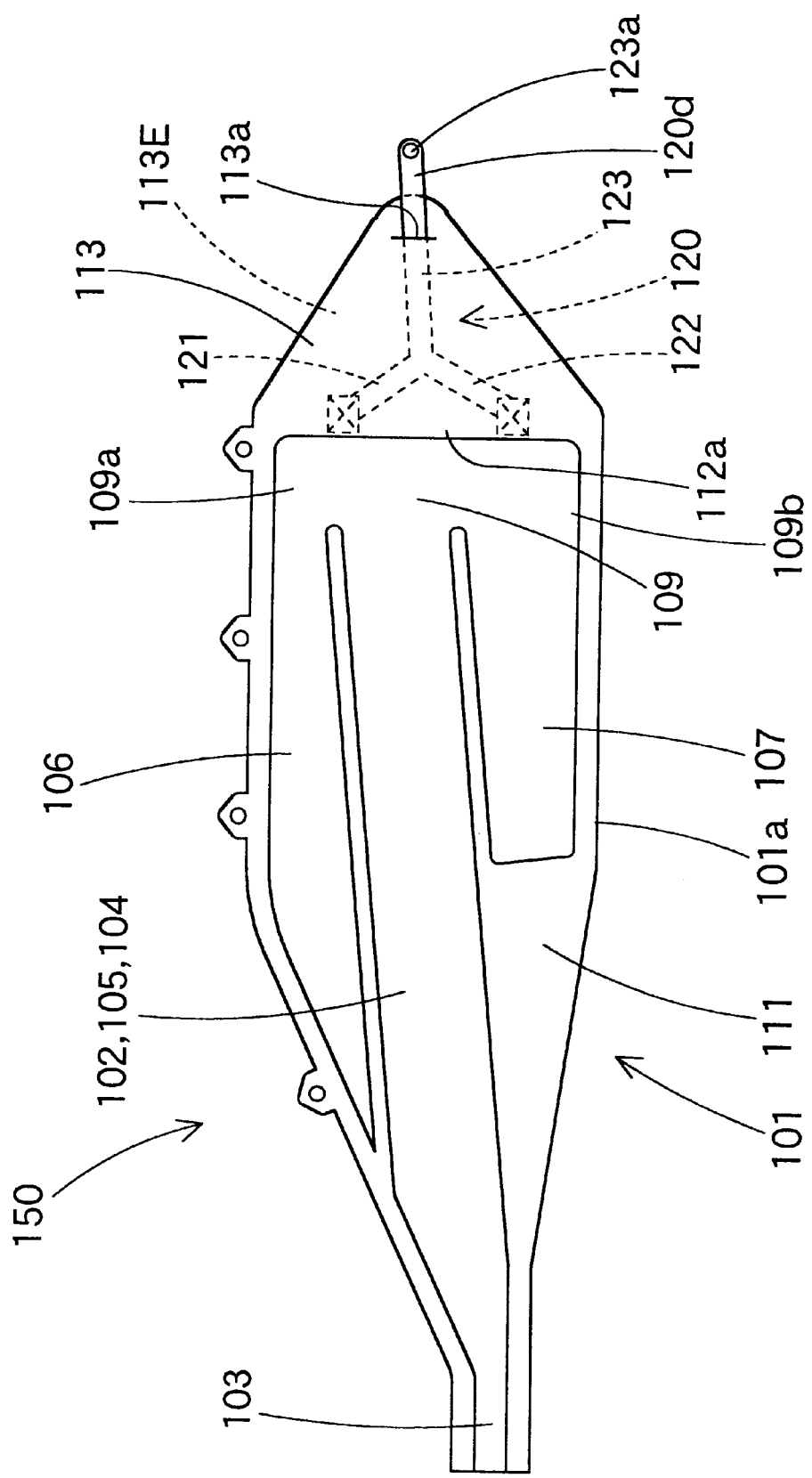
FIG. 22 is a front elevation showing a developed state at an uninflated time of an airbag in accordance with a tenth embodiment.

When the trifurcated belt portion 120 is used, moreover, it need not be formed into the shape of the letter "T" of the seventh embodiment. Specifically, the belt portion 120 may be modified into the shape of the letter "Y" of airbags 140 and 150 of the ninth and tenth embodiments, as shown in FIGS. 21 and 22.

Figure 23:
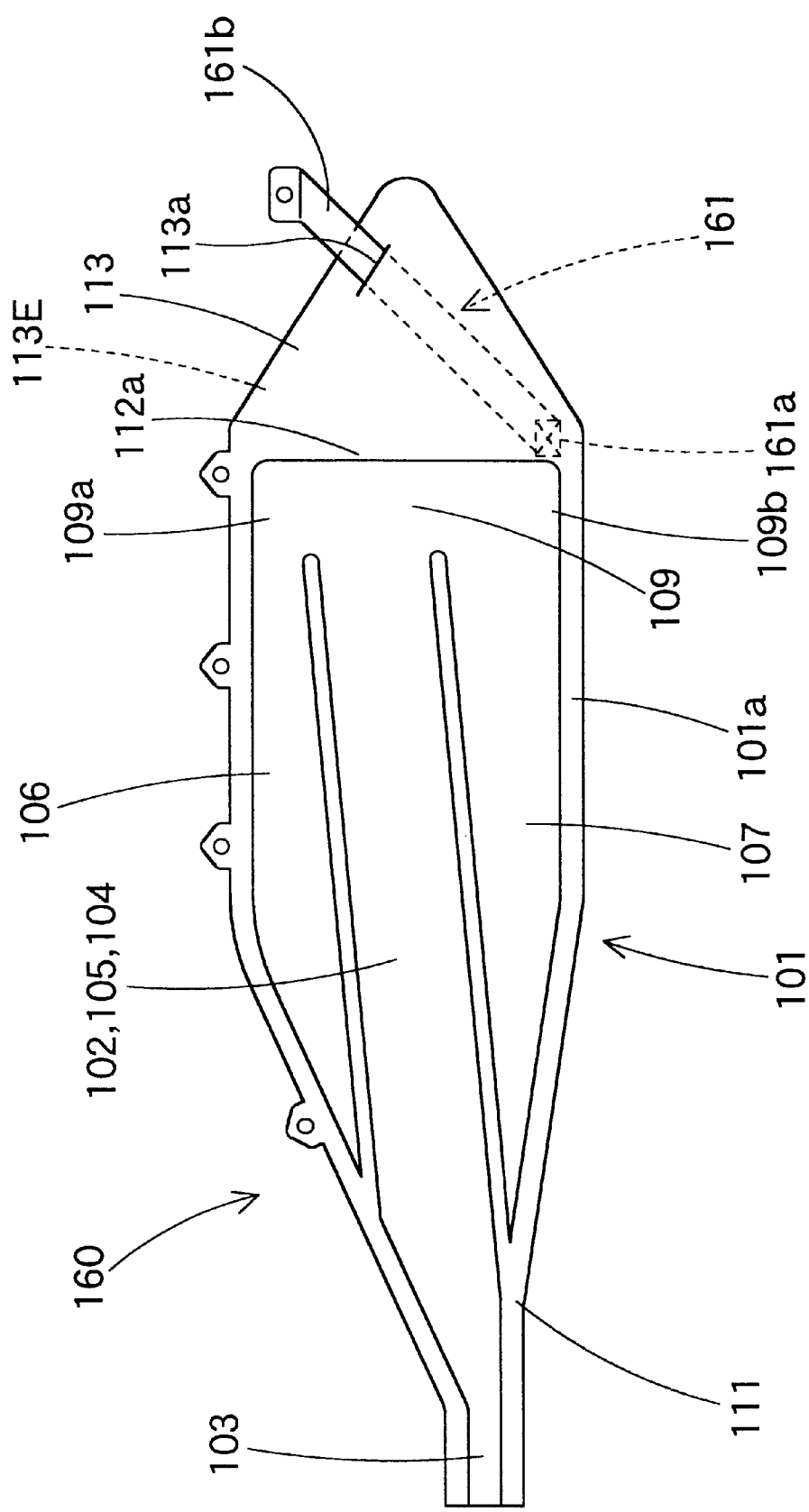
FIG. 23 is a front elevation showing a developed state at an uninflated time of an airbag in accordance with an eleventh embodiment.

Still moreover, the belt portion 120 need not be trifurcated. Specifically, the airbag may be constructed and arranged like the airbag 160 in accordance with an eleventh embodiment, as shown in FIG. 23, if it can exhibit a tension on the side of the lower portion 101a of the airbag body 101. This airbag 160 has a belt portion 161 of a single-band shape. When this single belt 161 is used, its proximal portion 161a is desirably joined to the side of the lower end 109b than the vicinity of the vertically intermediate portion of the circumferential edge of the longitudinal rod portion 109. This is because the backward turning torque of the longitudinal rod portion 109 can be increased when the airbag 160 is developed and inflated. This turning torque acts to turn the lower end 109b on the upper end 109a away from the inflatable portion 104 of the inflating portion 102 in the backward direction.

Figure 24:
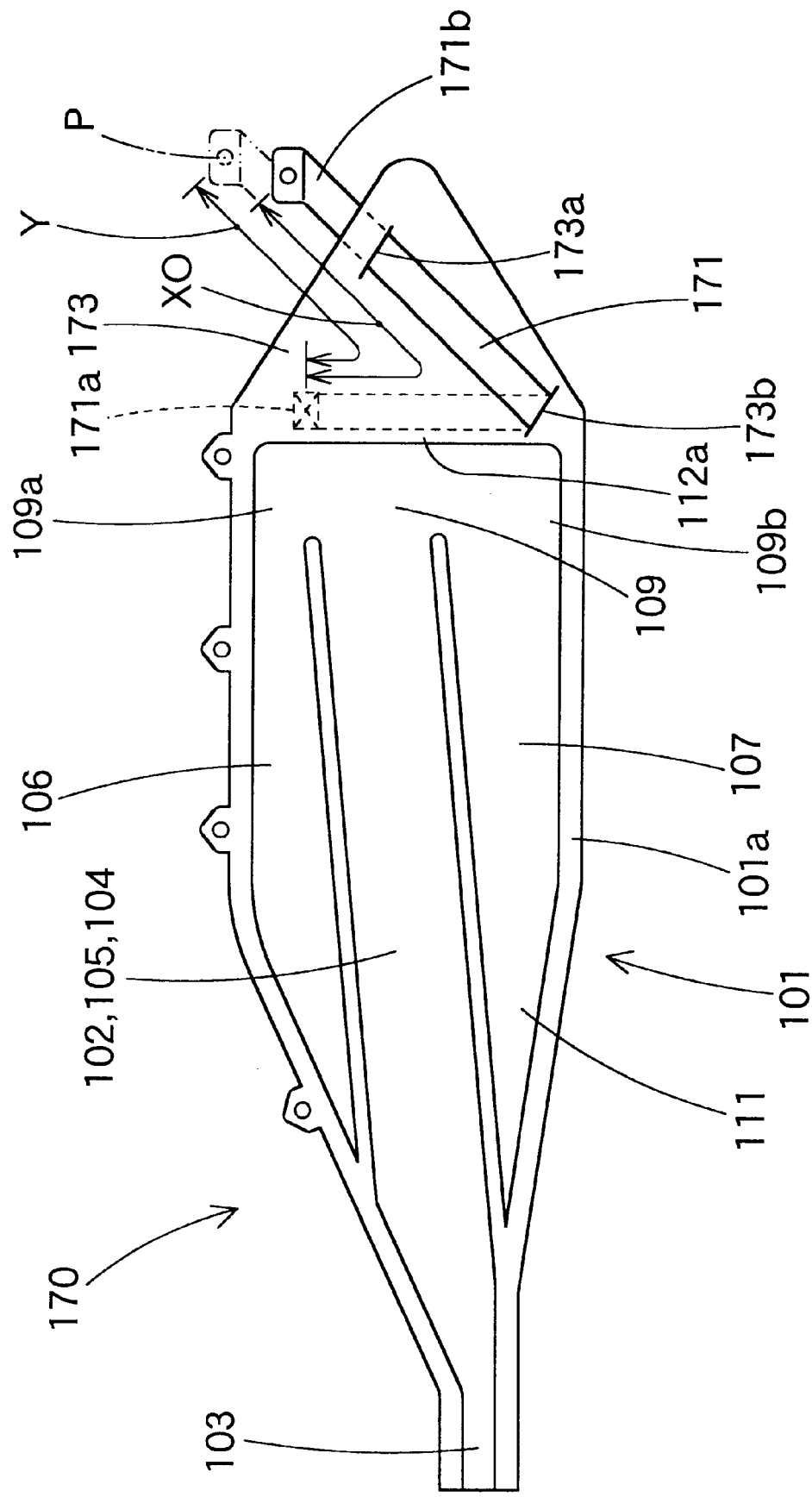
FIG. 24 is a front elevation showing a developed state at an uninflated time of an airbag in accordance with a twelfth embodiment.

Moreover, the airbag may be constructed and arranged similar to the airbag 170 in accordance with a twelfth embodiment, as shown in FIG. 24. This airbag 170 employs a single belt portion 171. A cover portion 173 is provided with two slit-shaped insert holes 173a and 173b. In this cover portion 173, the insert hole 173a is arranged on the rear edge side, and the insert hole 173b is arranged in the circumferential edge of the longitudinal rod portion 109 on the side of the lower end 109b. Moreover, the belt portion 171 is joined at its proximal portion 171a to the cover portion 173 of the circumferential edge of the longitudinal rod portion 109 on the side of the upper end 109a. On the other hand, a distal end portion 171b is inserted into the insert hole 173b and is folded back. This distal end portion 171b is further inserted into the insert hole 173a and is fixed on the fixing portion P proximal to the opening of the vehicle.

This airbag 170 is also folded in a bellows shape from the lower edge 101a to the upper edge and accommodated in the peripheral edge of the opening in the interior of the vehicle. At this time, the belt portion 171 can be pulled out toward the distal end portion 171b through the insert holes 173a and 173b. Therefore, the whole length X0 of the belt portion 171 itself can be made shorter than the length Y in a uninflated state. In this uninflated state, the airbag body 101 is mounted in the vehicle and is developed but not inflated. The length Y is taken from the proximal portion 171a through the insert hole 173b to the fixing portion P. Since the length X0 of the belt portion 171 can be made shorter than the length Y, moreover, the belt portion 171 applies a high turning torque to the longitudinal rod portion 109 when the airbag 170 is developed and inflated.

In this airbag 170, therefore, a high tension can be exhibited at the lower portion 101a of the airbag body 101 being developed and inflated, without degrading the mounting workability on the vehicle.

Here, the insert hole 173b is desirably arranged in the lower end 109b of the circumferential edge of the longitudinal rod portion 109. This arrangement is made so that a high turning torque may act on the longitudinal rod portion 109 when the airbag 170 is developed and inflated. This turning torque acts on the lower end 109b of the longitudinal rod portion 109 on the upper end 109a away from (i.e., backward) the inflatable portion 104 of the inflating portion 102 in the longitudinal (fore and aft) direction.

The cover portion 113 or 173 need not be woven integrally with the peripheral edge portion 112 of the airbag body 101. For example, the cover portion 113 or 173 is made separately from the peripheral edge portion 112 of the uninflating portion 111. Moreover, the cover portion 113 or 173 may also be arranged on the rear edge 112a of the peripheral edge portion 112 by the stitching or adhering method or the like.

Figure 25:
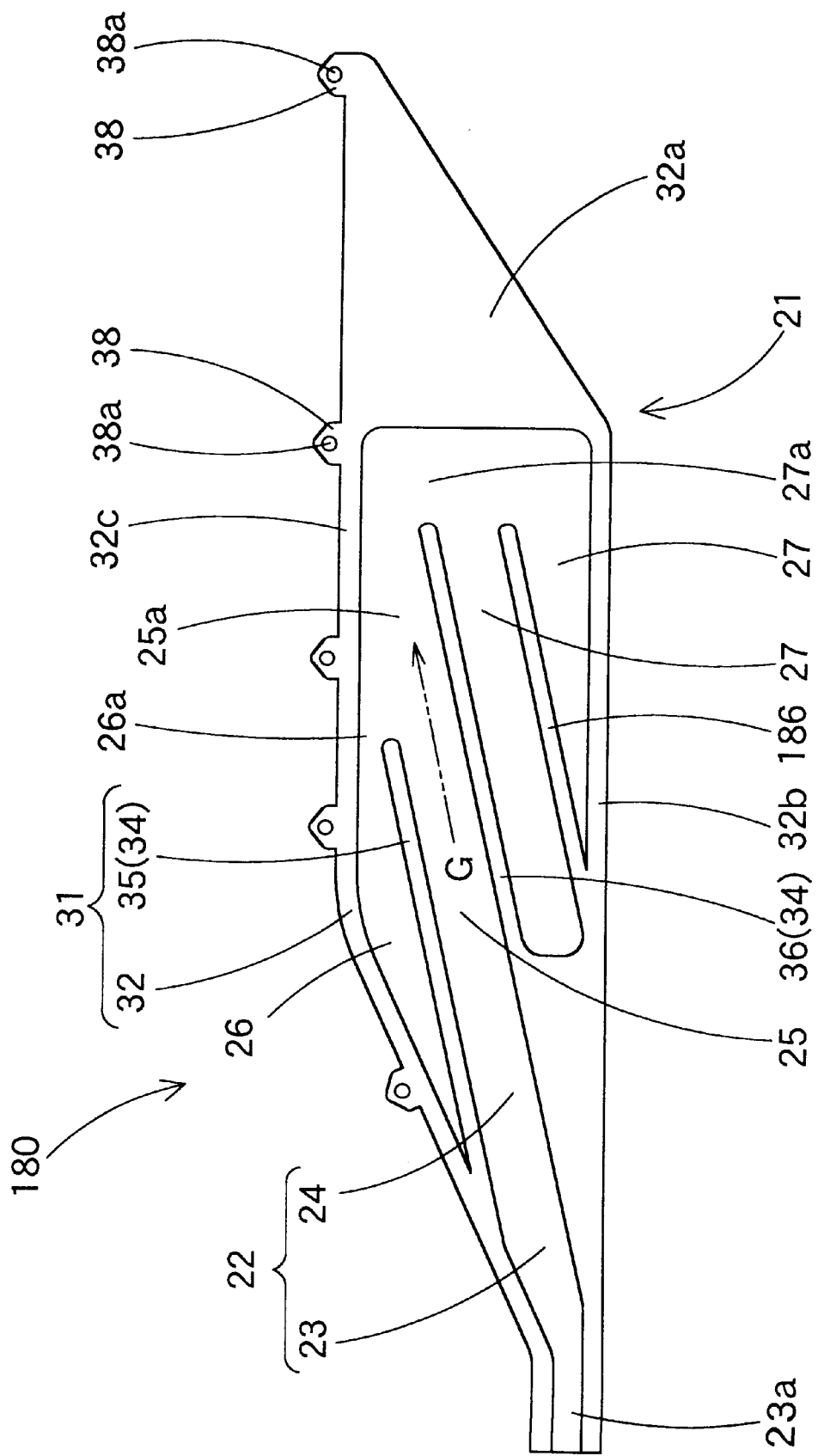
FIG. 25 is a front elevation showing a developed state at an uninflated time of an airbag in accordance with a thirteenth embodiment.

Here in the airbag 20 of the first embodiment, the inflation gas G having flowed from the main inflating chamber 25 is linearly applied to the rear edge 32a of the peripheral edge portion 32 of the uninflating portion, as arranged vertically. However, the construction may also be modified as follows, if the main inflating chamber 25 of the airbag 20 is inflated quickly and widely. Specifically, the inflation gas G having flowed from the main inflating chamber 25 is applied to the upper edge 32c or the lower edge 32b of the peripheral edge portion 32, which is not arranged vertically. The airbag 20 may be modified into airbag 180 in accordance with a thirteenth embodiment shown in FIG. 25, for example. In this airbag 180, the rear portion 25a of the main inflating chamber 25 is arranged on the side of the upper edge 32c of the peripheral edge portion 32 in the uninflating portion 31. Then, the inflation gas G having flowed from the main inflating chamber 25 impinges upon the upper edge 32c.

Figure 26:
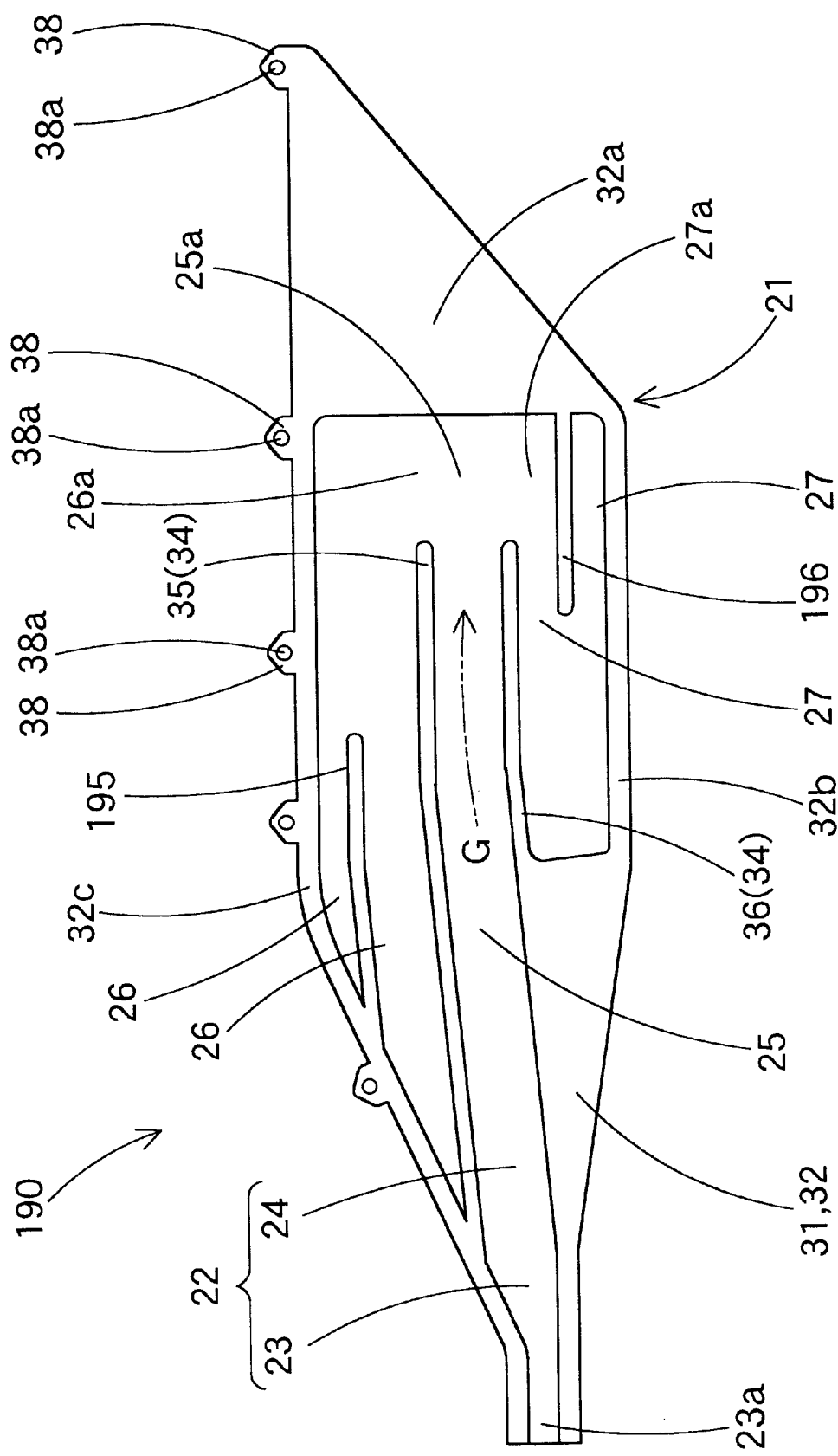
FIG. 26 is a front elevation showing a developed state at an uninflated time of an airbag In accordance with a fourteenth embodiment.

In the airbag 20 in accordance with the first embodiment, on the other hand, the opening area of the inlet 27a of the lower auxiliary inflating chamber 27 is made larger than that of the inlet 26a of the upper auxiliary inflating chamber 26. If the main inflating chamber 25 of the airbag 20 is inflated quickly and widely, however, the construction may be modified in the following manner. Specifically, the opening areas of the two may be substantially the same size. Alternatively, the construction may be modified into an airbag 190 of a fourteenth embodiment, as shown in FIG. 26. In this airbag 190, the opening area of the inlet 26a of the upper inflating chamber 26 is made larger than that of the inlet 27a of the lower auxiliary inflating chamber 27.

In the airbag 20 in accordance with the first embodiment, moreover, the upper and lower regulating portions 35 and 36 are made straight. Moreover, the main inflating chamber 25 extends straight backward in the obliquely upward direction from the gas inlet portion 23. However, the main inflating chamber 25 may be constructed, as shown in FIG. 26. This main inflating chamber 25 extends with a slight curve in the longitudinal (fore and aft) direction. If the main inflating chamber 25 is inflated quickly and widely, more specifically, the main inflating chamber 25 may be arranged to extend substantially linearly from the gas inlet portion 23 in the longitudinal (fore and aft) direction while including the straight extending case.

In the airbag 20 in accordance with the first embodiment, still moreover, the upper and lower auxiliary inflating chambers 26 and 27 are individually provided by one chamber. However, the upper and lower auxiliary inflating chambers 26 and 27 may be suitably divided. For example, the construction may be modified as in the airbag 180 shown in FIG. 25. In this airbag 180, a second lower regulating portion 186 is provided below the lower regulating portion 36. The second lower regulating portion 186 extends from the lower edge 32b in the peripheral edge portion 32 of the uninflating portion 31. In this airbag 180, the lower inflating chamber 27 is divided into two by the second lower regulating portion 186. As in the airbag 190 shown in FIG. 26, alternatively, a second upper regulating portion 195 may be provided over the upper regulating portion 35. This second upper regulating portion 195 extends from the upper edge 32c in the peripheral edge portion 32 of the uninflating portion 31. In this airbag 190, the upper inflating chamber 26 is divided into two by the second upper regulating portion 195.

Here, the upper and lower auxiliary inflating chambers 26 and 27 may be partitioned, when divided, by a regulating portion which extends from the rear edge 32a in the peripheral edge portion 32 of the uninflating portion 31. As in the airbag 190 shown in FIG. 26, for example, a second lower regulating portion 196 for dividing the lower auxiliary inflating chamber 27 may extend from the rear edge 32a.

Here, the regulating portions 35, 36, 115, 116, 117, 186, 195 and 196 are desirably provided substantially in parallel with each other as in the airbags 20, 100, 180 and 190, because the width of the inflating chambers 25, 26, 27, 105, 106 and 107 being inflated can be equalized as much as possible in the longitudinal (fore and aft) direction.

In the airbag 20 of the first embodiment, moreover, the belt portion 40 is disposed at the back of the airbag body 21. If the main inflating chamber 25 is inflated quickly and widely, however, the belt portion 40 may be omitted as in the airbags 180 and 190 shown in FIGS. 25 and 26. In these airbags 180 and 190, the rear edge 32a of the peripheral edge portion 32 in the uninflating portion 31 of the airbag body 21 is formed into a triangular sheet.

The first to fourteenth embodiments have described an airbag which is employed in the head-protecting airbag system M1 for the front seat. However, the airbag may be constructed to be arranged on the front and rear seats. A head protecting airbag system M2, as shown in FIGS. 27 to 30, is provided for the front and rear seats. Moreover, an airbag 220 according to a fifteenth embodiment is folded and accommodated in the upper edge side of the opening W of the door or window on the interior side. Specifically, the airbag 220 is arranged to extend over the front pillar portion PF, the roof side rail portion R and a rear pillar portion PR.

This head-protecting airbag system M2 comprises the airbag 220, the inflator 18, the mounting bracket 15 and the airbag cover 11.

The inflator 18 and the mounting bracket 15 are made as in the first embodiment, and their description will be omitted. However, the mounting bracket 15 uses two bolts 16 to mount the inflator 18 on a rear pillar body 10 of the rear pillar portion PR.

Figure 27:
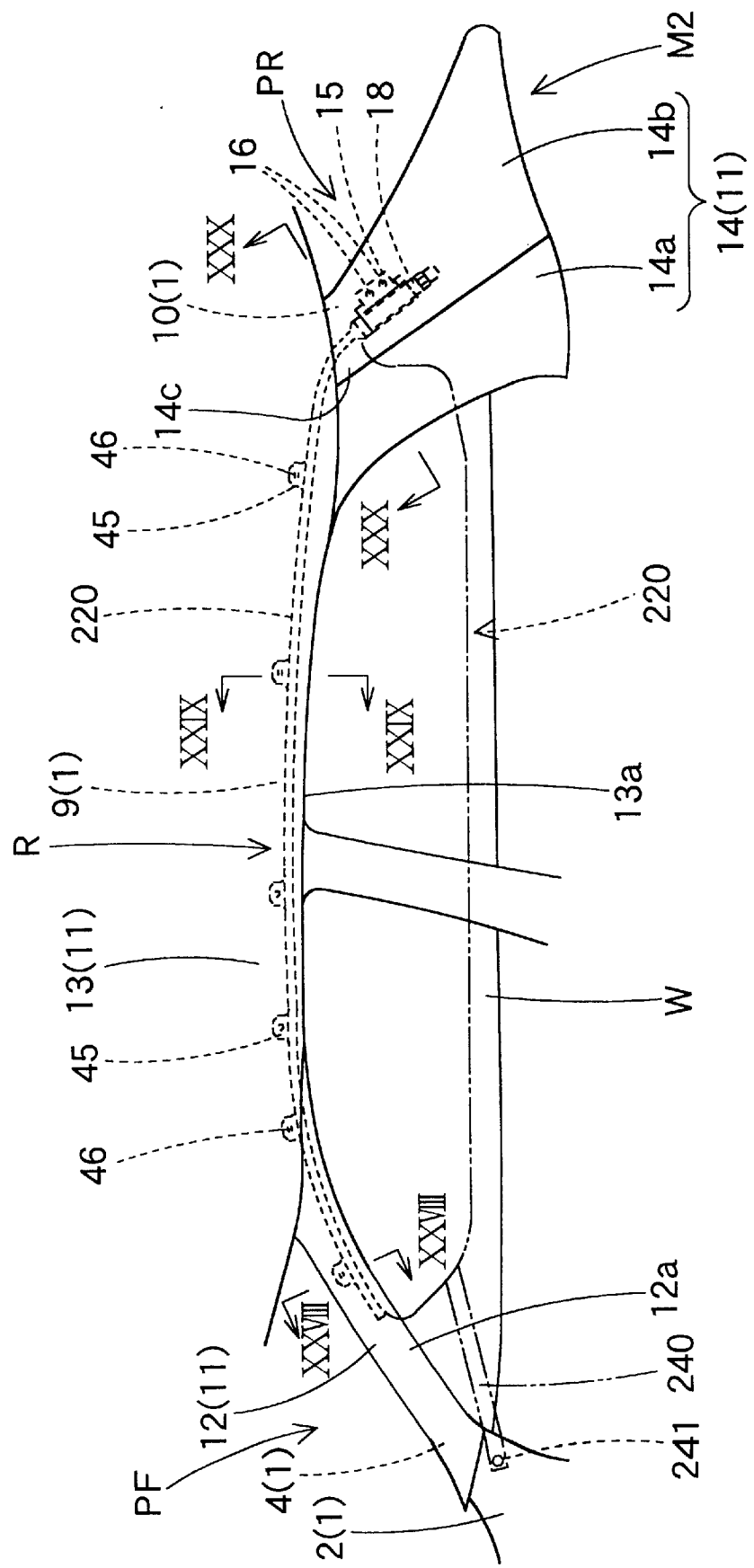
FIG. 27 is a front elevation taken from the inside of a vehicle and shows the state in which an airbag in accordance with a fifteenth embodiment is accommodated.
Figure 28:
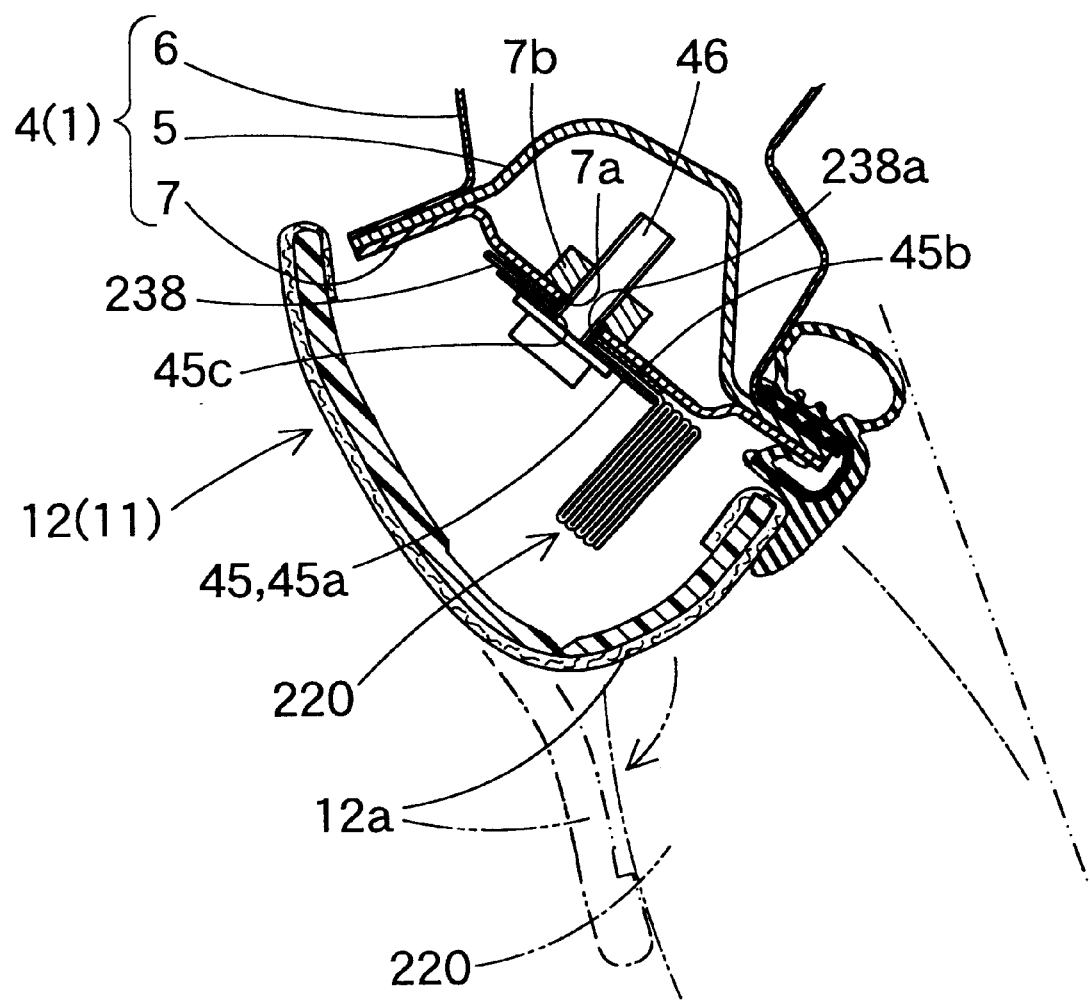
FIG. 28 is an enlarged schematic sectional view taken along line XXVIII—XXVIII of FIG. 27.
Figure 29:
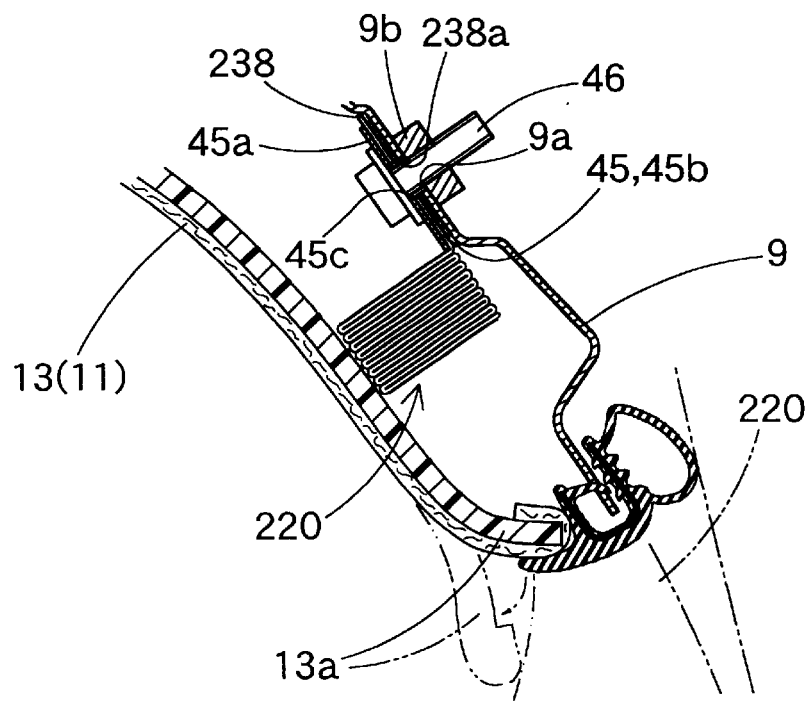
FIG. 29 is an enlarged schematic sectional view taken along line XXIX—XXIX of FIG. 27.

The airbag cover 11 comprises the front pillar garnish 12 of the front pillar portion PF, the roof interior cover 13 of the roof side rail portion R, and a rear pillar garnish 14. This rear pillar garnish 14 is arranged in the rear pillar portion PR. The front pillar garnish 12 and the roof interior cover 13 are similar to those of the first embodiment, as shown in FIGS. 27 to 29. Specifically, the garnish 12 and the roof interior cover 13 are mounted and fixed on the inner panel 7 of the front pillar body 4 and the roof side rail body 9 made of a sheet metal, respectively, by the mounting means (not shown). The garnish 12 and the roof interior cover 13 are provided with the door portions 12a and 13a, respectively, which are opened by the push of the airbag 220 when the airbag is inflated.

Figure 30:
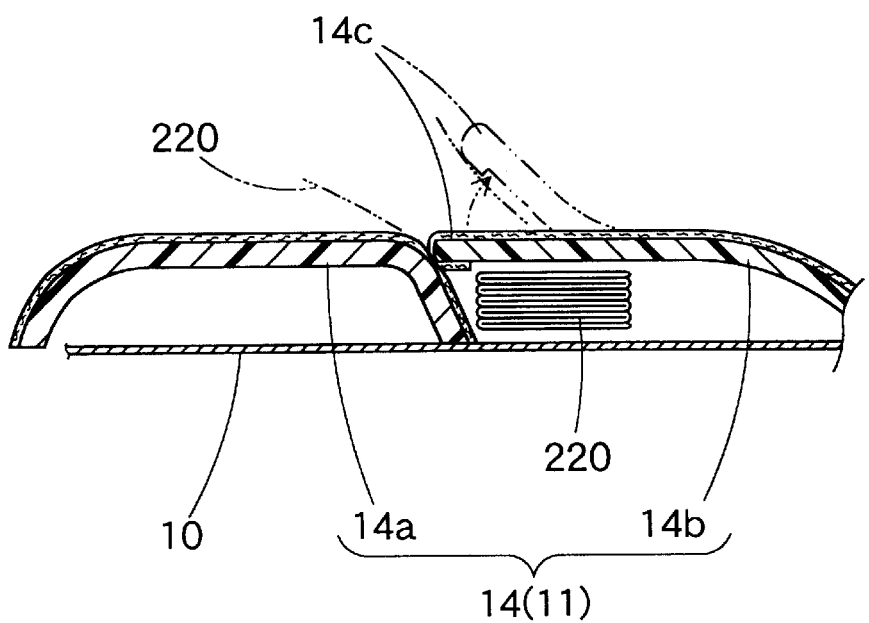
FIG. 30 is an enlarged sectional view taken along line XXX—XXX of FIG. 27.

The rear pillar garnish 14 is made of a synthetic resin like the garnish 12. The garnish 14 is constructed, as shown in FIGS. 27 and 30, to include a front panel portion 14a arranged on the front side and a rear panel portion 14b arranged on the rear side. These panel portions 14a and 14b are mounted and fixed by the means (not shown) on the rear pillar body 10 made of a sheet metal. In this rear pillar garnish 14, moreover, the rear panel 14b is provided with a door portion 14c on the front edge side. This door portion 14c covers the airbag 220 which is folded and accommodated. The door portion 14c is opened by the push of the airbag 220 when the airbag is inflated.

This airbag 220 is constructed, as shown in FIGS. 31 to 34, to include an airbag body 221 and a belt portion 240. The airbag body 221 is formed into a flexible bag shape by the hollow-weaving method using polyamide yarns or the like. The belt portion 240 is made of a flexible woven fabric using polyamide yarns. The belt portion 240 is stitched to a front edge 232b of the airbag body 221.

Figure 34:
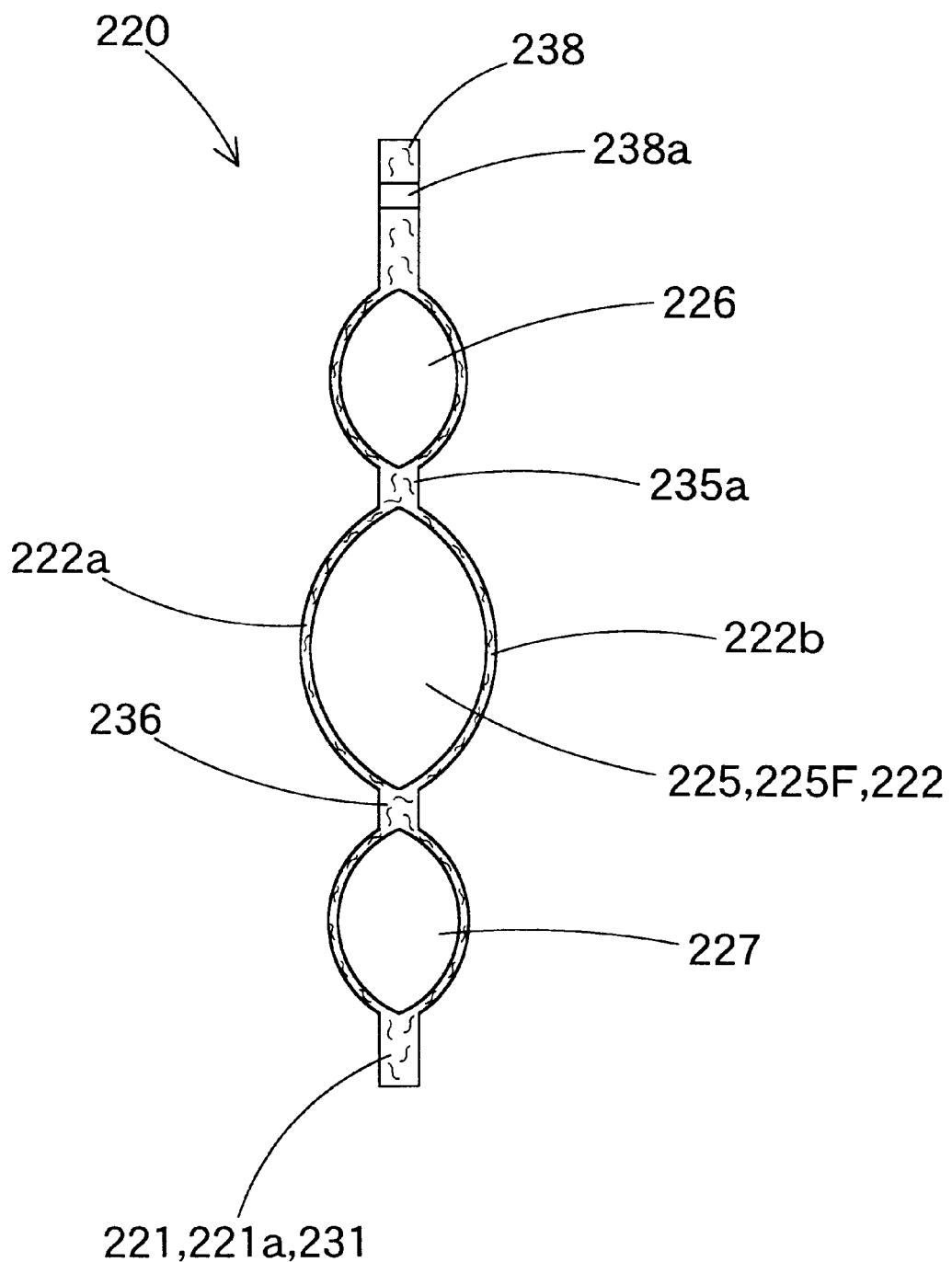
FIG. 34 is a sectional view showing the airbag in accordance with the fifteenth embodiment at the completely inflated time and presents an enlarged sectional view taken along line XXXIV—XXXIV of FIG. 33.

The airbag body 221 comprises an inflating portion 222 and an uninflating portion 231. The inflating portion 222 is inflated, when fed with the inflation gas G from the inflator 18, to separate interior and exterior side wall portions 222a and 222b from each other (as shown in FIG. 34) thereby becoming wider. Moreover, the inflating portion 222 is developed from the folded state when the inflation gas G flows thereinto. The uninflating portion 231 is not fed with the inflation gas G so that it does not become thick. This airbag body 221 may be coated on its surface with silicone or the like after hollow-woven to have the individual portions 222 and 231.

The inflating portion 222 comprises an inflatable portion 224 and a gas inlet portion 223. The inflatable portion 224 is inflated in a bag shape to cover the opening W on the interior side. The gas inlet portion 223 is arranged on the upper side of the rear end of the inflatable portion 224. This gas inlet portion 223 introduces the inflation gas G into the inflatable portion 224.

The gas inlet portion 223 is opened in a cylinder shape. Moreover, the inflator 18 is inserted into the gas inlet portion 223. This gas inlet portion 223 is fastened on the side of the inflator 18 by the mounting bracket 15. As a result, the gas inlet portion 223 is joined to the inflator 18. Here, an inner tube may be additionally fixed on the inner circumference of the gas inlet portion 223.

The inflatable portion 224 is provided with inflating portions 224a and 224b for the front and rear seats. These front and rear seat inflating portions 224a and 224b are arranged on the individual sides of the front seat and the rear seat of the vehicle when the inflatable portion 224 is inflated. Moreover, the inflatable portion 224 has a main inflating chamber 225. The main inflating chamber 225 extends substantially straight and obliquely downward to the front from the gas inlet portion 223.

Moreover, the front seat inflating portion 224a is constructed to include a front side chamber 225F and upper and lower auxiliary inflating chambers 226 and 227. The front side chamber 225F is a front side portion of the main inflating chamber 225. The upper and lower auxiliary inflating chambers 226 and 227 communicate with the front end side of the front side chamber 225F. Moreover, the upper and lower inflating chambers 226 and 227 are arranged over and below the front side chamber 225F, respectively. The rear seat inflating portion 224b is constructed to include a rear side chamber 225B and a rear auxiliary inflating chamber 228. The rear side chamber 225B is a rear side portion of the main inflating chamber 225. The rear auxiliary inflating chamber 228 has communication at its upper portion with the rear side chamber 225B. The main inflating chamber 225 is provided with a communication chamber 225c between the front side chamber 225F and the rear side chamber 225B. This communication chamber 225C provides straight communication between the front side chamber 225F and the rear side chamber 225B.

The uninflating portion 231 is woven to joint the interior side wall portion 222a and the exterior side wall portion 222b of the airbag body 221. The uninflating portion 231 comprises the peripheral edge portion 232, a regulating portion 234 and a sheet portion 237. A peripheral edge portion 232 is arranged on the outer circumferential edges of the gas inlet portion 223 and the inflatable portion 224. The peripheral edge portion 232 is so densely woven as to retain the nonpermeability of the gas inlet portion 223 and the inflatable portion 224. The regulating portion 234 comprises an extension regulating portion 235 and a central regulating portion 236. The extension regulating portion 235 extends from the peripheral edge portion 232 into the region of the inflatable portion 224. The central regulating portion 236 is arranged apart from the peripheral edge portion 232 and in the region of the front seat inflating portion 224a. The sheet portion 237 is arranged between the front and rear seat inflating portions 224a and 224b and below the communication chamber 225C.

The extension regulating portion 235 comprises a front extension regulating portion 235a, a rear extension regulating portion 235b, a rear lower extension regulating portion 235c and a rear front extension regulating portion 235d. The front regulating portion 235a extends obliquely forward and downward from an intermediate portion of a forward and downward direction of an upper edge 232a of the peripheral edge portion 232. The front regulating portion 235a extends toward the upper portion of a vertical edge 232c. This vertical edge 232c is arranged on the lower side of the front edge 232b of the peripheral edge portion 232. The rear regulating portion 235b extends obliquely forward and downward from the upper portion of a rear edge 232e of the peripheral edge portion 232. The rear lower regulating portion 235c extends below the rear extension regulating portion 235b in parallel with the rear extension regulating portion 235b from the rear edge 232e of the peripheral edge portion 232. The front and rear regulating portion 235d extends backward from the front edge side upper portion of the rear seat inflating portion 224b of the peripheral edge portion 232.

The central regulating portion 236 extends forward in parallel with the front extension regulating portion 235a from the front of the peripheral edge portion 232 on the lower edge side of the communication chamber 225C.

The front extension regulating portion 235a and the central regulating portion 236 form the upper and lower edges in the front side chamber 225F of the main inflating chamber 225. Moreover, the front extension regulating portion 235a and the central regulating portion 236 define the front side chamber 225F and the upper and lower auxiliary inflating chambers 226 and 227, and regulate the width of the front seat inflating portion 224a when fully inflated.

Figure 31:
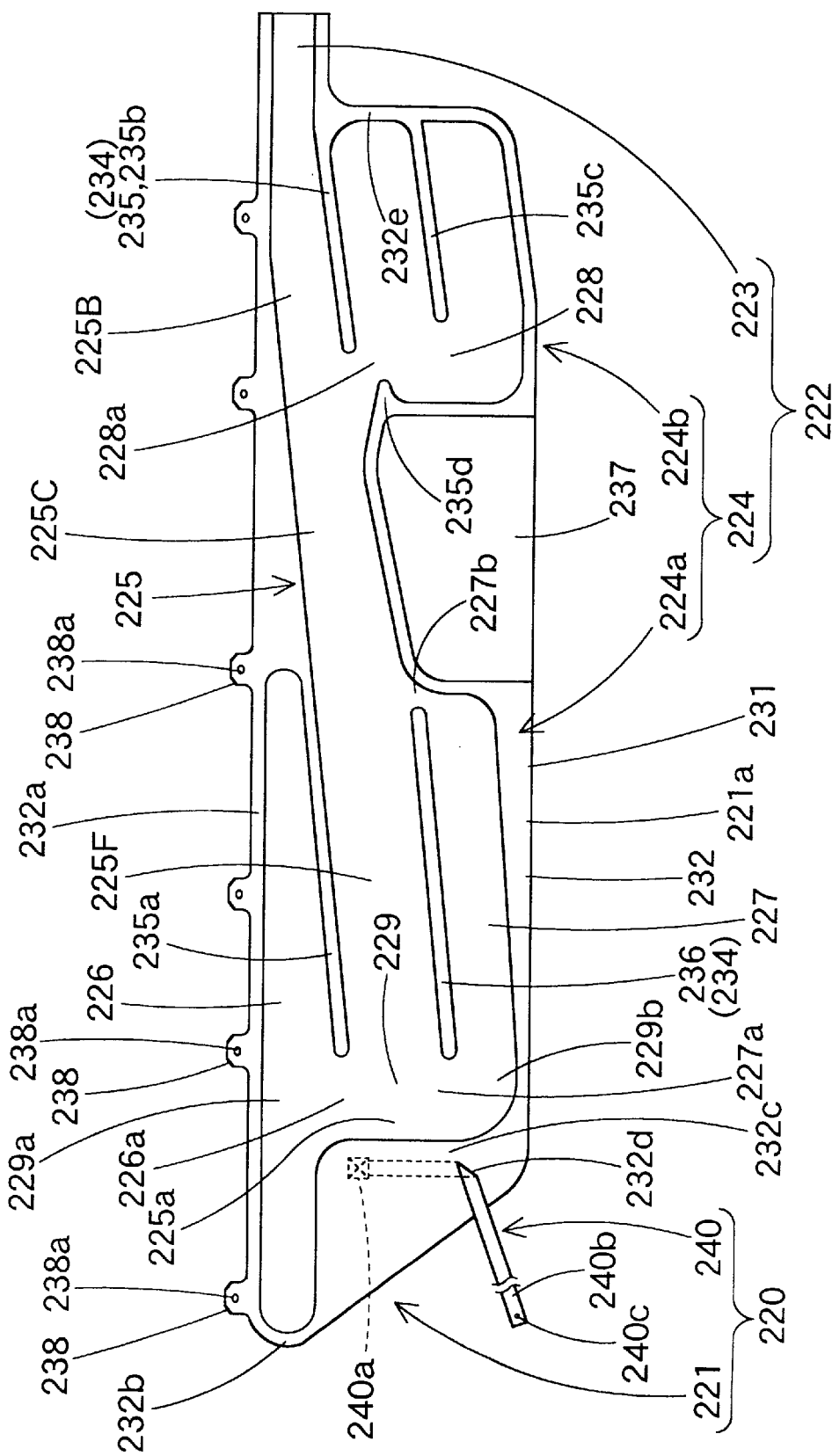
FIG. 31 is a front elevation showing a developed state at an uninflated time of the airbag in accordance with the fifteenth embodiment.

These front extension regulating portion 235a and central regulating portion 236 are arranged to leave individual clearances from the vertical edge 232c, as shown in FIG. 31. The upper and lower auxiliary inflating chambers 226 and 227 employ those clearances as inlets 226a and 227a for the inflation gas G. The vertical edge 232c is arranged vertically on the rear face side. Here, the lower auxiliary inflating chamber 227 is provided with a clearance between the rear edge of the central regulating portion 236 and the peripheral edge portion 232. This clearance is employed as an auxiliary inlet 227b capable of introducing the inflation gas G thereinto by the lower auxiliary inflating chamber 227. The auxiliary inlet 227b is provided so that the lower auxiliary inflating chamber 227 can be inflated more quickly than the upper auxiliary inflating chamber 226. Here, the opening area of the auxiliary inlet 227b is made smaller than that of the inlet 227a so that the main inflating chamber 225 inflates quickly over its whole length.

Moreover, a longitudinal rod portion 229 is arranged on the front end side of the inflatable portion 224. This longitudinal rod portion 229 is formed to have the upper and lower auxiliary inflating chambers 226 and 227 in the vicinities of the inlets 226a and 227a, and a front portion 225a of the front side chamber 225F. The longitudinal rod portion 229 is inflated into a substantially vertical column shape.

Moreover, the rear side of the upper edge 232a of the peripheral edge portion 232 and the rear extension regulating portion 235b form the upper and lower edges of the rear side chamber 225B. Also, the rear auxiliary inflating chamber 228 is provided with a clearance between the front end of the rear extension regulating portion 235b and the rear front extension regulating portion 235b. This clearance is employed as an inlet 228a for the inflation gas G by the rear auxiliary inflating chamber 228. In this embodiment, the rear front extension regulating portion 235d extends backward to below the front end of the rear extension regulating portion 235b. At the portion of the inlet 228a, therefore, the inflation gas G flowing in front of the rear side chamber 225B is reversed to flow into the rear auxiliary inflating chamber 228. Here, the rear lower extension regulating portion 235c regulates the width of the rear auxiliary inflating chamber 228 when fully inflated.

On the upper edge 232a of the peripheral edge portion 232, there are formed a plurality of mounting portions 238. Each of these mounting portions 238 is provided at its center with a mounting hole 238a for inserting the mounting bolt 46 thereinto. This mounting hole 238a is formed by boring the hollow-woven airbag body 221. On each mounting portion 238, moreover, there is fixed the mounting bracket 45, as shown in FIGS. 27 to 29. By using the mounting brackets 45 and the bolts 46, the folded airbag 220 is fixed on the inner panel 7 and the roof side rail body 9 of the body 1. The mounting bolts 46 are inserted into the mounting holes 45c and 238a and screwed into the nuts 7b and 9b. These nuts 7b and 9b are fixed on the circumferential edges of the mounting holes 7a and 9a of the inner panel 7 and the roof side rail body 9.

In this embodiment, the belt portion 240 is stitched at its proximal portion 240a to the exterior face in the vicinity of the upper portion of the vertical edge 232c. The distal end portion 240b of the belt portion 240 is extended to the interior side through an insert hole 232d. In the airbag body 221, the insert hole 232d is arranged in the vicinity of the lower portion of the vertical edge 232c of the peripheral edge portion 232. The distal end portion 240b of the belt portion 240 is provided with a mounting hole 240c for inserting a bolt 241 (as shown in FIG. 27) thereinto. The distal end portion 240b is fixed on the side panel 2 of the body 1 by means of the bolt 241. The belt portion 240 is set to a predetermined length. Specifically, this length of the belt portion 240 establishes a forward tension on the side of a lower edge 221a of the airbag body 221 when the airbag 220 is inflated.

Figure 32:
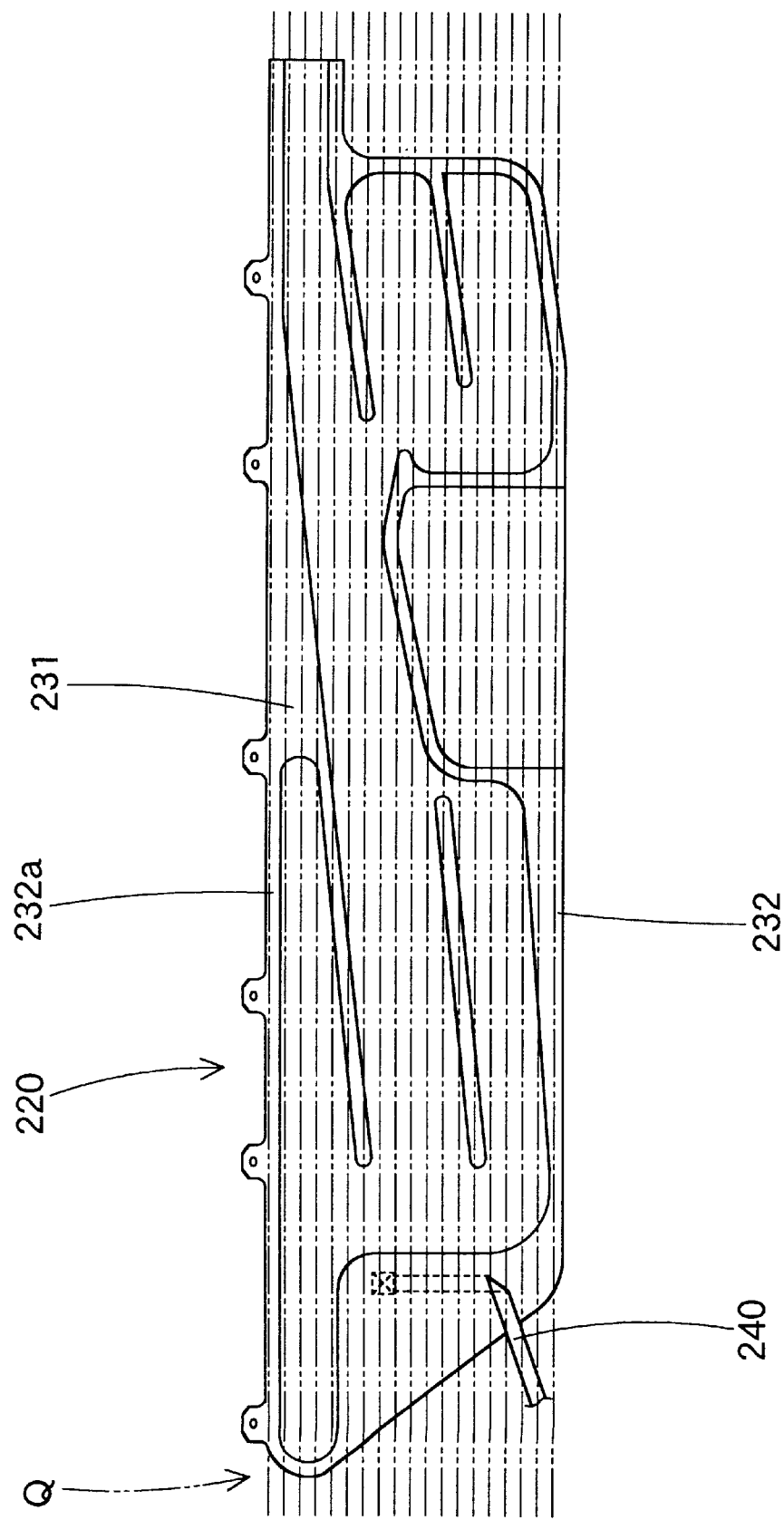
FIG. 32 is a diagram showing the folds, along which the airbag in accordance with the fifteenth embodiment is to be folded.
Figure 33:
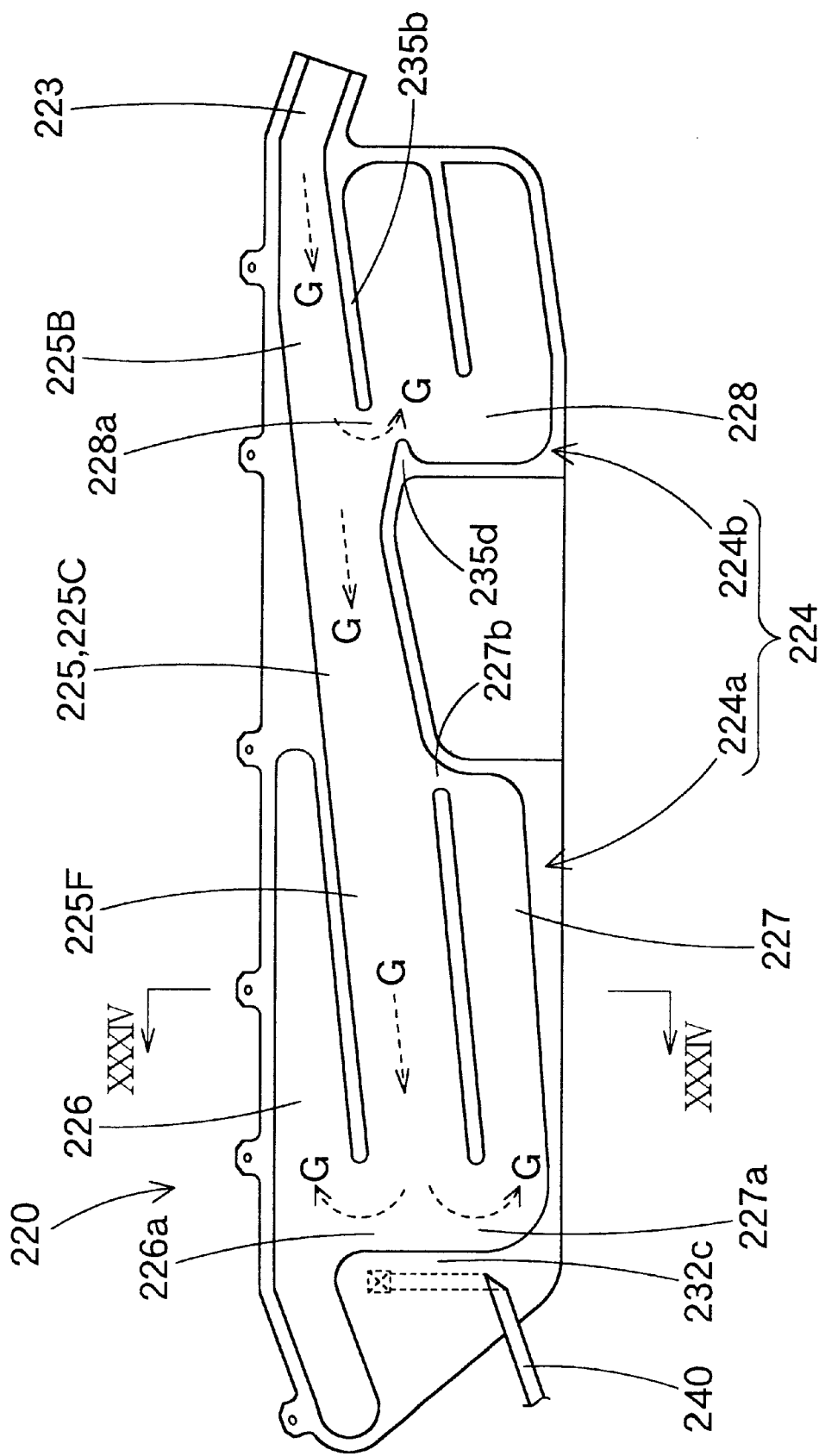
FIG. 33 is a front elevation in the completely inflated state of the airbag itself in accordance with the fifteenth embodiment.

Moreover, the airbag 220 is folded in the bellows shape from the lower edge to the upper edge of the airbag 220 in the developed state. The folds Q are in parallel with the upper edge 232a of the peripheral edge portion 232, as shown in FIG. 32. After folding, moreover, the airbag body 221 is wound at a predetermined interval with a breakable tape so that it may not collapse.

Additionally, after the folding, the mounting brackets are attached to the individual mounting portions 238. Moreover, the gas inlet portion 223 is unfolded, and the inflator 18 is inserted into the gas inlet portion 223. Then, the mounting bracket 15 is attached to the outer circumference of the gas inlet portion 223 to form the airbag assembly. In this state, the standby state is established for awaiting the mounting to the vehicle.

After this, the mounting bracket 15 is arranged at a predetermined position of the rear pillar body 10 and is fixed on the rear pillar body 10 by means of the bolts 16. The individual mounting brackets 45 are arranged at predetermined positions of the inner panel 7 and the roof side rail body 9 and are fixed on the inner panel 7 and the roof side rail body 9 by means of the bolts 46. The belt portion 240 is pulled out to fix its distal end portion 240b on the side panel 2 by means of the bolt 241. Moreover, the front pillar garnish 12, the roof interior cover 13 and the rear pillar garnish 14 are mounted on the body 1. As a result, the head-protecting airbag system M2 can be mounted to the vehicle.

When the inflator 18 is activated after the mounting to the vehicle, moreover, the inflation gas G flows from the inflator 18 through the gas inlet portion 223 into the main inflating chamber 225 of the inflatable portion 224. The inflation gas G further flows from the front side chamber 225F of the main inflating chamber 225 through the inlets 226a and 227a into the upper and lower auxiliary inflating chambers 226 and 227. The inflation gas G flows from the rear side chamber 225B of the main inflating chamber 225 through the inlet 228a into the rear auxiliary inflating chamber 228. As a result, the front and rear seat inflating portions 224a and 224b of the inflatable portion 224 are inflated. At this time, the breakable tape (not shown), wound on the airbag 220, breaks. Moreover, the individual door portions 12a, 13a and 14c of the rear panel portion 14b in the front pillar garnish 12, the roof interior finish 13 and the rear pillar garnish 14 are pushed and opened by the inflated airbag body 221. Then, the airbag 220 is inflated so as to cover the opening W, as shown by double-dotted lines in FIGS. 27 to 30.

At this initial inflation stage, in the airbag 220 of the embodiment, the main inflating chamber 225 is arranged to extend substantially straight forward from the gas inlet portion 223. As a result, the main inflating chamber 225 is quickly inflated. And, this main inflating chamber 225 is arranged long in the airbag 220. In the front seat inflating portion 224a, on the other hand, the front side chamber 225F of the main inflating chamber 225 is arranged between the upper and lower auxiliary inflating chambers 226 and 227, that is, in the vicinity of the vertically intermediate portion. As a result, the main inflating chamber 225 is arranged long in the vicinity of the vertically intermediate portion of the airbag 220. In short, the main inflating chamber 225 is inflated over a wide area.

The front seat inflating portion 224a comprises the front side chamber 225F of the main inflating chamber 225 and the upper and lower auxiliary inflating chambers 226 and 227. These upper and lower auxiliary inflating chambers 226 and 227 communicate with the front end side of the front side chamber 225F. As soon as the front side chamber 225F is charged with the inflation gas G, this inflation gas G flows into the upper and lower auxiliary inflating chambers 226 and 227. This is because the inflation gas G having flowed from the gas inlet portion 223 into the main inflating chamber 225 has an inertial force causing the flow to move forward. Thus, the inflation gas G fills up those upper and lower auxiliary inflating chambers 226 and 227. As a result, the front seat inflating portion 224a itself is quickly inflated.

Therefore, the airbag 220 in accordance with the fifteenth embodiment is provided with the front and rear seat inflating portions 224a and 224b so that it is long in the longitudinal (for and aft) direction. However, the airbag 220 in accordance with the fifteenth embodiment is enabled to restrain the passenger quickly and widely before completion of the inflation by the main inflating chamber 225 which is arranged long in the longitudinal (fore and aft) direction. On the other hand, the front seat inflating portion 224a, as apart from the gas inlet portion 223, can be quickly inflated by the main inflating chamber 225.

In the airbag 220 in accordance with the fifteenth embodiment, moreover, the front side chamber 225F of the main inflating chamber 225 extends substantially in the fore and aft direction, as shown in FIG. 31. On the other hand, the vertical edge 232c of the peripheral edge portion 232 on the side of the front edge 232b is vertically arranged on its rear face. As a result, the front end of the front side chamber 225F is arranged to intersect the vertical edge 232c substantially perpendicularly. Also, the upper and lower auxiliary inflating chambers 226 and 227 have the inlets 226a and 227a confronting each other over and below the front end side of the front side chamber 225F of the main inflating chamber. At the initial stage of the inflow of the inflation gas G, therefore, the inflation gas G having passed through the main inflating chamber 225 is separated vertically smoothly by the guide of the vertically extending vertical edge 232c. And, the inflation gas G flows directly into the upper and lower auxiliary inflating chambers 226 and 227 through the individual inlets 226a and 227a. As a result, the upper and lower auxiliary inflating chambers 226 and 227 can be readily inflated.

In the airbag 220 of the embodiment, still moreover, the lower auxiliary inflating chamber 227 is provided with the inlet 227a on the front side and the auxiliary inlet 227b on the rear side. In other words, the lower inflating chamber 227 has more inlets than the upper auxiliary inflating chamber 226. Therefore, the lower auxiliary inflating chamber 227 is more quickly inflated than the upper auxiliary inflating chamber 226. Also, the lower inflating chamber 227 is located apart from the upper edge of the peripheral edge of the opening W. In other words, the lower inflating chamber 227 is an area capable of restraining the passenger more completely than the upper auxiliary inflating chamber 226. Therefore, the airbag 220 of the embodiment can better improve the passenger restraining performance before completion of the inflation.

Moreover, the airbag 220 in accordance with the fifteenth embodiment is constructed, as follows, at the portion of the inlet 228a of the inflation gas G into the rear auxiliary inflating chamber 228. Specifically, the rear front extension regulating portion 235d extends so backward as to protrude below the front end of the rear extension regulating portion 235b. Therefore, the inflation gas G from the gas inlet portion 223 flows forward in the rear side chamber 225B of the main inflating chamber 225. However, the inflation gas G is reversed to flow into the rear auxiliary inflating chamber 228. At the initial stage of the inflation, therefore, the inflation gas G to flow forward from the gas inlet portion 223 is not reversed but can easily pass through the inlet 228a. In other words, the inflation gas G at the initial inflation stage flows more to the front seat inflating portion 224a on the front side. As a result, in the airbag 220 in accordance with the fifteenth embodiment, the front seat inflating portion 224a, as apart from the gas inlet portion 223, can be inflated more quickly.

Still moreover, the airbag 220 in accordance with the fifteenth embodiment is provided with the longitudinal rod portion 229 which is vertically inflated when it is developed and inflated. Also, the belt portion 240 draws a lower end 229b forward on an upper end 229a. Specifically, the belt portion 240 applies such a torque to the longitudinal rod portion 229 as to turn the lower end 229b forward. In the airbag 220, therefore, a high tension is established on the lower edge 221a of the airbag body 221 by the belt portion 240.

Here, the airbag 220 in accordance with the fifteenth embodiment has been described in the case in which the upper and lower auxiliary inflating chambers 226 and 227 are individually provided by one chamber. However, the upper and lower auxiliary inflating chambers 226 and 227 may be divided by providing an extension regulating portion or a central regulating portion suitably. Likewise, the rear auxiliary inflating chamber 228 may also be divided into three or more chambers by providing the extension regulating portion 235 and the central regulating portion 236 of the uninflating portion 231 and so on suitably.

When the airbag is to be formed by the hollow-weaving method using warps and wefts, moreover, it may be constructed and arranged like airbag 320 of a sixteenth embodiment shown in FIGS. 35 to 38. Specifically, a main inflating chamber 325 of the airbag 320 is arranged substantially in parallel with warps V or wefts H. The airbag 320 is folded on folds along the main inflating chamber 325.

The airbag 320 of the sixteenth embodiment is a head protecting airbag system M3. The airbag 320 is arranged in a folded shape on the upper edge portion of the opening W of the door or window on the interior side. Specifically, the airbag 320 is folded and arranged from the front pillar portion PF to the roof side rail portion R.

The head-protecting airbag system M3 is constructed, as in the first embodiment, to include the airbag 320, the inflator 18, the mounting bracket 15 and the airbag cover 11. Of these, the inflator 18, the mounting bracket 15 and the airbag cover 11 are similar to those of the first embodiment, and their description will be omitted.

The airbag 320 is constructed, as shown in FIGS. 38 to 41, to include an airbag body 321 and a belt portion 340. The airbag body 321 is formed into a flexible bag shape. This airbag body 321 is formed by the hollow-weaving method. This hollow-weaving method employs polyamide yarns or the like as the warps V and the wefts H (as should be referred to an enlarged portion showing the encircled texture of FIG. 38). The belt portion 340 is stitched to a rear edge 332a of the airbag body 321. The belt portion 340 is made of a flexible woven fabric using polyamide yarns or the like.

Figure 41:
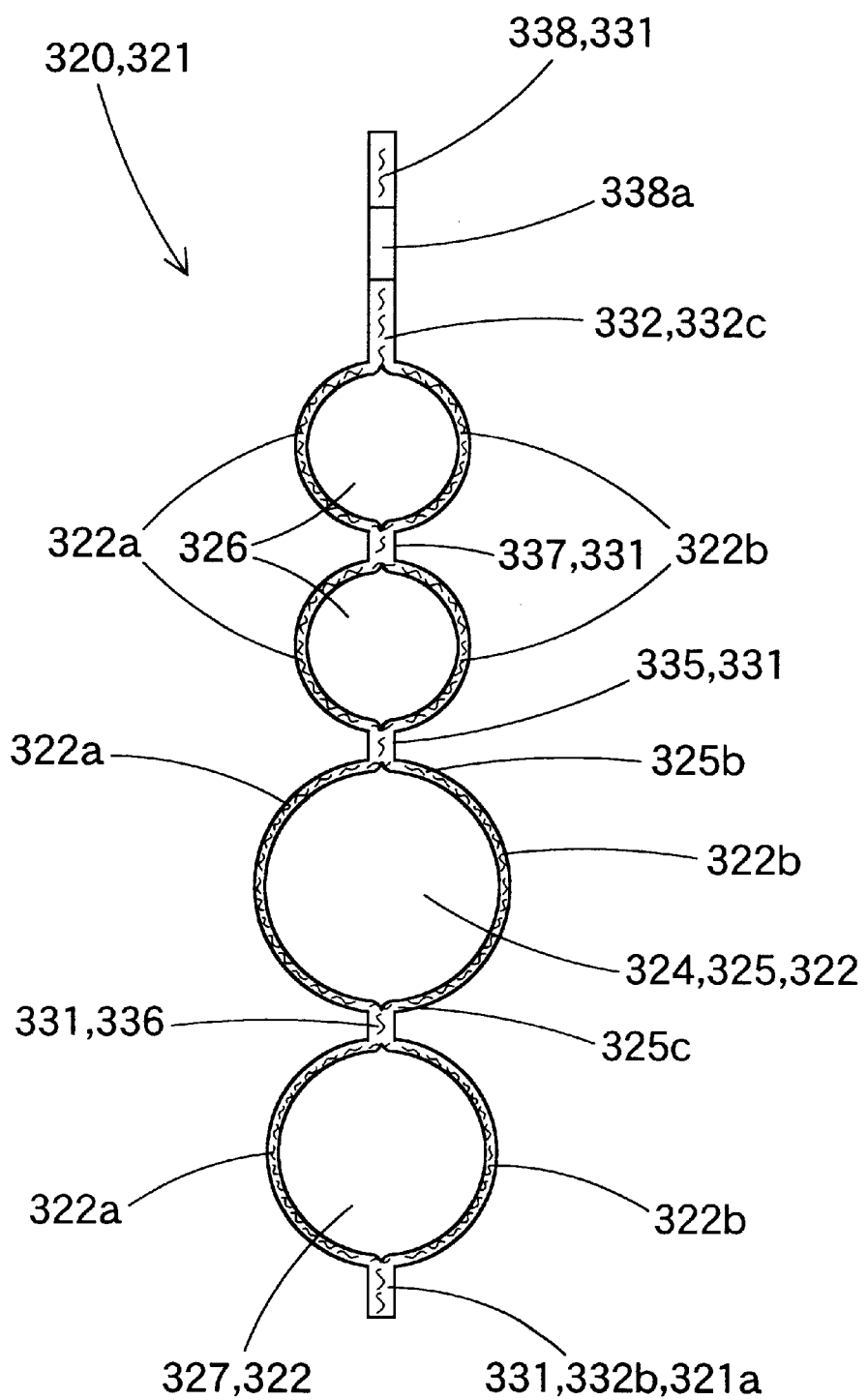
FIG. 41 is a sectional view showing the airbag of the sixteenth embodiment at the completely inflated time and presents an enlarged sectional view taken along line XXXXI—XXXXI of FIG. 40.

The airbag body 321 comprises an inflating portion 322 and an uninflating portion 331. The inflating portion 322 separates, when fed with the inflation gas from the inflator 18, interior or exterior side wall portions 322a and 322b (as shown in FIG. 41) from each other. In other words, the inflating portion 322 is inflated to become thicker when fed with the inflation gas. By this inflation gas thus fed, the inflating portion 322 is inflated from the folded state. The uninflating portion 331 neither admits the inflation gas nor becomes wider. Here, the airbag body 321 may be coated on its surface with silicone or the like after the individual portions 322 and 331 were hollow-woven. This coating is made to improve the heat resistance and the sealing properties.

The inflating portion 322 comprises a gas inlet portion 323 and an inflatable portion 324. The gas inlet portion 323 is arranged on the front end side of the inflatable portion 324 to introduce the inflation gas into the inflatable portion 324. The inflatable portion 324 extends backward in communication with the gas inlet portion 323. The inflatable portion 324 is formed in the bag shape and is inflated to cover the opening W on the interior side.

The gas inlet portion 323 is formed in a longitudinal (fore and aft) extending cylinder shape opened on the front end side. The inflator 18 is inserted into the gas inlet portion 323 from the front end side. And, the gas inlet portion 323 is clamped on the inflator 18 by the mounting bracket 15. As a result, the gas inlet portion 323 is joined to the inflator 18. Here, an inner tube may be fixed on the inner circumference of the gas inlet portion 323 so as to retain the heat resistance. This inner tube is made of the same material as that of the airbag body 321 itself.

The inflatable portion 324 comprises the main inflating chamber 325 and upper and lower auxiliary inflating chambers 326 and 327. The main inflating chamber 325 extends straight backward from the gas inlet portion 323. The main inflating chamber 325 is arranged substantially in parallel with the wefts H of the texture of the airbag body 321. The upper and lower auxiliary inflating chambers 326 and 327 communicate with a rear portion 325a of the main inflating chamber 325. Also, the upper and lower auxiliary inflating chambers 326 and 327 are arranged over and below the main inflating chamber 325, respectively.

The uninflating portion 331 is so woven that the interior wall portion 322a and the exterior wall portion 322b of the airbag body 321 are joined. The uninflating portion 331 comprises a peripheral edge portion 332 and a regulating portion 334. The peripheral edge portion 332 is arranged on the outer circumference edges of the gas inlet portion 323 and the inflatable portion 324. The peripheral edge portion 332 is so densely woven as to prevent gas leaks. The regulating portion 334 comprises an upper regulating portion 335, a lower regulating portion 336 and an upper auxiliary regulating portion 337. The upper and lower regulating portions 335 and 336 extend backward from the front side of the peripheral edge portion 332 into the region of the inflatable portion 324. The upper auxiliary regulating portion 337 is arranged over the upper regulating portion 335 and in parallel with the upper regulating portion 335. The upper auxiliary regulating portion 337 regulates the width of the upper auxiliary inflating chamber 26 when fully inflated.

Figure 39:
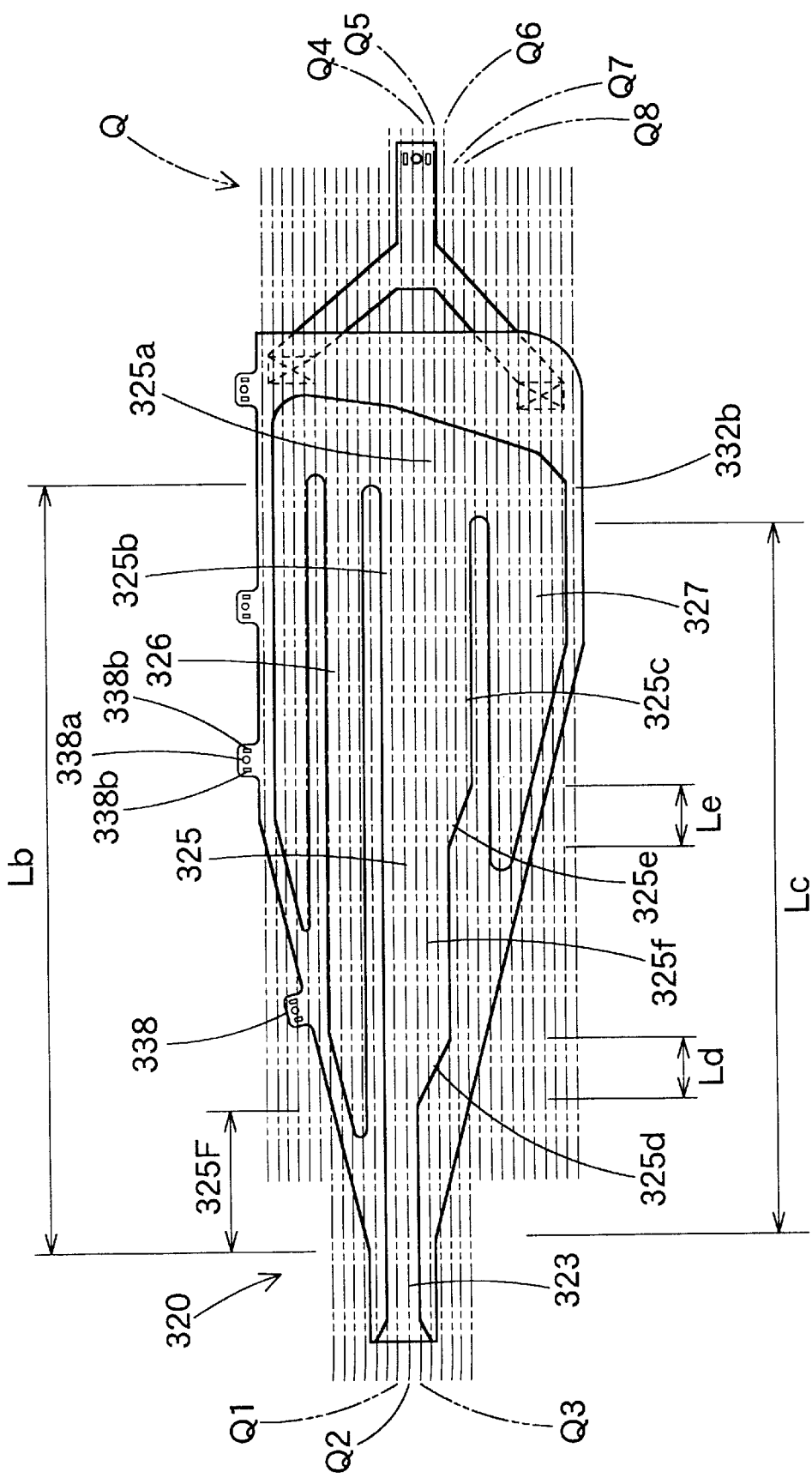
FIG. 39 is a diagram showing the folds, along which the airbag of the sixteenth embodiment is to be folded.

The upper regulating portion 335 and the lower regulating portion 336 regulate the upper and lower edges 325b and 325c of the main inflating chamber 325. And, a lower edge 335b of the upper regulating portion 335 is arranged in the longitudinal (fore and aft) direction. Also, the upper edge 325b of the main inflating chamber 325, as regulated by the lower edge 335b, is in parallel all over its length with the wefts H in the texture of the airbag body 321. On the other hand, the lower regulating portion 336 is gradually lowered with a step in the vicinity of the intermediate portion of the forward and backward direction on the side of an upper edge 336b. However, the lower edge 325c of the main inflating chamber 325, as regulated by the upper edge 336b, is arranged substantially in the fore and aft direction. Therefore, the lower edge 325c of the main inflating chamber 325 is substantially in parallel all over its length with the wefts H in the texture of the airbag body 321. Here in this embodiment, the lower edge 325c of the main inflating chamber 325 is provided with inclined nonparallel portions 325d and 325e. The total of the lengths Ld and Le, as taken along the main inflating chamber 325, of those nonparallel portions 325d and 325e is approximately 9% of the total of lengths Lb and Lc. These lengths Lb and Lc are taken of the upper edge 325b and the lower edge 325c of the main inflating chamber 325 along the main inflating chamber 325 (as shown in FIG. 39). In this embodiment, more specifically, approximately 91% of the total length of the upper edge 325b and the lower edge 325c of the main inflating chamber 325 is formed in parallel with the wefts H of the texture.

Figure 38:
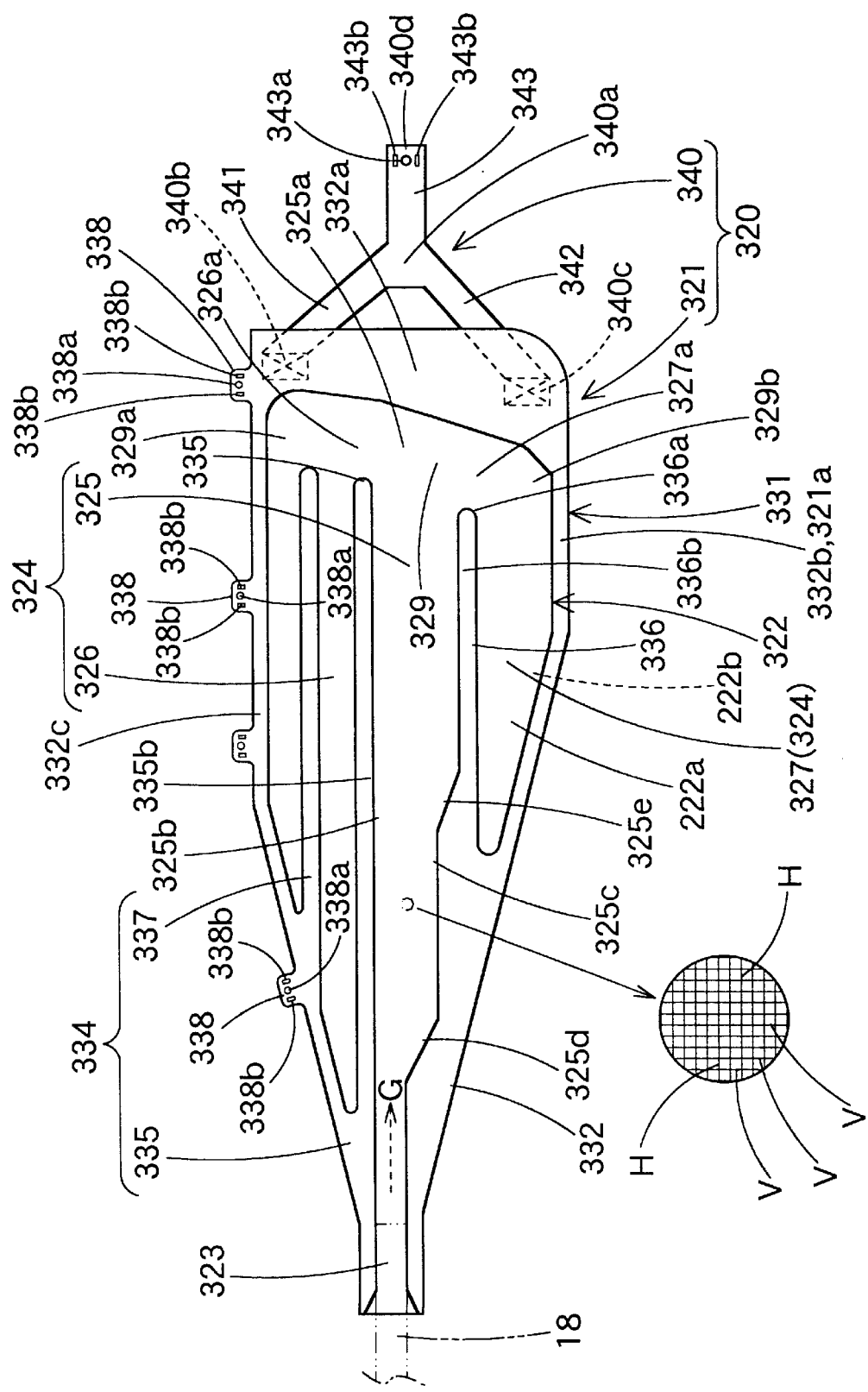
FIG. 38 Is a front elevation showing a developed state at an uninflated time of the airbag in accordance with the sixteenth embodiment.

On the other hand, the rear ends 335a and 336a of those upper and lower regulating portions 335 and 336 are arranged, as shown in FIG. 38, in a direction to intersect the rear edge 332a of the peripheral edge portion 332. In other words, the rear edge 332a of the peripheral edge portion 332 is arranged substantially vertically. Also, the rear ends 335a and 336a are arranged with clearances from the rear edge 332a. These clearances are employed as inlets 326a and 327a for introducing the inflation gas G by the upper and lower auxiliary inflating chambers 326 and 327.

Also, a longitudinal rod portion 329 is arranged on the rear end portion of the inflatable portion 324. The longitudinal rod portion 329 is inflated in a substantially vertical column shape. This longitudinal rod portion 329 comprises the upper and lower auxiliary inflating chambers 326 and 327 in the vicinity of the inlets 326a and 327a, and the rear portion 325a of the main inflating chamber 325.

Figure 35:
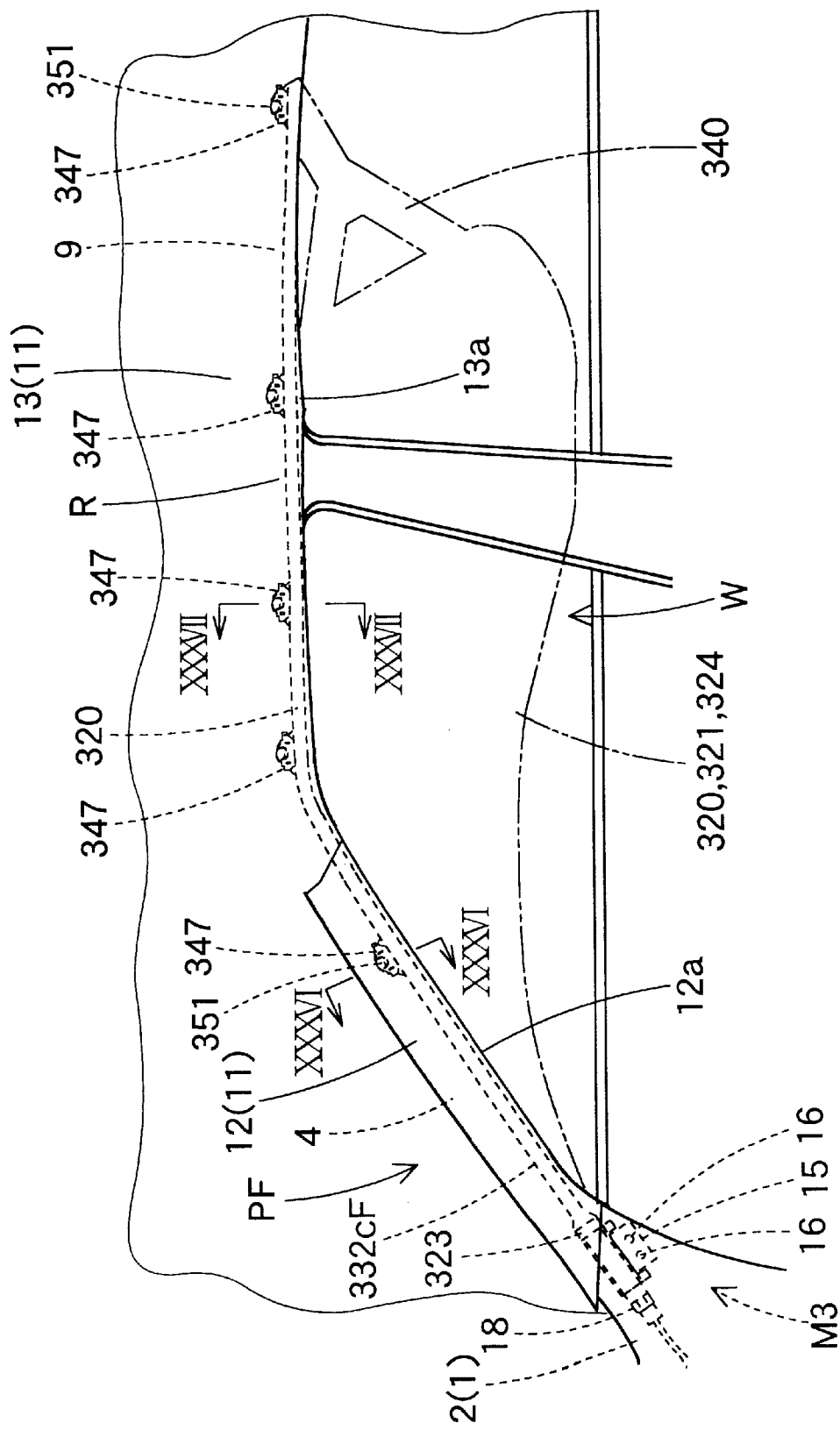
FIG. 35 is a front elevation taken from the inside of a vehicle and shows the state in which an airbag in accordance with a sixteenth embodiment is accommodated.
Figure 36:
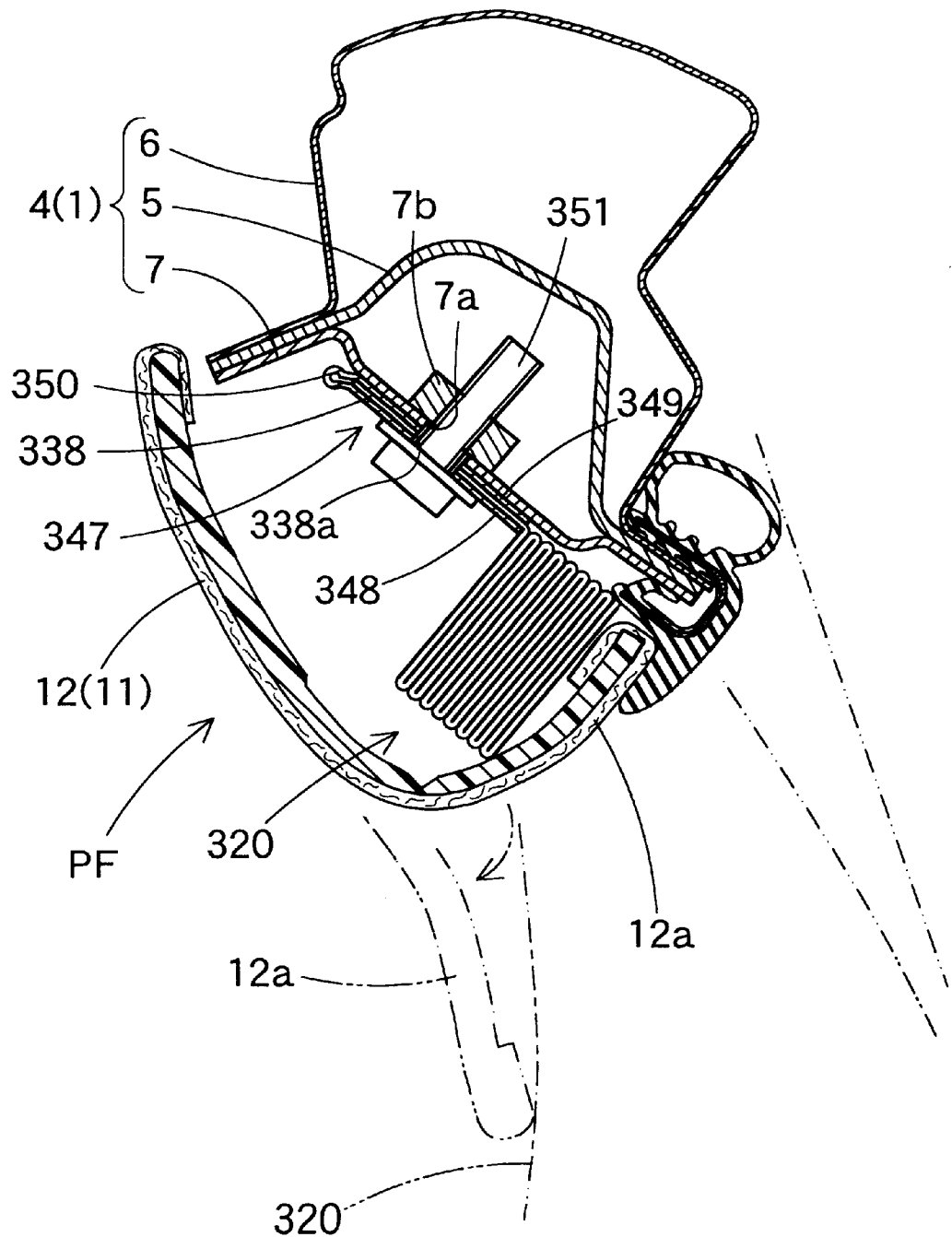
FIG. 36 is an enlarged schematic sectional view taken along line XXXVI—XXXVI of FIG. 35.
Figure 37:
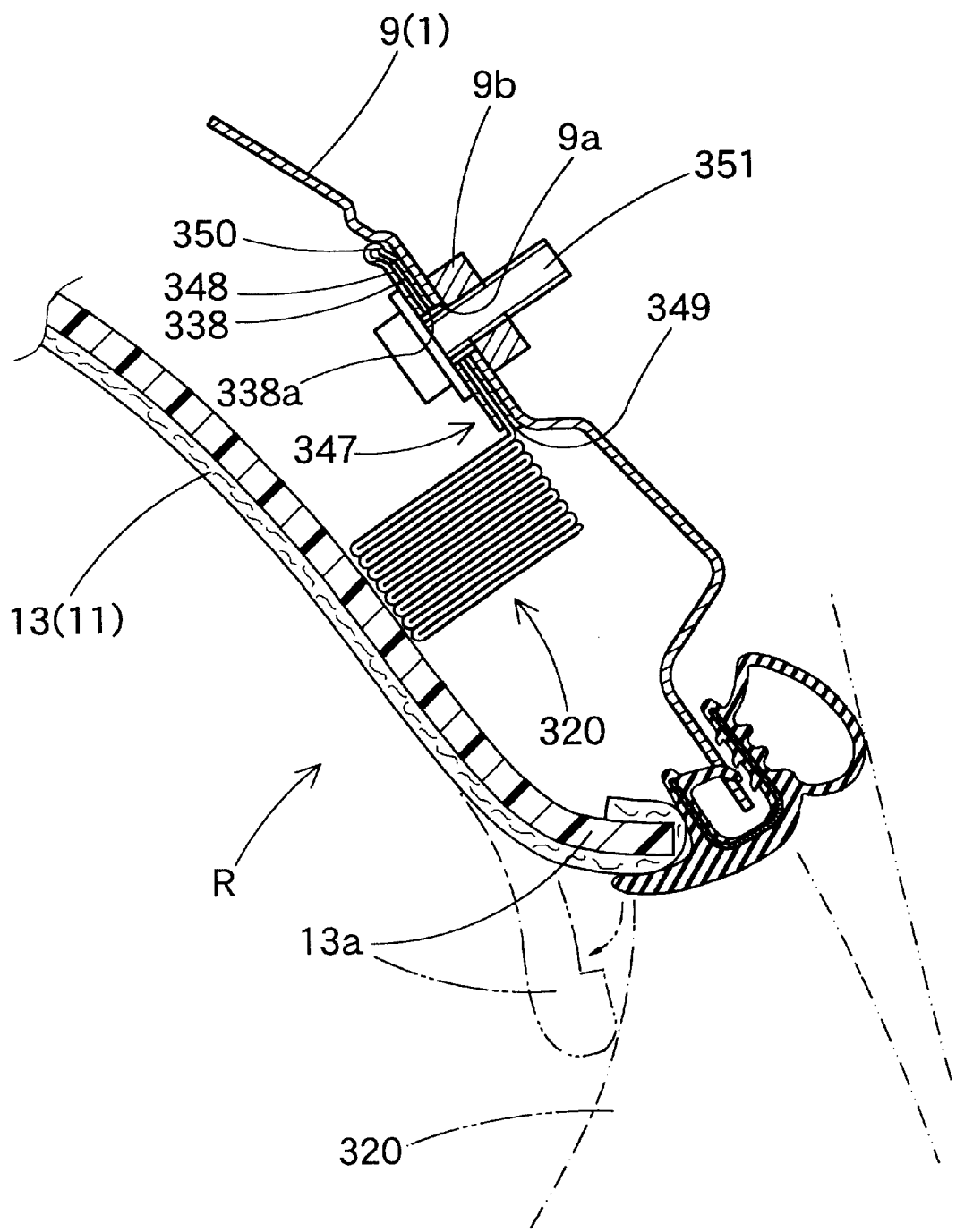
FIG. 37 is an enlarged schematic sectional view taken along line XXXVII—XXXVII of FIG. 35.

On the upper edge 332c of the peripheral edge portion 332, moreover, there are formed a plurality of mounting portions 338. Each of these mounting portions 338 is provided at its center with a mounting hole 338a for inserting the mounting bolt 351 thereinto. Moreover, each mounting portion 338 is provided, on the two sides of the mounting hole 338a, with through holes 338b opened in a rectangular shape. Into these through holes 338b, there are inserted individual retaining legs 349b of a later-described mounting bracket 347. The airbag body 321 is bored after the hollow-weaving operation to have the holes 338a and 338b. And, the mounting brackets 347 of a sheet metal are fixed on those individual mounting portions 338, as shown in FIGS. 35 to 37. By these mounting brackets 347 and bolts 351, the folded airbag 320 is mounted on the inner panel 7 and the roof side rail body 9 of the body 1.

Each mounting bracket 347 is constructed, as shown in FIGS. 36 and 37 and FIGS. 42 to 45, to include an interior side inner plate portion 348 and an exterior side outer plate portion 349. The mounting portion 338 is arranged between the inner and outer plate portions 348 and 349.

Figure 42:
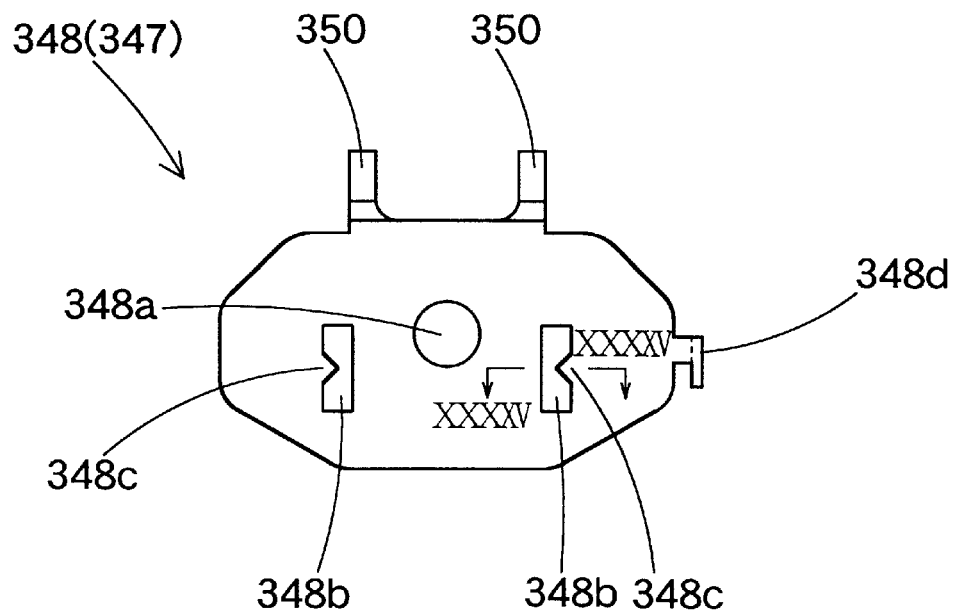
FIG. 42 is a front elevation showing an inner plate portion of a mounting bracket to be used for mounting the airbag in accordance with the sixteenth embodiment on a vehicle, and is taken in the direction XXXXII of FIG. 44.
Figure 43:
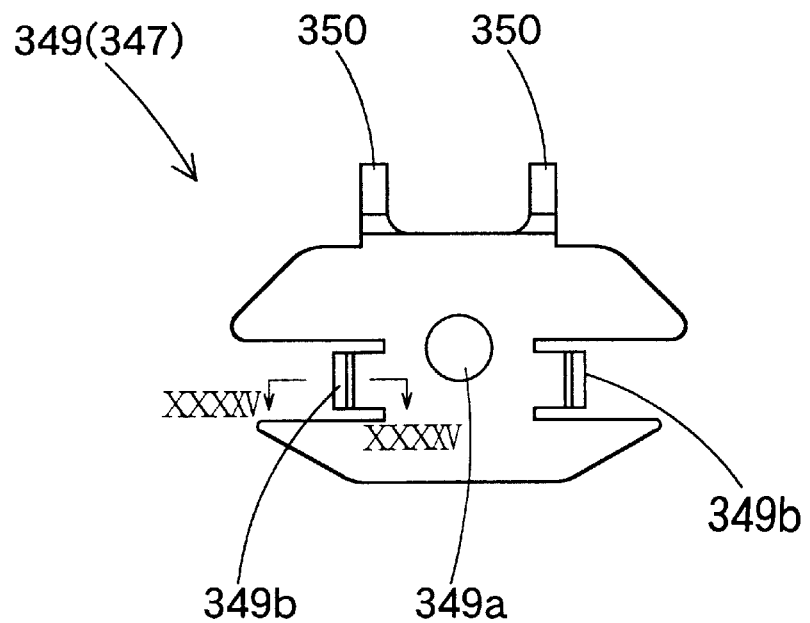
FIG. 43 is a front elevation showing an outer plate portion of the mounting bracket to be used for mounting the airbag in accordance with the sixteenth embodiment on the vehicle, and is taken in the direction XXXXIII of FIG. 44.
Figure 44:
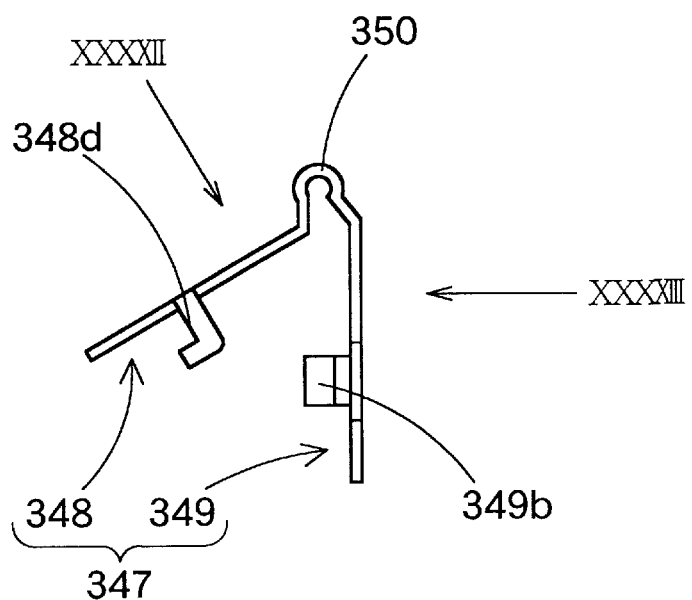
FIG. 44 is a side elevation showing the mounting bracket to be used for mounting the airbag in accordance with the sixteenth embodiment on the vehicle.
Figure 45:
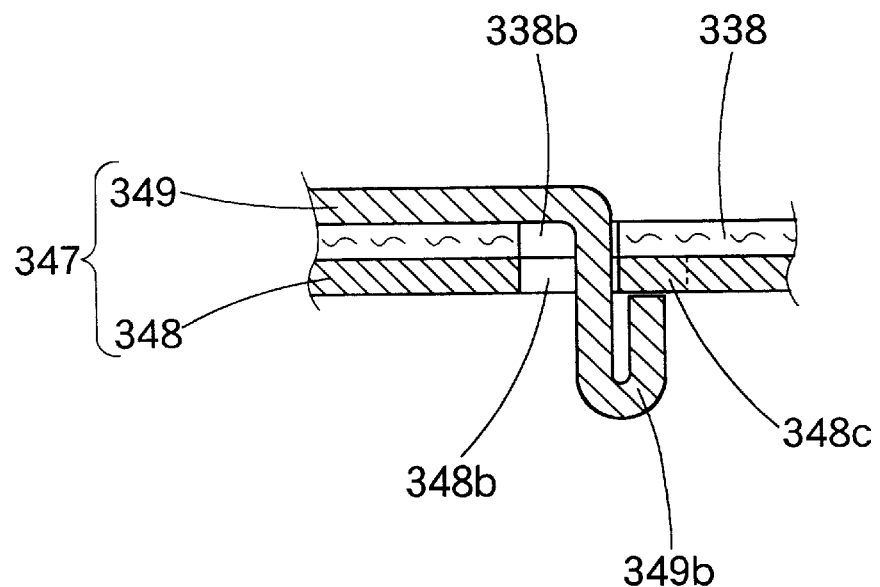
FIG. 45 is a partial sectional view showing the state in which the same mounting bracket is mounted on the airbag and presents an enlarged sectional view taken along line XXXXV—XXXXV of FIGS. 42 and 43.

These inner and outer plate portions 348 and 349 are joined to each other at two portions on the upper edge side by a band-shaped joint portion 350. The inner and outer plate portions 348 and 349 are provided at their centers, as shown in FIGS. 42 and 43, with mounting holes 348a and 349a for inserting the mounting bolts 351 thereinto. On the other hand, the inner plate portion 348 is provided on the two right and left sides of the mounting hole 348a, as shown in FIGS. 42 and 45, with retaining holes 348b having a substantially rectangular shape. A projection 348c having the shape of a triangular sheet is formed on the inner peripheral edge of each retaining hole 348b. On the end side of the inner plate portion 348, as shown in FIGS. 42 and 44, there is formed a hook-shaped retaining member 348d. This retaining member 348d protrudes to the outside of the vehicle. The retaining member 348d is retained on the peripheral edge of the not-shown retaining hole which is formed in the inner panel 7 or the roof side rail body 9. The retaining member 348d prevents the mounting bracket 347 from dislocating, and prevents the mounting bracket 347 from turning, because the mounting bracket 347 will turn when it is fixed on the inner panel 7 or the roof side rail body 9 by using the bolts 351. On the other hand, the outer plate portion 349 is provided on the two right and left sides of the mounting hole 349a with the retaining legs 349b, as shown in FIGS. 43 to 45. These retaining legs 349b are protruded to the interior side and are folded back. The retaining legs 349b are retained by the projections 348c of the inner plate portion 348.

The mounting brackets 347 are fixed on the individual mounting portions 338 in the following manner. First of all, the inner and outer plate portions 348 and 349 are opened away from each other, and each mounting portion 338 is arranged between the inner and outer plate portions 348 and 349. Next, the inner and outer plate portions 348 and 349 are closed, and each retaining leg 349b of the outer plate portion 349 is retained through the through hole 338b of the mounting portion 338 on the projection 348c of the inner plate portion 348. As a result, each mounting bracket 347 is fixed on each mounting portion 338 (as shown in FIG. 45).

Moreover, the retaining member 348d is retained on the circumferential edge of the retaining hole (not shown) of the inner panel 7 or the roof side rail body 9. Next, as shown in FIGS. 36 and 37, the mounting bolt 351 is inserted into the mounting holes 348a, 338a and 349a and screwed into the nuts 7b and 9b. As a result, the folded airbag 320 is mounted to the body 1.

The belt portion 340 is trifurcated in this embodiment to have mounting member portions 341, 342 and 343. These mounting member portions 341, 342 and 343 are joined at an intersection 340a. And, the end portions of the mounting member portions 341 and 342, that is, the proximal portions 340b and 340c of the belt portion 340 are stitched to the circumferential edge of the longitudinal rod portion 329. Specifically, the proximal portions 340b and 340c are stitched over and below the rear edge 332a of the airbag body 321. The leading end of the mounting member portion 343, that is, the distal end portion 340d of the belt portion 340 is provided with a mounting hole 343a and two through holes 343b. The mounting bracket 347 is attached, after the airbag 320 is folded up, to the distal end portion 340d. The distal end portion 340d is attached like the mounting portion 338 to the roof side rail body 9 by means of the bolts 351.

Figure 40:
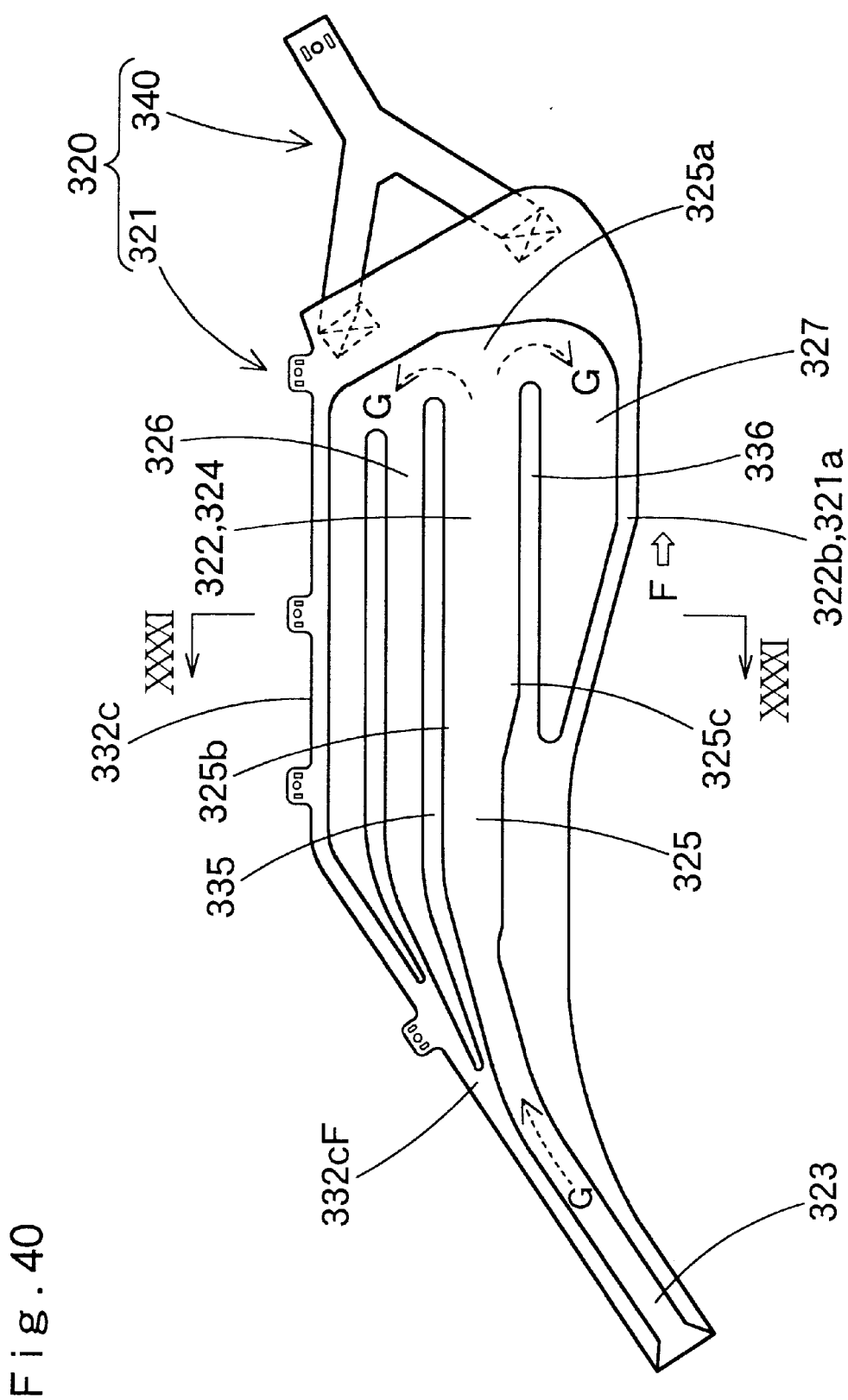
FIG. 40 is a front elevation in the completely inflated state of the airbag itself of the sixteenth embodiment.

Here, the belt portion 340 is set to a predetermined length. Specifically, the length of the belt portion 340 is set to apply the backward tension F (as shown in FIG. 40) to a lower portion 321a of the airbag body 321 when the airbag 320 is inflated after being mounted to the vehicle.

The airbag 320 is folded in the bellows shape from the lower edge to the upper edge of its developed state. The folds Q of this bellows shape extend along the main inflating chamber 325, as shown in FIG. 39. After the folding the airbag 320, moreover, the airbag body 321 is wound at a predetermined interval with a breakable tape so that it may not collapse.

After the folding the airbag 320, the mounting member portion 343 of the belt portion 340 is pulled out. On the other hand, the mounting portion 338 on the front side is also pulled out. And, the mounting brackets 347 are attached to the distal end portion 340d of the mounting member portion 343 and all the mounting portions 338. Moreover, the gas inlet portion 323 is pulled out. Next, the inflator 18 is inserted into the gas inlet portion 323. Moreover, the mounting bracket 15 is attached to the outer circumference of the gas inlet portion 323 to form the airbag assembly.

The retaining member 348d of each mounting bracket 347 is retained on the circumferential edge of the retaining holes (not shown) of the inner panel 7 and the roof side rail body 9. On the other hand, the mounting bracket 15 is arranged at a predetermined position of the side panel 2 and is fixed on the side panel 2 by using the bolts 16. By using the bolts 351, each mounting bracket 347 is fixed on the inner panel 7 or the roof side rail body 9. Still moreover, the pillar garnish 12 and the roof interior cover 13 are mounted on the body 1. As a result, the head protecting airbag system M3 can be mounted to the vehicle.

Now, when the airbag 320 is mounted to the vehicle, the gas inlet portion 323 is slightly bent to lower the front end side (as shown in FIGS. 35 and 40). Specifically, the gas inlet portion 323 leads straight to a forward down-sloping front portion 332cF of the upper edge 332c of the peripheral edge portion 332. This front portion 332cF is arranged in the front pillar portion PF.

When the inflator 18 is activated after the mounting on the vehicle, the inflation gas G is fed from the inflator 18 through the gas inlet portion 323 to the inflatable portion 324, and the airbag 320 breaks the tape wound thereon (not shown). On the other hand, the airbag 320 pushes the pillar garnish 12 or the roof interior cover 13 to open their individual door portions 12a and 13a. The airbag 320 is inflated to such a size as to cover the opening W, as shown by the double-dotted lines in FIGS. 35 to 37.

In the airbag 320 in accordance with the sixteenth embodiment, at the initial inflow of the inflation gas G, as shown in FIGS. 38 and 40, the inflation gas G flows through the gas inlet portion 323 into the main inflating chamber 325 of the inflatable portion 324. Moreover, the inflation gas G flows from the rear portion 325a of the main inflating chamber 325 through the inlets 326a and 327a into the upper and lower auxiliary inflating chambers 326 and 327. The airbag 320 is fully inflated when the inflation gas G flows into the upper and lower auxiliary inflating chambers 326 and 327.

In the sixteenth embodiment, too, the main inflating chamber 325 is inflated before the upper and lower auxiliary inflating chambers 326 and 327. The main inflating chamber 325 extends straight backward from the gas inlet portion 323. Therefore, the main inflating chamber 325 is quickly inflated. On the other hand, the main inflating chamber 325 is arranged lengthwise in the longitudinal (fore and aft) direction at the vertically intermediate portion of the upper and lower auxiliary inflating chambers 326 and 327, that is, at the vertically intermediate portion of the inflatable portion 324. In short, the main inflating chamber 325 is arranged lengthwise in the fore and aft direction at the vertically intermediate portion of the inflatable portion 324. As a result, the main inflating chamber 325 is inflated over a wide area.

As a result, the airbag 320 of the sixteenth embodiment can inflate the main inflating chamber 325 quickly and widely before the inflation is completed. With this area of the main inflating chamber 325, moreover, the airbag 320 can restrict the passenger properly quickly and over a wide area before the airbag is fully inflated.

When fully inflated, the lower edge 321a of the airbag body 321 is pulled backward, as shown in FIG. 40, by the belt portion 340.

In the airbag 320 in accordance with the sixteenth embodiment, moreover, the airbag body 321 is formed by the hollow-weaving operation using the warps V and the wefts H. As a result, the airbag body 321 can be easily manufactured without stitching or adhering its peripheral edges.

In the airbag 320 in accordance with the sixteenth embodiment, moreover, a high tension acts on the upper edge 325b and the lower edge 325c on the peripheral edge of the main inflating chamber 325 when the main inflating chamber 325 is inflated. These upper edge 325b and lower edge 325c provide a boundary portion at the uninflating portion 331 (or the upper regulating portion 335 or the lower regulating portion 336). However, the main inflating chamber 325 is substantially in parallel with the wefts H of the texture. This prevents the net of the texture in the upper edge 325b or the lower edge 325c of the main inflating chamber 325 from expanding (or shifting). As a result, the airbag 320 can suppress the leakage of the inflation gas G from the upper edge 325b or the lower edge 325c of the main inflating chamber 325.

On the other hand, the main inflating chamber 325 extends substantially straight backward from the gas inlet portion 323. Moreover, the inflation gas G at the initial flow into the main inflating chamber 325 has a high pressure. Therefore, the inflation gas G under the high pressure flows straight along the main inflating chamber 325 toward the rear portion 325a spaced from the gas inlet portion 323. However, the folds Q are formed along the main inflating chamber 325 extending in the longitudinal (fore and aft) direction. Therefore, the inflation gas G under the high pressure flows along the folds Q1, Q2, Q3, Q4, Q5, Q6, Q7 and Q8 which are arranged in the region of the main inflating chamber 325. Specifically, the inflation gas G is at a right angle with respect to the individual portions 325f of the folds Q1, Q2, Q3, Q4, Q5, Q6, Q7 and Q8 but does not intersect the same. Therefore, the inflation gas G does not unfold the folds of the individual portions 325f but advances toward the rear portion 325a. As a result, the inflation gas G does not apply a partially high pressure to the portions 325f of the individual folds Q1, Q2, Q3, Q4, Q5, Q6, Q7 and Q8. In other words, the inflation gas G unfolds the folds by applying the pressure to the entire area, as extending long in the longitudinal (fore and aft) direction, of the individual fold portions 325f. As a result, the inflation gas G can suppress the gas leakage from the individual fold portions 325f without extending the net of the texture of the portions 325f (as shown in FIG. 39).

Therefore, the airbag 320 in accordance with the sixteenth embodiment can suppress the leakage of the inflation gas G. As a result, the airbag 320 can shorten the time required for the inflation to be complete.

In the airbag 320 in accordance with the sixteenth embodiment, on the other hand, approximately 91% of the total length of the upper edge 325b and the lower edge 325c of the main inflating chamber 325 is formed in parallel with the wefts H. In other words, the upper edge 325b and the lower edge 325c of the main inflating chamber 325 can be reliably constructed to inhibit gas from leaking. In the airbag 320 of the sixteenth embodiment, therefore, inflation gas G leaks can be properly suppressed.

In the airbag 320 of the sixteenth embodiment, moreover, the upper and lower regulating portions 335 and 336 are arranged to intersect the rear edge 332a of the peripheral edge portion 332 substantially at a right angle. The rear edge 332a is arranged substantially vertically. Specifically, the rear edge 332a of the uninflating portion 331 extends substantially vertically on the side of the rear portion 325a of the main inflating chamber 325 and over the upper and lower auxiliary inflating chambers 326 and 327. On the side of the rear portion 325a of the main inflating chamber 325, the upper and lower auxiliary inflating chambers 326 and 327 are arranged so that the inlets 326a and 327a vertically confront each other. At the initial inflow of the inflation gas G, therefore, the inflation gas G having passed through the main inflating chamber 325 is separated vertically with ease by the guide of the rear edge 332a. The inflation gas G smoothly flows through the individual inlets 326a and 327a into the upper and lower auxiliary inflating chambers 326 and 327. As a result, the inflation gas G can inflate the upper and lower auxiliary inflating chambers 326 and 327 readily.

Here in the airbag 320 of the sixteenth embodiment, the upper edge 325b of the main inflating chamber 325 is in parallel with the wefts H of the texture. The lower edge 325c of the main inflating chamber 325 is substantially in parallel with the wefts H of the texture while forming the small step. Depending on the manner to cut the hollow fabric, however, the main inflating chamber 325 may be set substantially in parallel with the warps V of the texture.

In the airbag 320 of the sixteenth embodiment, on the other hand, approximately 91% of the total length of the upper edge 325b and the lower edge 325c of the main inflating chamber 325 is in parallel with the wefts H of the texture. However, approximately 50% or more of the total length of the upper edge 325b and the lower edge 325c of the main inflating chamber 325 may be formed in parallel with the warps V or the wefts H of the texture. This is because one half or more of the boundary portion (or the upper edge 325b or the lower edge 325c) with the uninflating portion 331 of the main inflating chamber 325 can be reliably made so as to inhibit gas leaks. As a result, the airbag can suppress the leakage of the inflation gas G properly.

For this, the upper edge 325b of the main inflating chamber 325 is in parallel with the warps V or the wefts H, for example. Moreover, the lower edge 325c is tapered so that the main inflating chamber 325 may be diverged toward the rear portion 325a. The airbag may be constructed in this way. Alternatively, the lower edge 325c is parallel with the warps V or the wefts H. Moreover, the upper edge 325b is tapered or stepped. The airbag may be constructed in this way. Alternatively, the front side of the upper and lower edges 325b and 325c on the side of the gas inlet portion 323 is in parallel with the warps V or the wefts H. Moreover, a nonparallel portion such as a taper or step may be formed on the rear side of the upper and lower edges 325b and 325c spaced from the gas inlet portion 323. The airbag may be constructed in this way. It is quite natural that the upper and lower edges 325b and 325c may be in parallel over their entire lengths with the warps V or the wefts H.

Here, the nonparallel portion, which is not in parallel with the warps V or the wefts H, is to be formed on at least one of the upper edge 325b and the lower edge 325c, in the following manner. Specifically, the nonparallel portion is formed apart from a portion 325F (as shown in FIG. 39) adjoining the gas inlet portion 323. This is because the inflator 18 is inserted into the gas inlet portion 323. If the nonparallel portion is formed at the portion 325F adjoining the gas inlet portion 323, moreover, the high pressure at the initial inflow of the inflation gas G acts on that portion 325F, and a gas leak is liable to occur at the portion 325F.

Moreover, the airbag 320 in accordance with the sixteenth embodiment has been described in the case in which the gas inlet portion 323 is arranged on the front side of the inflatable portion 324. However, the longitudinal (fore and aft) direction of the airbag may be inverted. For example, the airbag may be arranged from the rear pillar portion to the roof side rail portion R of the vehicle. In this modification, moreover, the inflatable portion may be constructed to cover the side portions of the front seat and the rear seat when the airbag is fully inflated.

The foregoing detailed description of the preferred embodiments of this invention has been provided for the purposes of illustration and description. It is not intended to be exhaustive or to limit the invention to the precise embodiments disclosed. Obviously, many modifications and variations may be evident to practitioners in the art when considered in reference to the disclosure. The embodiments were chosen and explained in order to best describe the principles of this invention and its practical applications, thereby enabling others skilled in the art to understand the invention for various embodiments and with various modifications as are suited for the particular use contemplated.

What is claimed is:

1. An airbag for a head-protecting airbag system of a vehicle having an interior compartment constructed and arranged to accommodate at least one of a vehicle operator and at least one passenger, said airbag being receivable in the vehicle along an upper interior edge thereof which defines a portion of the interior compartment, said airbag comprising:

an airbag body having an inflatable portion which, upon inflation, enters the interior compartment and covers the upper interior edge of the vehicle, said airbag body including a longitudinally extending portion inflatable into a substantially vertically oriented column, said longitudinally extending portion being arranged at one end of said inflatable portion; and a flexible belt connected at a first end thereof to a peripheral edge of said longitudinally extending portion and connected at a second end thereof to the vehicle so that, upon inflation of said inflatable portion, said flexible belt guides said longitudinally extending portion to generally pivot about an end thereof into a substantially vertical orientation, wherein a distance between the first and second ends of the flexible belt, when the flexible belt is extended straight and when the airbag is unfolded and uninflated, is shorter than a distance between the first and second ends when the airbag is folded and uninflated.

2. The airbag of claim 1, wherein the flexible belt is trifurcated so as to have three end portions, and wherein two end portions are joined to the upper and lower end portions of the longitudinally extending portion and the remaining end portion is fixed on the vehicle.

3. The airbag of claim 1, wherein the flexible belt is a single band joined at its first end to a peripheral edge portion of a lower end portion of the longitudinally extending portion and fixed at its second end on the vehicle, the flexible belt passing through an insert hole defined in the peripheral edge portion, the insert hole being spaced from the first end of the flexible belt.

4. The airbag of claim 1, wherein the airbag body is inflated to cover an interior side of a center pillar portion of the vehicle.

5. An airbag for a head-protecting airbag system of a vehicle having an interior compartment constructed and arranged to accommodate at least one of a vehicle operator and at least one passenger, said airbag being receivable in the vehicle along an upper interior edge thereof which defines a portion of the interior compartment, said airbag comprising:

an airbag body having an inflatable portion which, upon inflation, enters the interior compartment and covers the upper interior edge of the vehicle, said airbag body including a longitudinally extending portion inflatable into a substantially vertically oriented column, said longitudinally extending portion being arranged at one end of said inflatable portion; and a flexible belt connected at a first end thereof to a peripheral edge of said longitudinally extending portion and connected at a second end thereof to the vehicle so that, upon inflation of said inflatable portion, said flexible belt guides said longitudinally extending portion to generally pivot about an end thereof into a substantially vertical orientation, wherein the flexible belt has a length when extended straight between the first and second ends thereof that is shorter than a distance between the first end and the second end when the second end is fixed on the vehicle and the airbag is mounted to the vehicle but uninflated;

wherein the flexible belt is joined at its first end to an uninflating portion of a circumferential edge of the longitudinally extending portion, said circumferential edge of the longitudinally extending portion being a cover portion, the cover portion is a triangular area from the circumferential edge of the longitudinally extending portion to the second end of the flexible belt, the second end of the flexible belt being movable in an axial direction of the second end.

6. The airbag of claim 5, wherein the flexible belt is on an exterior face of the cover portion.

7. The airbag of claim 5, wherein the cover portion is formed integrally with the uninflating portion.

8. The airbag of claim 1, wherein the flexible belt is not inflatable.

9. An airbag for a head-protecting airbag system of a vehicle having an interior compartment constructed and arranged to accommodate at least one of a vehicle operator and at least one passenger, said airbag being receivable in the vehicle along an upper interior edge thereof which defines a portion of the interior compartment, said airbag comprising:

an airbag body having an inflatable portion which, upon inflation, enters the interior compartment and covers the upper interior edge of the vehicle, said airbag body including a longitudinally extending portion inflatable into a substantially vertically oriented column, said longitudinally extending portion being arranged at one end of said inflatable portion; and a flexible belt connected at a first end thereof to a peripheral edge of said longitudinally extending portion and connected at a second end thereof to the vehicle so that, upon inflation of said inflatable portion, said flexible belt guides said longitudinally extending portion to generally pivot about an end thereof into a substantially vertical orientation, wherein the flexible belt is joined at its first end to a peripheral edge portion of the longitudinally extending portion and fixed at its second end to the vehicle, the flexible belt passing through an insert hole defined in the peripheral edge portion, the insert hole being spaced from the first end of the flexible belt.

10. The airbag of claim 9, wherein the flexible belt is not inflatable.

11. The airbag of claim 9, wherein the airbag body is inflated to cover an interior side of a center pillar portion of the vehicle.

12. An airbag for a head-protecting airbag system of a vehicle having an interior compartment constructed and arranged to accommodate at least one of a vehicle operator and at least one passenger, said airbag being receivable in the vehicle along an upper interior edge thereof which defines a portion of the interior compartment, said airbag comprising an airbag body having:

an inflatable portion which, upon inflation, enters the interior compartment and covers the upper interior edge of the vehicle;

a first gas inlet for receiving inflation gas;

a main chamber extending from said first gas inlet along a substantially straight path and substantially horizontal direction and substantially the total length of the inflatable portion; and upper and lower auxiliary chambers located on opposite sides of and in communication with said main chamber and extending parallel to and vertically overlapping the main chamber and spaced from said first gas inlet, wherein each of the upper and lower auxiliary chambers are communicated to the main chamber at only one end thereof.

13. The airbag of claim 12, further comprising:

an uninflating portion arranged on an end of the main chamber, spaced from the first gas inlet, and extending over the upper and lower auxiliary chambers,
wherein the upper and lower auxiliary chambers have second and third gas inlets respectively, arranged at the end of the main chamber, spaced from the first gas inlet.

14. The airbag of claim 12, wherein the third gas inlet of the lower auxiliary chamber has a larger opening area than that of the second gas inlet of the upper auxiliary chamber.

15. The airbag of claim 12, wherein the airbag is formed by a hollow-woven material including warps and wefts, wherein the main chamber is arranged substantially in parallel with the at least one of the warps and the wefts, and wherein the airbag is folded on folds along the main chamber.

16. The airbag of claim 15, wherein approximately 50% to 100% of a total length of an upper edge and a lower edge of the main chamber is formed in parallel with the at least one of the warps and the wefts.

17. The airbag of claim 15, further comprising:

an inflator inserted into the first gas inlet for feeding the inflation gas, a nonparallel portion, not in parallel with the at least one of the warps and the wefts, is formed on at least one of the upper edge and the lower edge of the main chamber, and the nonparallel portion is formed spaced from the first gas inlet, in which the inflator is inserted.

18. An airbag for a head-protecting airbag system of a vehicle having an interior compartment constructed and arranged to accommodate at least one of a vehicle operator and at least one passenger, said airbag being receivable in the vehicle along an upper interior edge thereof which defines a portion of the interior compartment, said airbag comprising:

an airbag body having an inflatable portion which, upon inflation, enters the interior compartment and covers the upper interior edge of the vehicle, said airbag body including a longitudinally extending portion inflatable into a substantially vertically oriented column, said longitudinally extending portion being arranged at one end of said inflatable portion; and a flexible belt connected at a first end thereof to a peripheral edge of said longitudinally extending portion and connected at a second end thereof to the vehicle so that, upon inflation of said inflatable portion, said flexible belt guides said longitudinally extending portion to generally pivot about an end thereof into a substantially vertical orientation, wherein the flexible belt is joined at its first end to a circumferential edge of an upper end portion of the longitudinally extending portion and fixed at its second end to the vehicle through an insert hole defined in a peripheral edge of an opening of the vehicle;

wherein the flexible belt is joined at its first end to an uninflating portion of a circumferential edge of the longitudinally extending portion, said circumferential edge of the longitudinally extending portion being a cover portion, the cover portion is a triangular area from the circumferential edge of the longitudinally extending portion to the second end of the flexible belt, the second end of the flexible belt being movable in an axial direction of the second end.

* * * * *